(12) United States Patent
Guarracina et al.

(10) Patent No.: US 11,045,811 B2
(45) Date of Patent: Jun. 29, 2021

(54) ROBOTIC PROCESSING SYSTEM

(71) Applicant: HIGHRES BIOSOLUTIONS, INC., Beverly, MA (US)

(72) Inventors: Louis Guarracina, Newburyport, MA (US); Ulysses Gilchrist, Reading, MA (US)

(73) Assignee: HighRes Biosolutions, Inc., Beverly, MA (US)

(\*) Notice: Subject to any disclaimer, the term of this patent is extended or adjusted under 35 U.S.C. 154(b) by 0 days.

(21) Appl. No.: 16/265,273

(22) Filed: Feb. 1, 2019

(65) Prior Publication Data

US 2019/0241375 A1 Aug. 8, 2019

Related U.S. Application Data

(60) Provisional application No. 62/625,809, filed on Feb. 2, 2018.

(51) Int. Cl.
*B01L 9/02* (2006.01)
*G01N 35/04* (2006.01)
(Continued)

(52) U.S. Cl.
CPC .............. *B01L 9/02* (2013.01); *B65G 47/905* (2013.01); *B65G 69/287* (2013.01);
(Continued)

(58) Field of Classification Search
CPC ........................................................ B01L 9/02
See application file for complete search history.

(56) References Cited

U.S. PATENT DOCUMENTS 6,142,722 A \* 11/2000 Genov .............. H01L 21/67772
414/217
6,477,442 B1 11/2002 Valerino, Sr.
(Continued)

FOREIGN PATENT DOCUMENTS

EP   3292961    3/2018
WO  0103841    1/2001
(Continued)

OTHER PUBLICATIONS

International Search Report, International Application No. PCT/US2019/016558, dated May 14, 2019.
(Continued)

*Primary Examiner* — Thomas Randazzo
(74) *Attorney, Agent, or Firm* — Perman & Green, LLP

(57) ABSTRACT

An automated biological or chemical sample processing system includes a dock frame and at least one dock frame module. The dock frame includes at least one docking interface that operably couples and interfaces the dock frame with laboratory equipment. The dock frame defines a spine structure of the system alongside which a variable number of laboratory equipment are arrayed. The dock frame extends longitudinally and has a variable elongated configuration and longitudinal length. The at least one dock frame module includes the docking interface, where each module is interchangeable with another module, and has control features with a predetermined relationship to a reference datum of the dock frame module and with a reference datum of the dock frame so that the at least one dock frame module is interchangeably coupled in linear configuration with at least the other dock frame module to select the variable elongated configuration and longitudinal length.

42 Claims, 54 Drawing Sheets

(51) Int. Cl.
*B65G 47/90* (2006.01)
*B65G 69/28* (2006.01)
*G01N 35/00* (2006.01)

(52) U.S. Cl.
CPC ......... *G01N 35/0099* (2013.01); *G01N 35/04* (2013.01); *B65G 2201/02* (2013.01)

(56) References Cited

U.S. PATENT DOCUMENTS

| | | | |
|---|---|---|---|
| 6,647,665 B1* | 11/2003 | Tabrizi | H01L 21/67126 49/340 |
| 8,734,720 B2* | 5/2014 | Nichols | B01L 3/565 414/222.01 |
| 9,561,590 B1 | 2/2017 | Nusser et al. | |
| 10,583,554 B2* | 3/2020 | Nichols | B25J 9/0096 |
| 2003/0215357 A1* | 11/2003 | Malterer | G01N 35/028 422/50 |
| 2005/0111938 A1* | 5/2005 | van der Meulen | H01L 21/67161 414/217 |
| 2006/0111813 A1* | 5/2006 | Nishiyama | G05B 19/41815 700/253 |
| 2007/0237675 A1* | 10/2007 | Nichols | B01L 3/565 422/63 |
| 2009/0035181 A1 | 2/2009 | Chung et al. | |
| 2009/0240370 A1* | 9/2009 | Nichols | B01L 9/02 700/248 |
| 2009/0246081 A1* | 10/2009 | Nichols | G01N 35/04 422/63 |
| 2009/0302795 A1* | 12/2009 | Nichols | G05B 19/425 318/568.13 |
| 2014/0234949 A1* | 8/2014 | Wasson | G01N 35/00871 435/287.2 |
| 2017/0217027 A1 | 8/2017 | Boucard | |
| 2018/0056528 A1* | 3/2018 | Cochran | B25J 19/063 |
| 2018/0133893 A1 | 5/2018 | Motojima et al. | |
| 2018/0202908 A1 | 7/2018 | Croquette et al. | |

FOREIGN PATENT DOCUMENTS

| | | |
|---|---|---|
| WO | 2008007923 | 1/2008 |
| WO | 2016061471 | 4/2016 |
| WO | 20160178351 | 11/2016 |
| WO | 2017014999 | 1/2017 |

OTHER PUBLICATIONS

International Search Report, International Application No. PCT/US2019/016555, dated May 20, 2019.

* cited by examiner

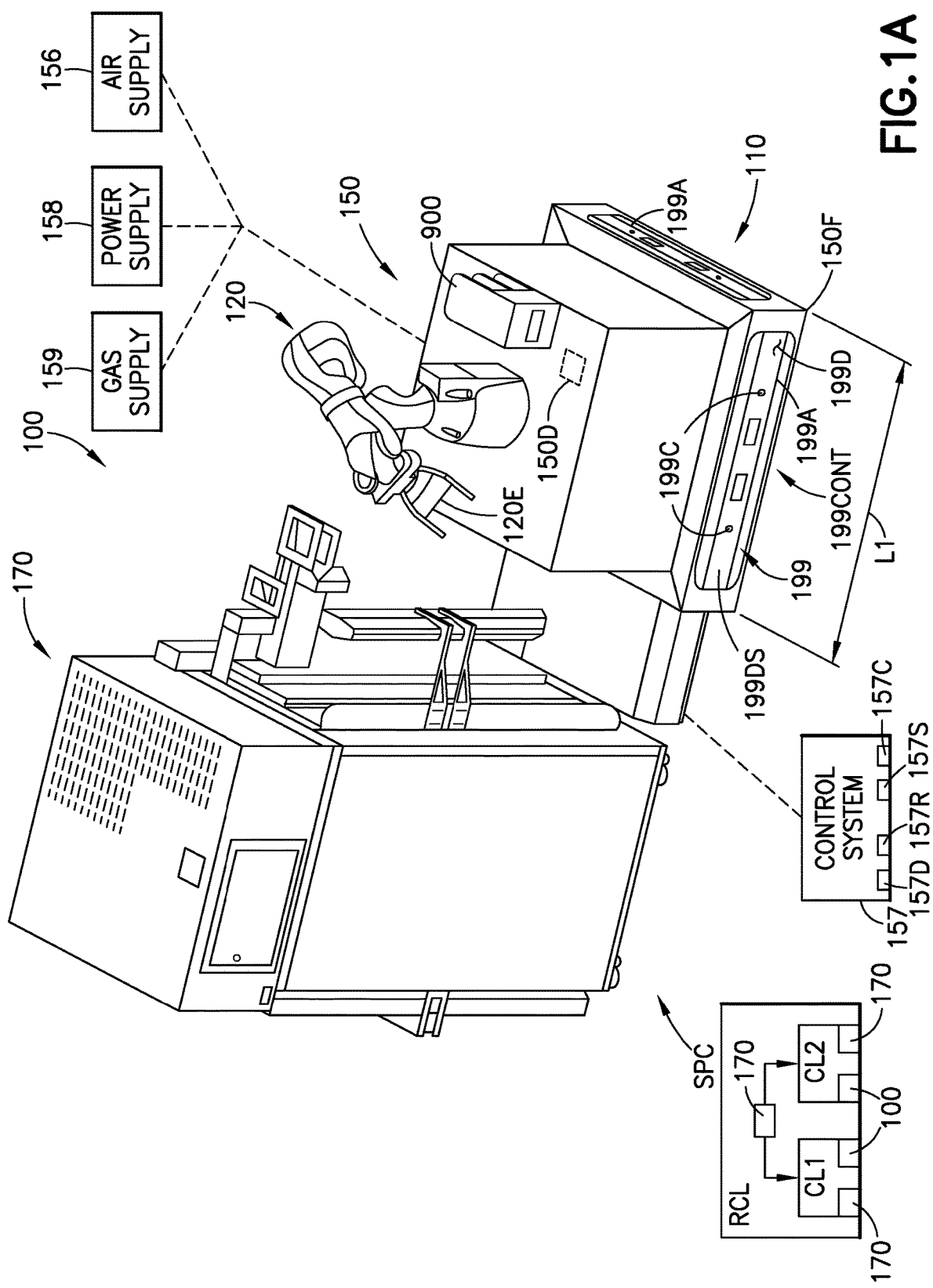

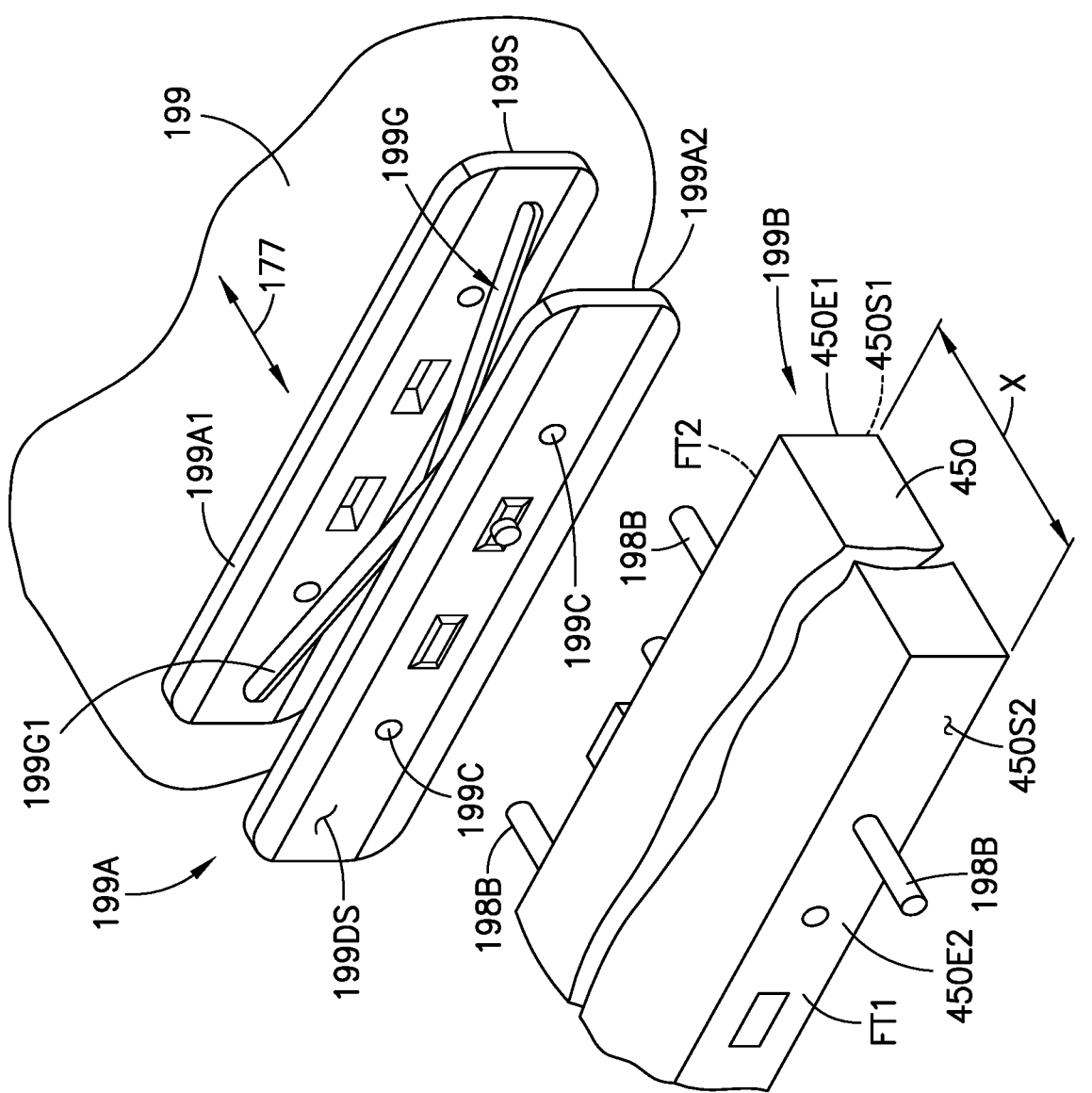

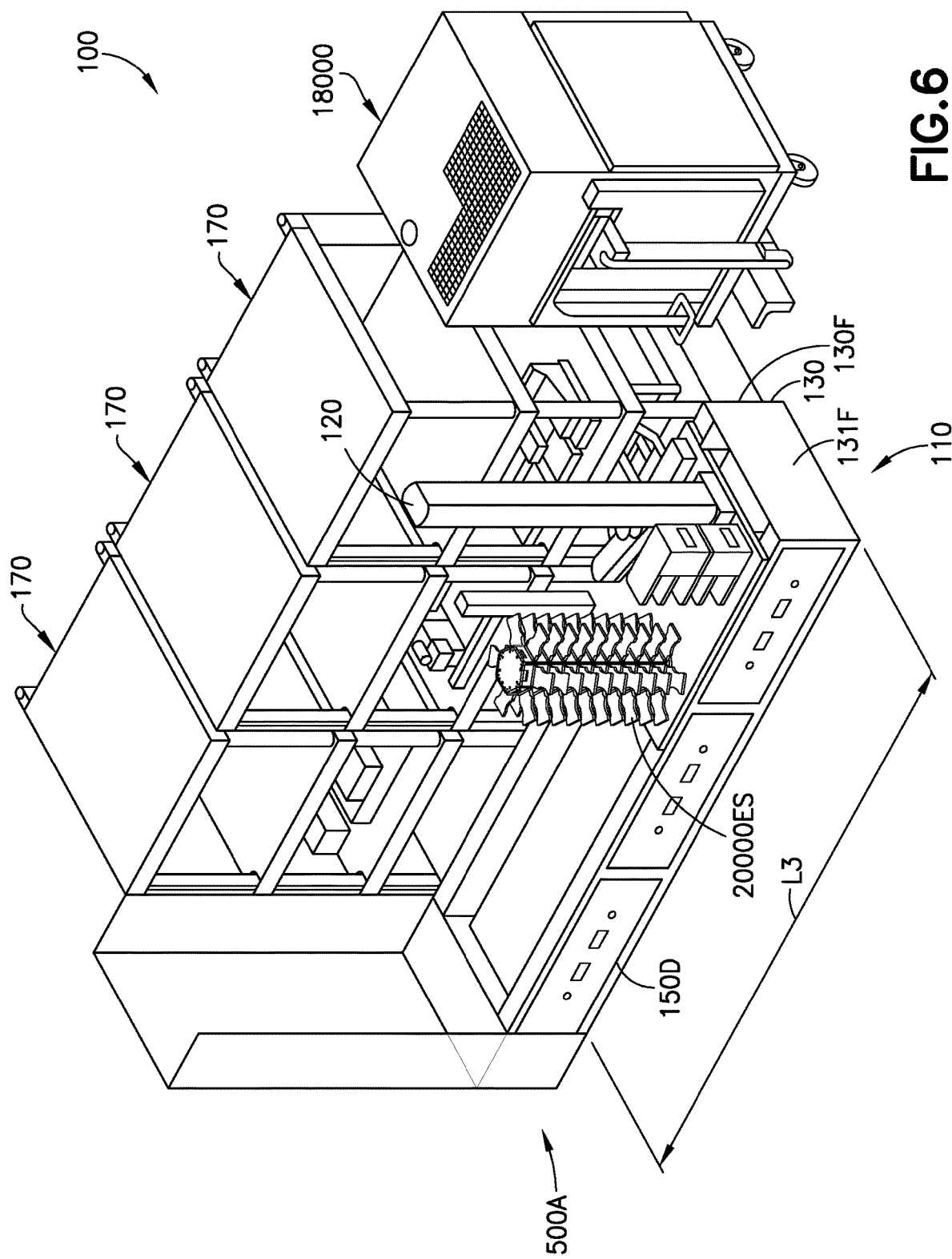

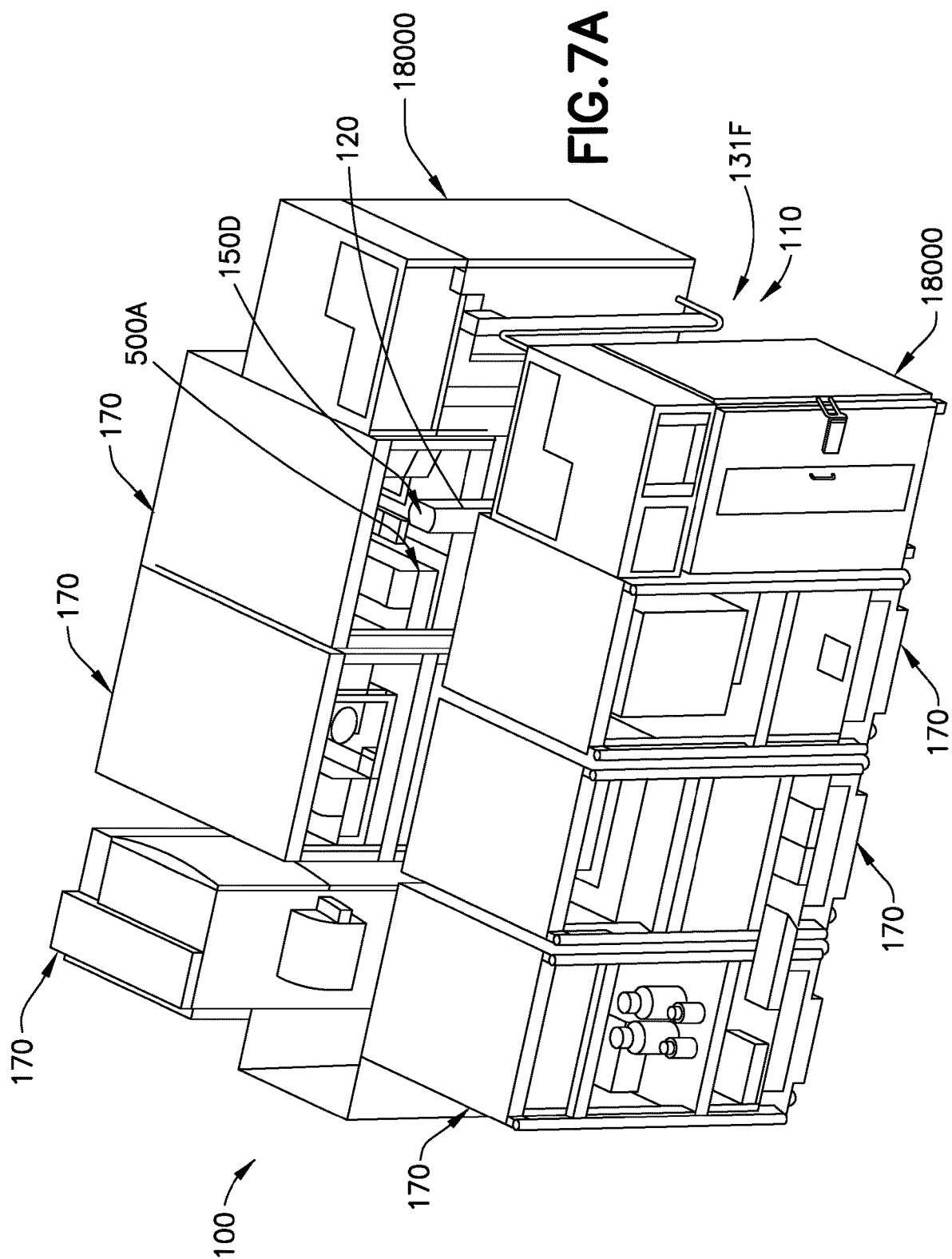

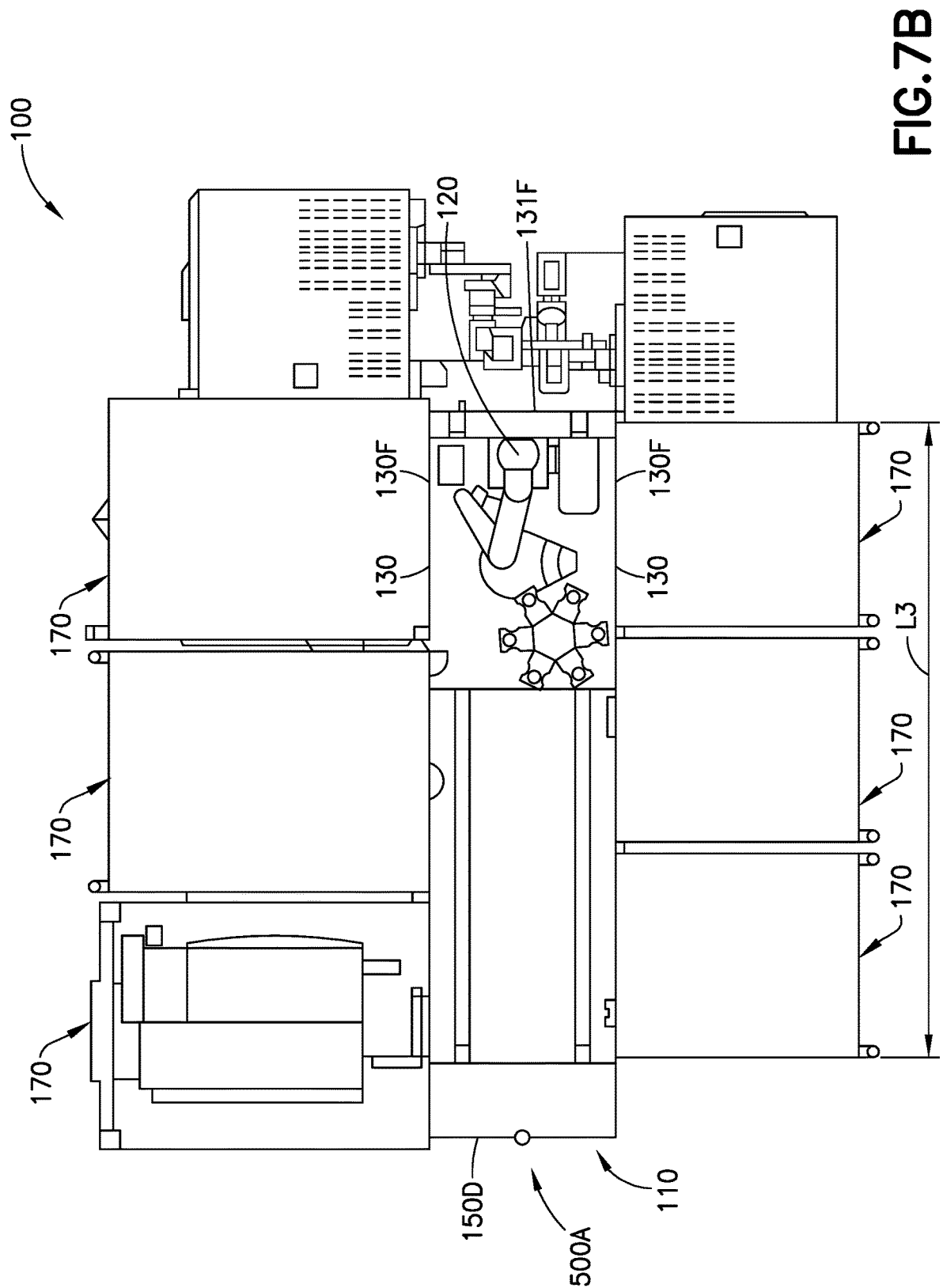

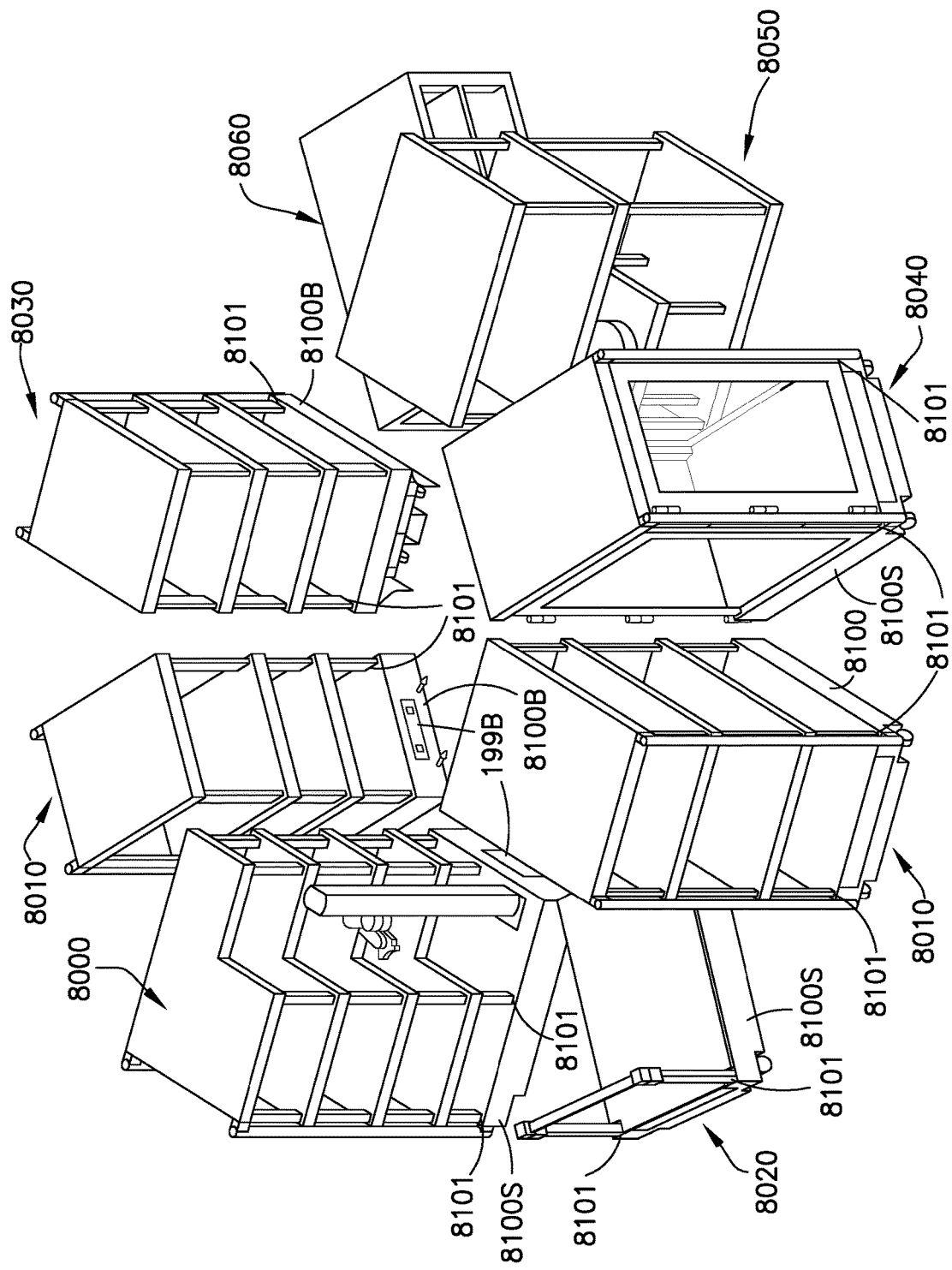

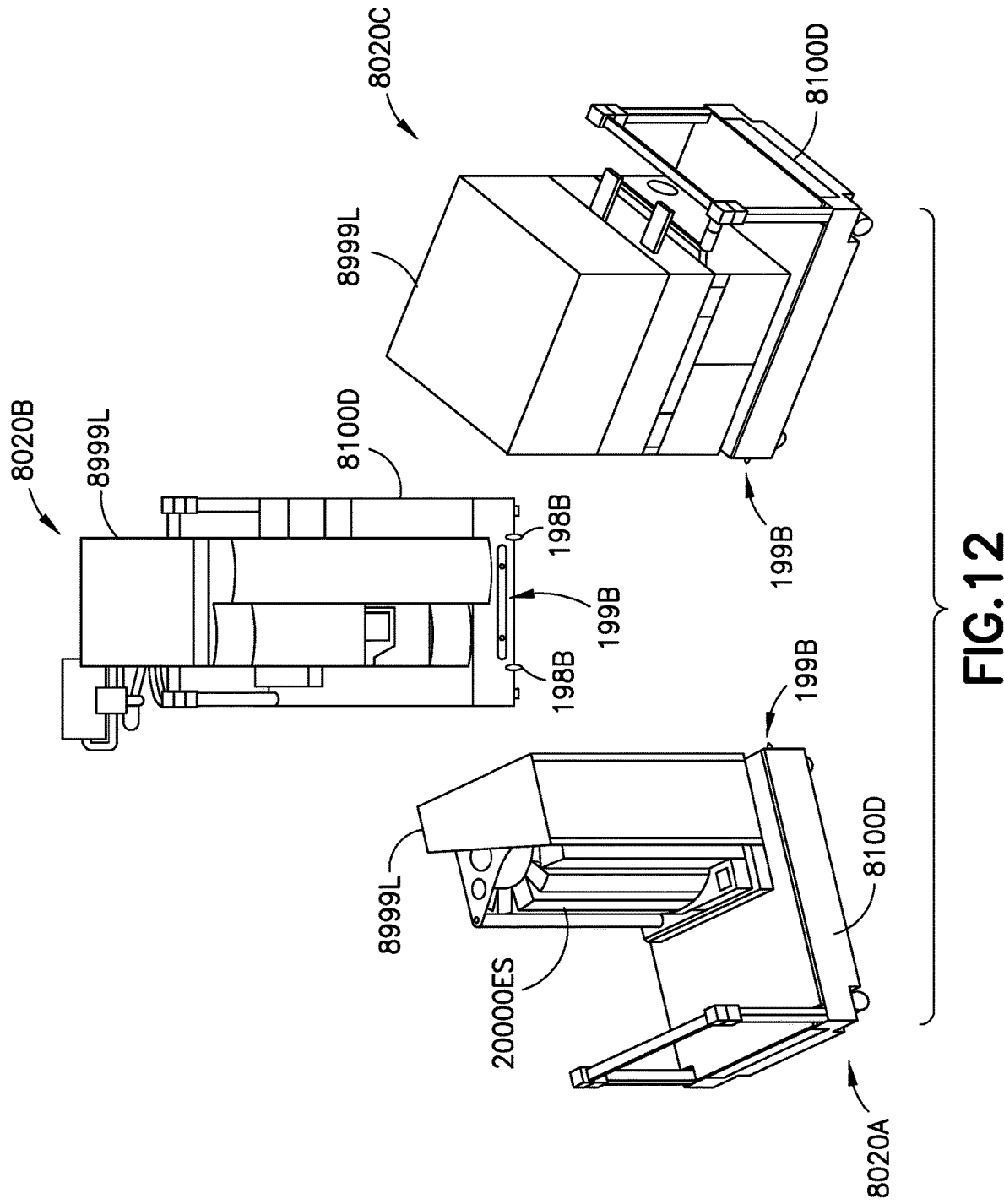

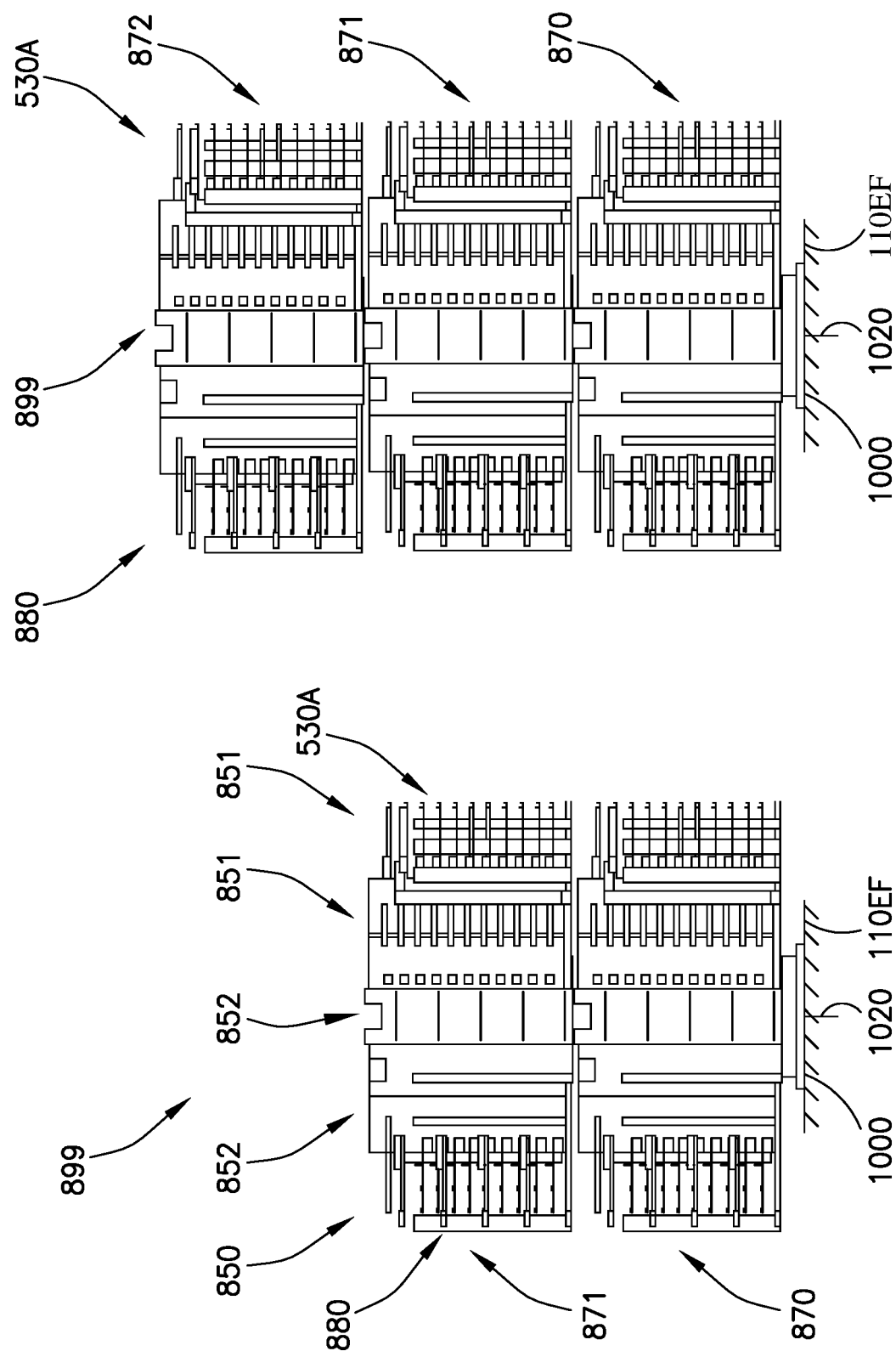

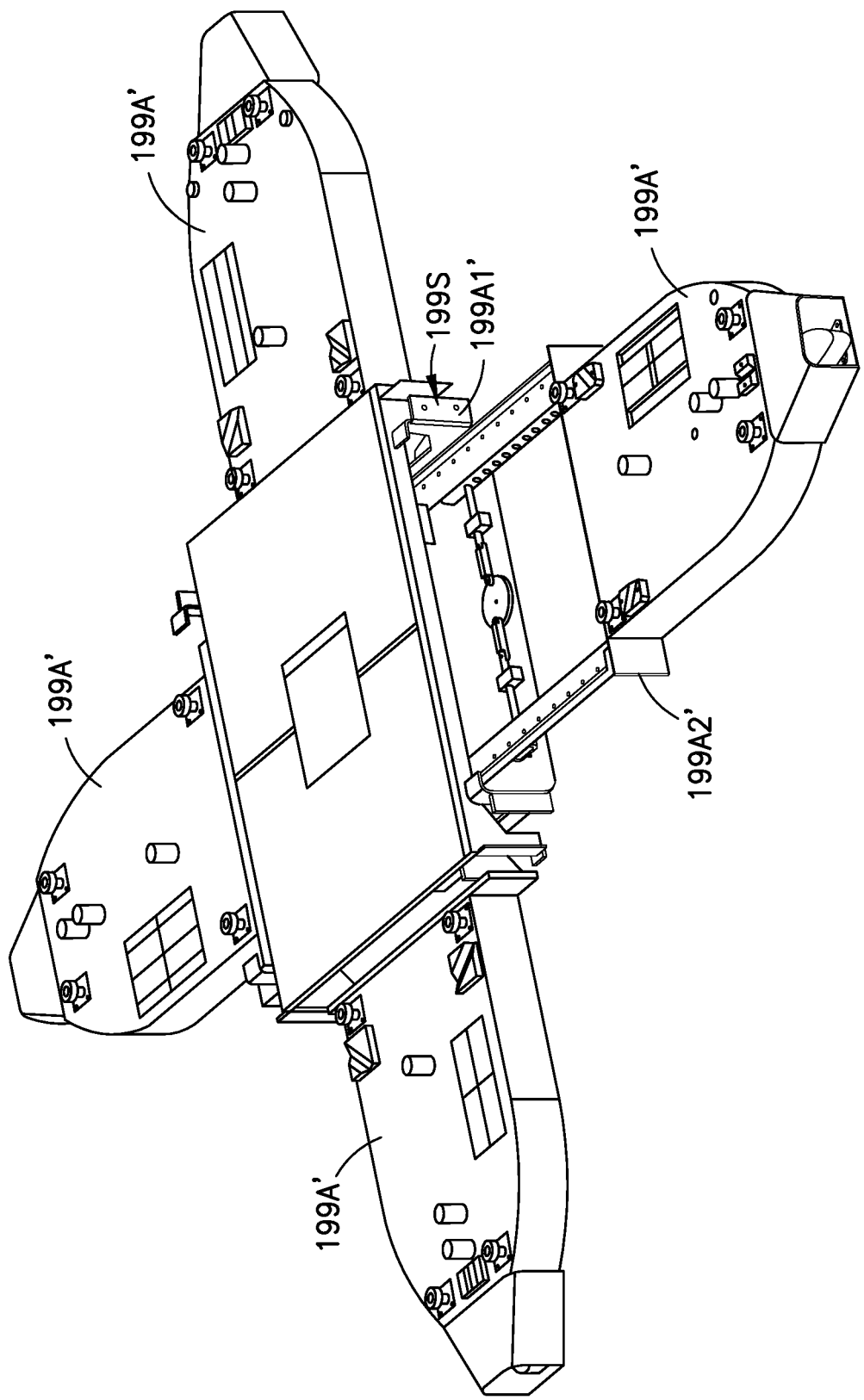

ROBOTIC PROCESSING SYSTEM

CROSS REFERENCE TO RELATED APPLICATIONS

This application is a non-provisional of and claims the benefit of U.S. provisional application No. 62/625,809, filed on Feb. 2, 2018 and related to U.S. provisional application No. 62/625,796, filed on Feb. 2, 2018, the disclosures of which are incorporated herein by reference in their entireties.

BACKGROUND

1. Field

The aspects of the disclosed embodiment described herein generally relate to life sciences equipment, and more particularly, to automated handling and processing of life sciences processing equipment.

2. Brief Description of Related Developments

High throughput screening is a well-known form of scientific experimentation in the life sciences industry which enables a research facility to conduct a large quantity of experiments at the same time. In one form of high throughput screening which is well-known in the art, a plate is provided which includes a large number of isolated, miniaturized wells (e.g., 96, 384, or 1536 wells per plate), whereby a unique compound is disposed in each well. An array of different substances is then disposed within each well where a reaction between the compound and substances may be discovered. In this manner, high throughput screening can be used to subject a particular substance to an entire library of compounds at the same time and, as a result, is highly useful in the discover of, e.g., new medicines, vaccines, and biopharmaceuticals.

High throughput screening is generally performed in an environmentally controllable enclosure which is commonly referred to as a cell or chamber. These cells may provide a researcher with an enclosed environment that is most suitable for laboratory testing. High throughput screening also, generally relies on automation to conduct assays which are otherwise repetitive in nature. Various types of laboratory automation tools are presently used in conjunction with high throughput screening.

One type of automation tool is a mobile cart that is used to carry items from one location to another within the laboratory facility. These mobile carts generally interact with other automated processing equipment and may be used to transfer laboratory samples and/or engage a processing station so that the samples carried by the mobile cart may be processed by the processing station.

BRIEF DESCRIPTION OF THE DRAWINGS

The foregoing aspects and other features of the disclosed embodiment are explained in the following description, taken in connection with the accompanying drawings, wherein:

FIG. 1A is an isometric view of a robotic processing system in accordance with aspects of the disclosed embodiment;

FIGS. 1A-1B are isometric views of a portion of a docking station of the robotic processing system in accordance with aspects of the disclosed embodiment;

FIG. 6 is an isometric view of the robotic processing system of FIG. 1A in another exemplary configuration in accordance with aspects of the disclosed embodiment;

FIGS. 7A and 7B are respective isometric and plan views of the robotic processing system of FIG. 1A in yet another exemplary configuration in accordance with aspects of the disclosed embodiment;

FIG. 8 illustrates exemplary interchangeable carts and exemplary interchangeable tables of the robotic processing system of FIG. 1A in accordance with aspects of the disclosed embodiment;

FIG. 12 is a schematic illustration of some of the exemplary interchangeable carts of FIG. 8 in accordance with aspects of the disclosed embodiment;

FIG. 22A-22C are schematic illustrations of a portion of the storage system of FIGS. 20A and 20B in accordance with aspects of the disclosed embodiment;

FIGS. 34A-34C are isometric views of a portion of a docking station of the robotic processing system in accordance with aspects of the disclosed embodiment.

DETAILED DESCRIPTION

FIG. 1A illustrates a robotic or automated processing system 100 for automated laboratory testing or storage of biological or chemical samples in accordance with one or more aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

Figure 31:
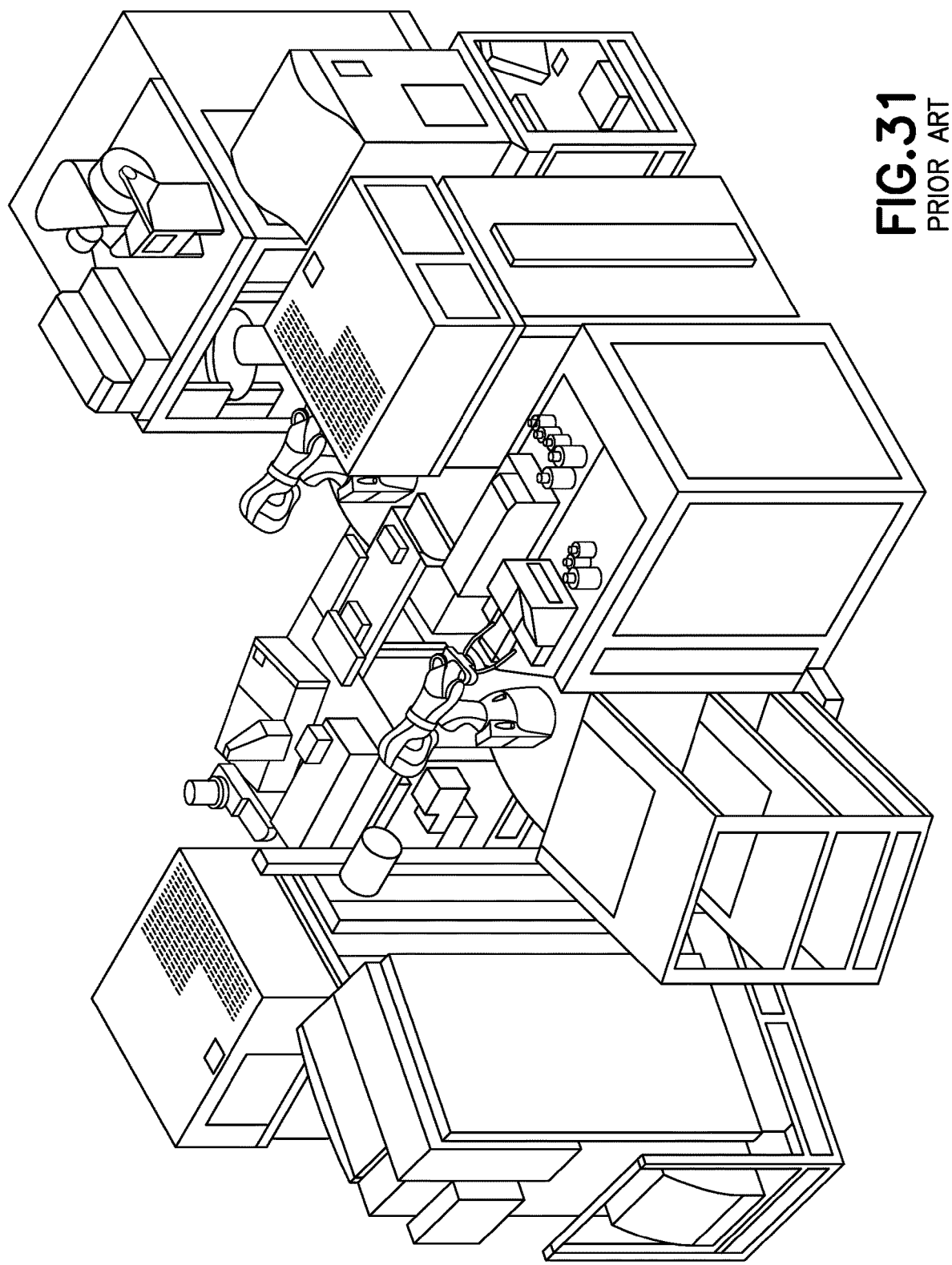
FIGS. 31 and 32 are exemplary conventional processing systems.
Figure 32:
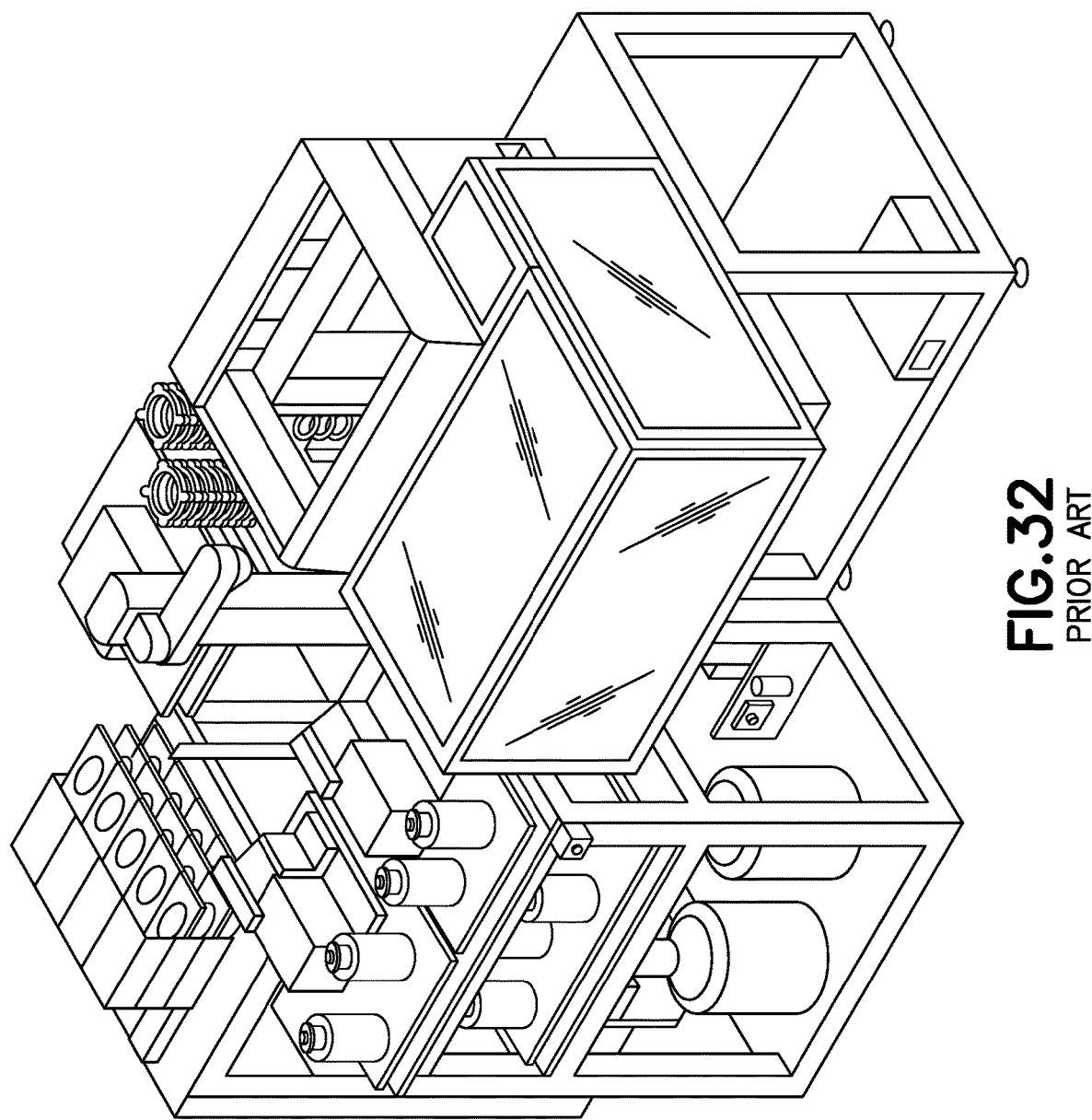

In accordance with aspects of the disclosed embodiment the robotic processing system 100 includes a standardized system frame(s) (referred to herein as a dock frame 199) that forms a spine structure of the robotic processing system 100 as described herein. The dock frame 199 may be included in a dock frame module 150 to which interchangeable mobile carts 170 (such as interchangeable mobile carts 8000, 8010, 8020, 8030, 8040—see FIG. 8) and/or stationary tables or racks 8050, 8060 (see FIG. 8) are coupled. The dock frame(s) 199 may effect repeatable coupling between any suitable combination of dock frame modules 150, interchangeable mobile carts 170, and stationary tables or racks 8050, 8060. In one aspect, at least one of the dock frame modules 150 has a different processing characteristic than other different ones of the dock frame modules 150 as will be described herein. The dock frame modules 150 may be coupled to each other to form a linear processing tool arrangement that results in a more compact processing system (e.g. occupies less floor space) than conventional hexagonally arranged processing systems (see FIG. 31 compared to FIG. 4A) or where, a single dock frame module 150 is employed, a comparable conventional single base module processing system (see FIG. 32 compared to FIG. 3).

The interchangeability of the robotic processing system 100 components as described herein may improve overall robotic processing system 100 where the components of the robotic processing system 100 (such as the dock frames, dock frame modules, interchangeable mobile carts, and stationary tables) are built in substantially the same way with respect to the electronics and mechanics (e.g., the electronics and mechanics are standardized) of the respective components. The aspects of the disclosed embodiment provides for a standardization of robotic processing system 100 modules and the docking systems that enable coupling of the robotic processing system 100 modules to each other. Standardization of the robotic processing system 100 modules may also provide for improved serviceability of the robotic processing system 100 and its components and provide easier access to the components by service personnel.

Repeatability in positioning between robotic processing system 100 modules effected by the aspects of the disclosed embodiment may provide for optimization of fungible robot 120 and end effector 120E operation so that overall system performance in improved. The repeatability in positioning may also simplify and eliminate inefficiencies in the process optimization, such as by allowing for system configurators to be used where a virtual robotic processing system 100 is built using the known positioning characteristics of each robotic processing system 100 module. This optimized process may improve costs with respect to in situ system design adjustments. The standardization of module features may provide for nearly fungible system configurations as well as reduce build costs as the standardized modules may be built in volume rather than as bespoke items. The aspects of the disclosed embodiment may also improve aesthetics of the robotic processing system 100. The aspects of the disclosed embodiment may provide for commissioning of a robotic processing system to start with a fully tested system with teach points (e.g., pick/place locations, etc.) pre-taught to the robotic processing system by an original equipment supplier (OES).

Figure 20A:
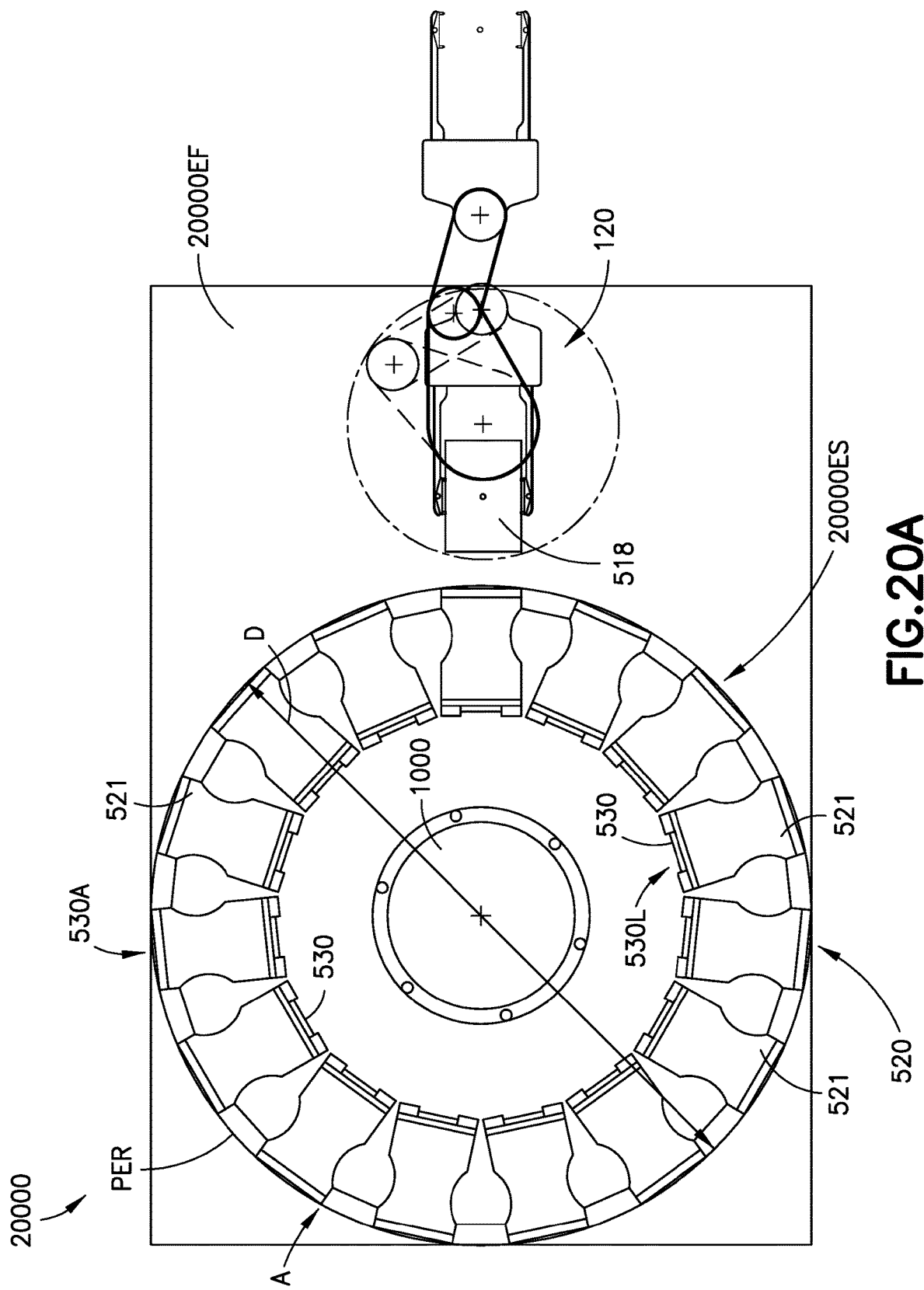
FIGS. 20A and 20B are a top plan view of a storage system of the robotic processing system of FIG. 1A in accordance with aspects of the disclosed embodiment.
Figure 20B:
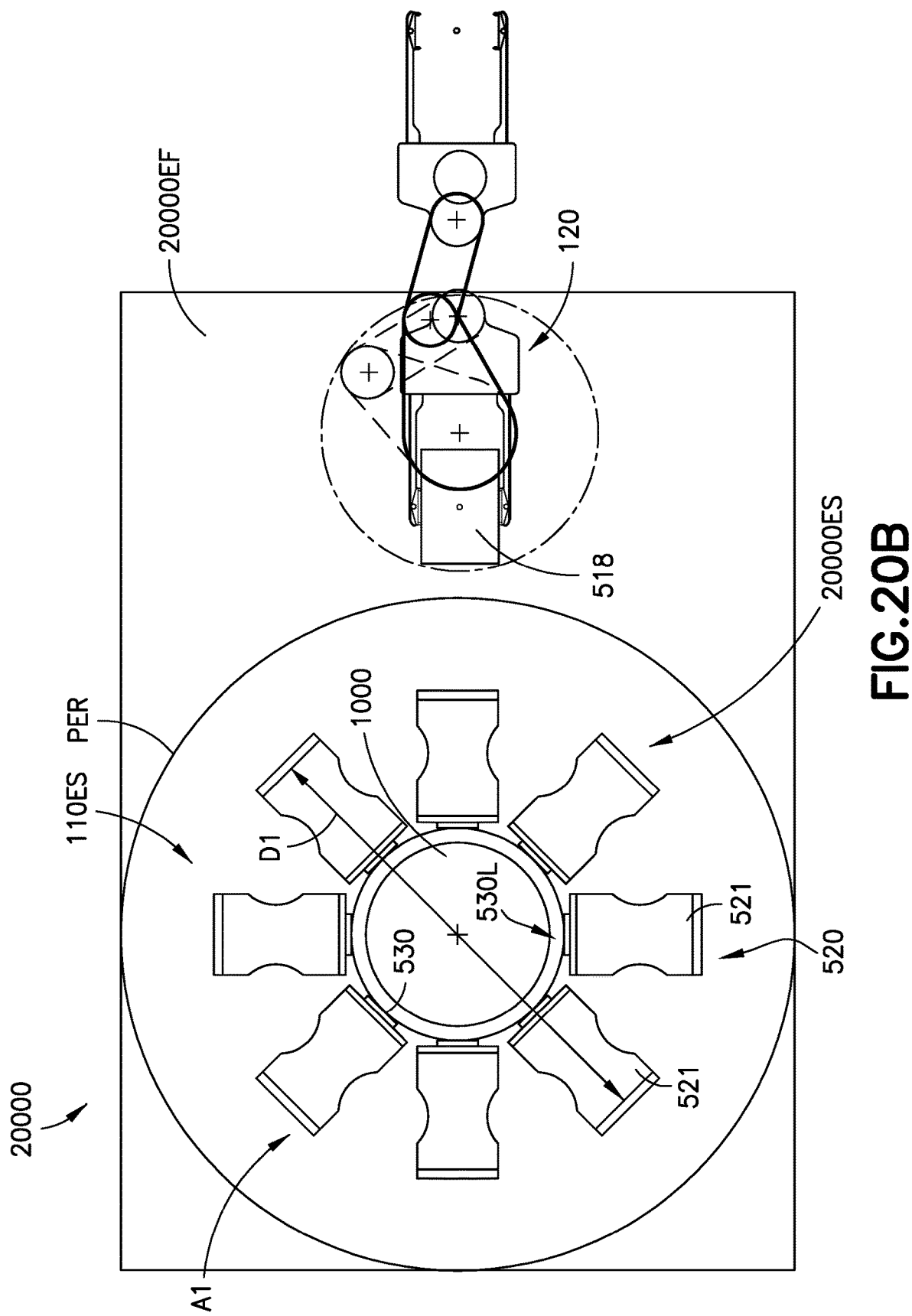

Referring also to FIGS. 20A and 20B, the aspects of the disclosed embodiment also provide for a storage system 20000 for use within laboratory automation, such as in the robotic processing system 100. The storage array may be mobile (e.g., in the form of a mobile cart with one or more caster or other suitable wheels on which the cart is supported) or stationary (e.g., in the form of a table, bench or other stationary platform). The storage system 20000 generally includes a frame 20000EF, a storage array 20000ES and a robot 120. The storage array 20000ES is configured to store typical life science drug discovery lab ware such as Society for Biomolecular Screening (SBS) plates and racks, burettes for aspirating and dispensing liquids, flasks, tubes, beakers, bottles, vials, lids and caps, microfluidic flow cells, petri dishes, media bags, bioreactors, etc. The robot 120 is configured to transfer the lab ware, such as for example, the SBS plates between the storage array 20000ES and any suitable processing equipment such as readers, dispensers, incubators, etc. that can be integrated around the frame 20000EF within the reach of the robot 120.

Figure 1C:
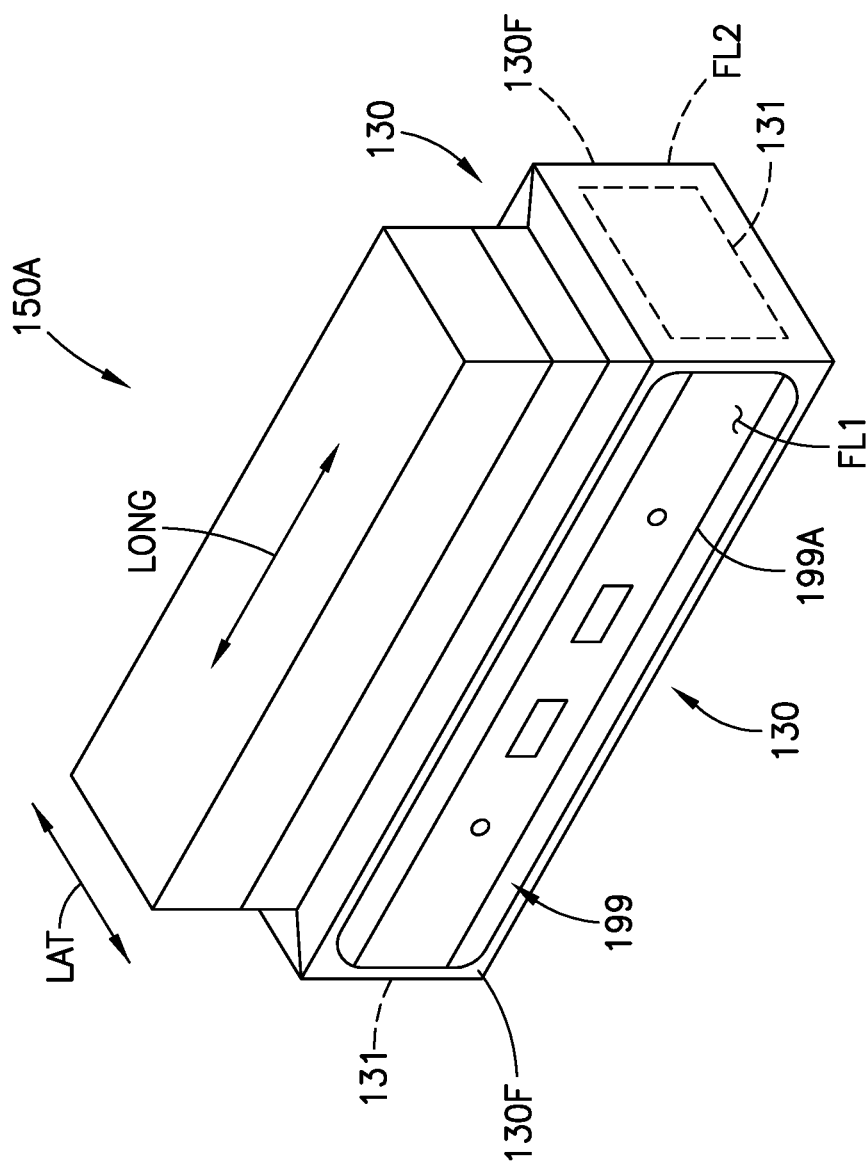
FIGS. 1C, 1D, 1E, 1F, 1G are isometric views of portions of the robotic processing system in accordance with aspects of the disclosed embodiment.
Figure 1D:
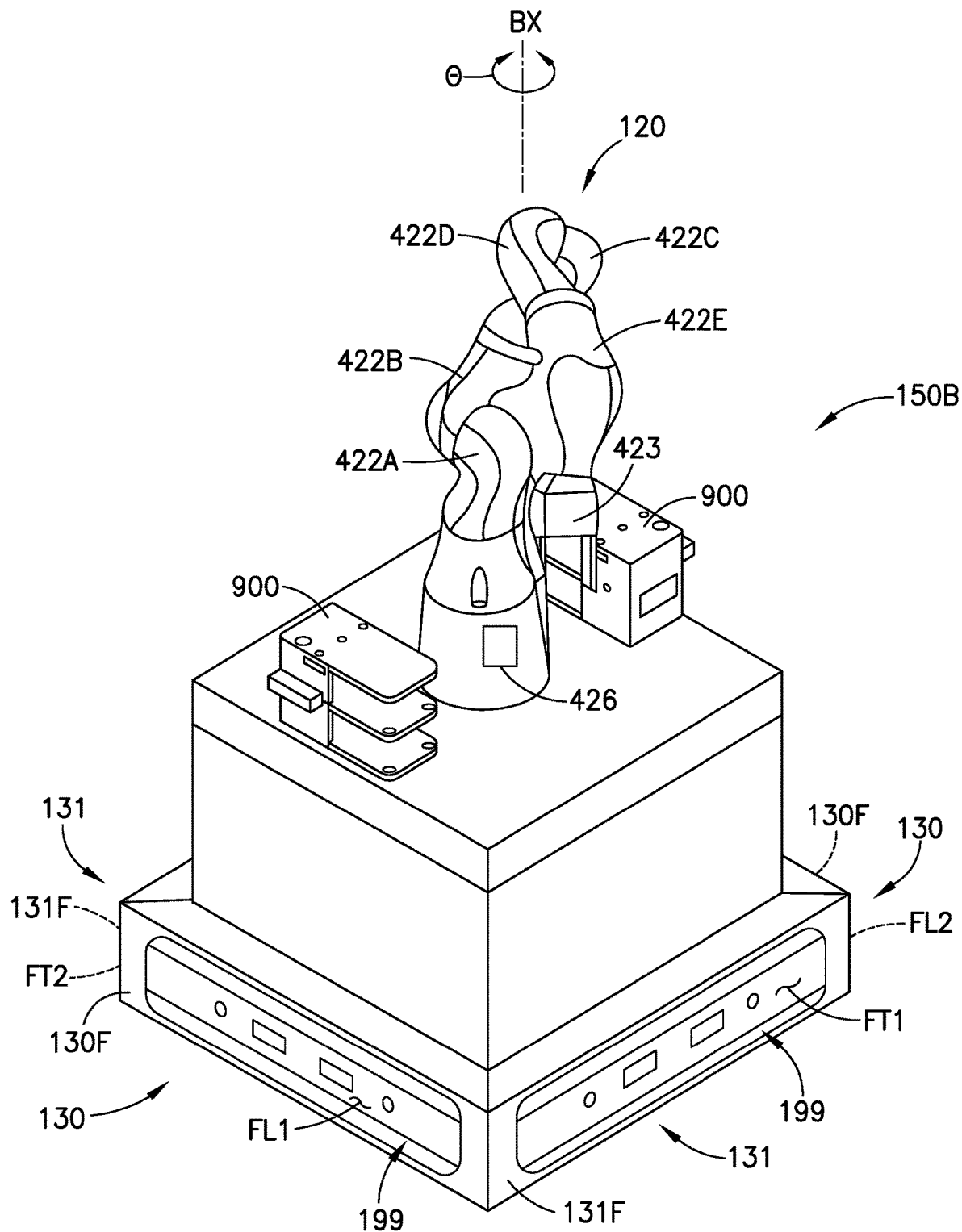
Figure 1E:
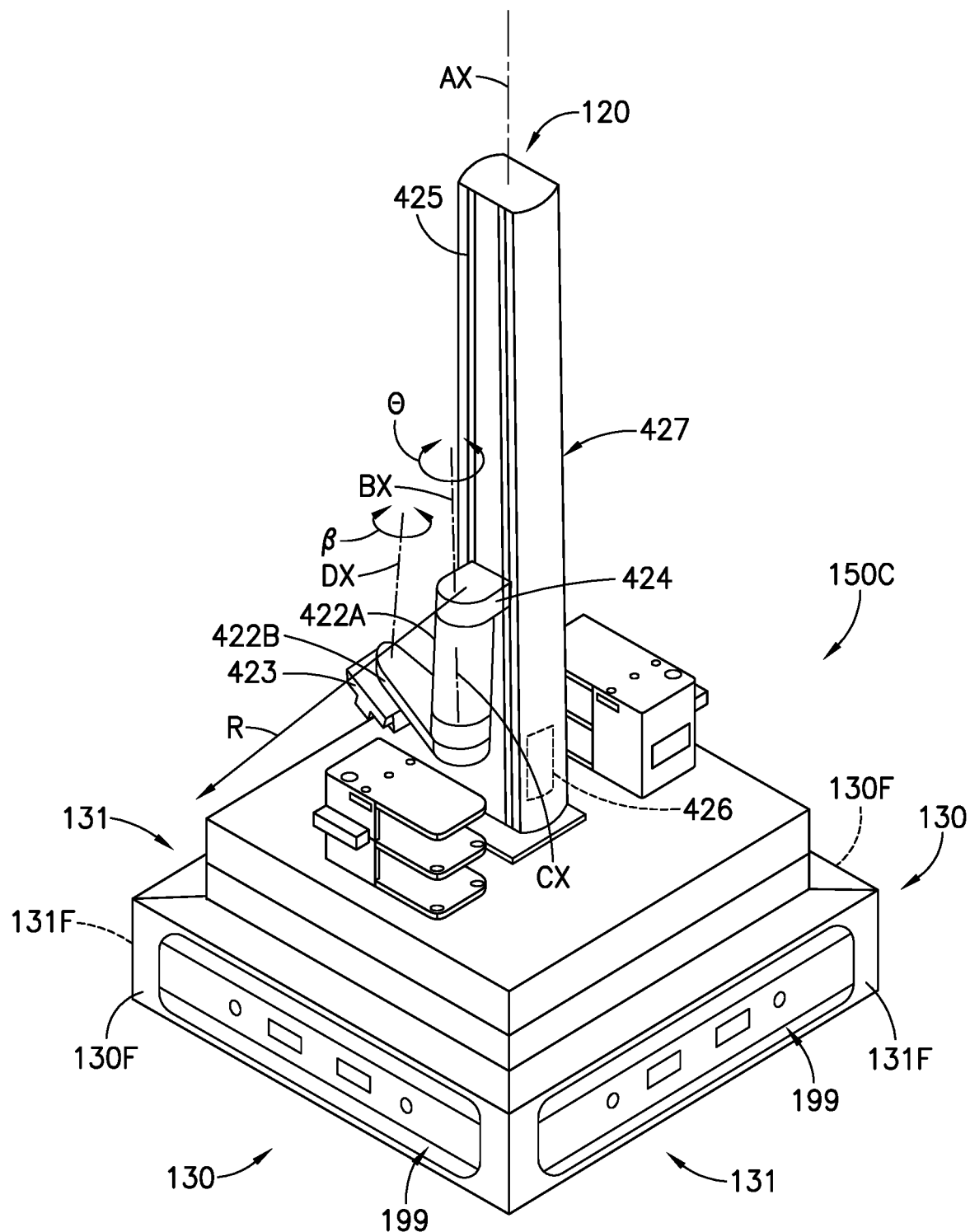
Figure 1F:
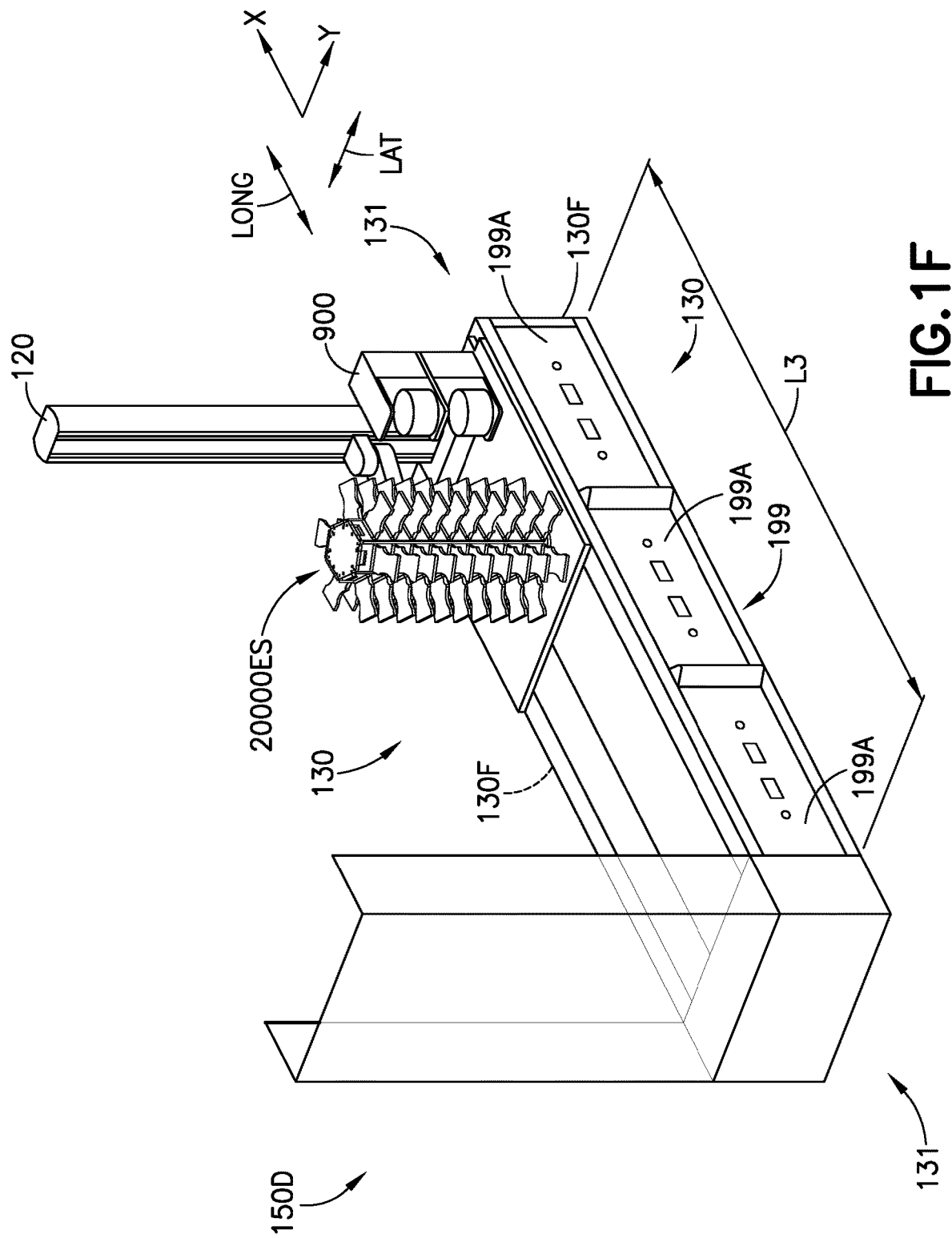

In one aspect, storage system, in the form of a storage carousel (or array) 20000ES may also be integrated into any suitable portion of the processing system 100 such as integrated into a modular frame (see, e.g., FIGS. 1F, 6, and 7B). Here any suitable robot 120 is configured to transfer the lab ware between the storage carousel 20000ES and any other suitable component of the processing system 100. For example, as will be described herein, one or more lab ware nests 900 (or handoff stations—see, e.g., FIG. 1F) may be provided at any suitable location in the processing system 100 where the robot 120 transfers the lab ware between the storage carousel 20000ES and the lab ware nest(s) 900 for handing off the lab ware to, e.g., another robot 120 of the processing system 100. In other aspects, the robot 120 may be configured for a substantially direct robot to robot handoff (e.g., gripper to gripper handoff) with another robot 120 in the processing system 100.

In still other aspects, storage carousel 20000ES may be configured as a stand-alone module that may be coupled to a frame of any suitable cart or processing system or within, for example, a liquid handler to store lab ware that can be accessed by robot 120 of the processing system 100.

In accordance with the aspects of the disclosed embodiment, the storage carousel 20000ES may be configured to store lab ware in stacks 850-852 (FIG. 22A) where the stacks 850-852 include storage rack modules 850M, 851M, 852M (FIGS. 23A-23C) that can store lab ware in one or more of a random or non-random arrangement. The configurable stacks 850-852 provide for stacking of, for example, SBS plates or other lab ware for high density first in first out storage next to a stack 850-852 where the SBS plates or other lab ware can be accessed at any suitable time. The storage carousel 20000ES may also have a sealed or unsealed configuration, where when sealed, the motor, encoders, and electronics of the storage carousel 20000ES are isolated outside of the environment in which the storage carousel 20000ES stores the lab ware. The sealing of the storage carousel 20000ES provides for use of the storage carousel 20000ES in such devices as freezers, incubators, or any other suitable controlled environment substantially without exposing the motor, encoders, and electronics of the storage carousel 20000ES to moisture, temperature, or other environmental factors that may adversely affect the performance of the storage carousel 20000ES.

Referring again to FIG. 1A, in one aspect, the robotic processing system 100 may be disposed in any suitable operating space SPC. In one aspect, the operating space SPC may be a collaborative operating space in which at least a portion of the robotic processing system 100 collaborates with human operators (see FIG. 14) for carrying out testing and experiments. In other aspects the space in which the robotic processing system 100 operates may be substantially free of human operators. Where the operating space SPC is collaborative, a human operator may access one or more regions of the collaborative operating space SPC (e.g. a location on mobile carts, any suitable workpiece holding location, etc.) directly, and at times such access may be coincident or coexistent with a robotic transport arm 120 (also referred to herein as a robot) operation within the collaborative operating space SPC. For example, an operator may place or pick a workpiece on or from a workpiece holding station in anticipation of a robotic pick of that workpiece as an aspect of a collaborative action with the robotic transport arm 120. Accordingly the robotic transport arm 120 and operator collaborate in the collaborative operating space SPC in some aspects.

The robotic processing system 100 includes a dock frame 199 and at least one dock frame module 150. The dock frame 199 includes at least one docking interface 199A configured to couple to and interface with at least one automated, at least in part, laboratory instrumentation and a storage cabinet (see the interchangeable carts, tables and racks and the instrumentation provided thereon as described herein with respect to FIGS. 8-13E, 15-21), so as to operably couple the at least one of the laboratory instrumentation and the storage cabinet to the dock frame 199 via the docking interface 199A.

Referring also to FIGS. 2-7B, the dock frame 199 defines a spine structure 110 of the processing system 100 alongside which a variable number of the at least one of the laboratory instrumentation and the storage cabinet are arrayed, operably coupled to the dock frame 199. The dock frame 199 extends longitudinally and has a selectably variable elongated configuration with a selectably variable longitudinal length L1-L4 (see FIGS. 1A, 1F, 1G, 4B, 5, 6, and 7B).

The at least one dock frame module 150, includes the docking interface 199A. Each of the at least one dock frame module 150 is interchangeable with at least another dock frame module 150, and has control features 199CONT (such as pins or apertures 199C and/or surface 199DS) with a predetermined relationship to a reference datum 150D of the dock frame module 150 and with a reference datum 199D of the dock frame 199, formed of more than one of the at least one dock frame module 150 and relating the dock frame 199 to each of the more than one dock frame modules 150, so that the at least one dock frame module 150 is interchangeably coupled in linear configuration with at least the other dock frame module 150 so as to select the variable elongated configuration and longitudinal length L of the dock frame 199 from a number of different elongated configurations and longitudinal lengths L1-L4 of the dock frame 199.

Figure 1G:
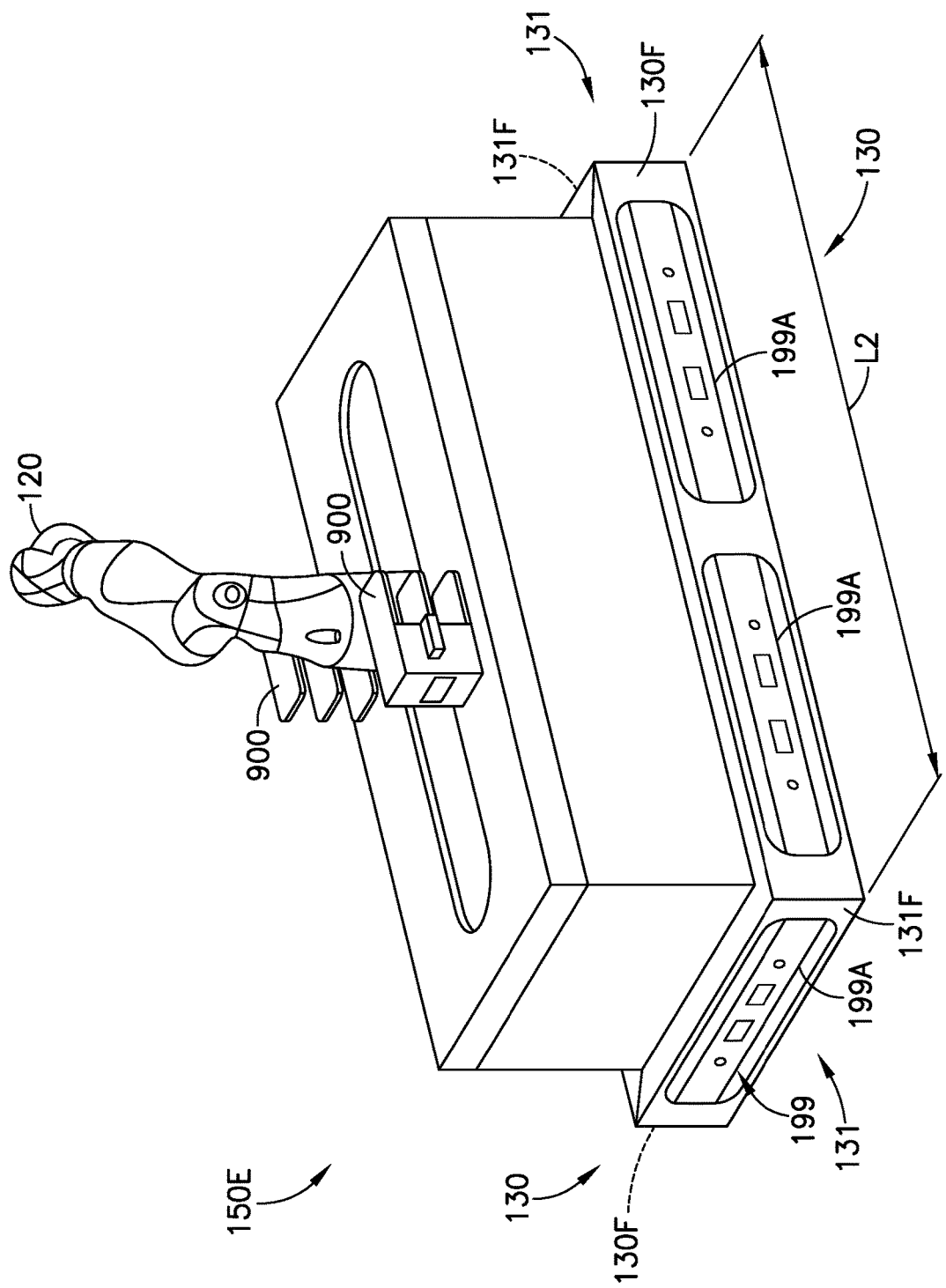

Referring also to FIGS. 1C-1E, the dock frame 199 may be configured so as to have longitudinal sides 130 (e.g. extending longitudinally or in the longitudinal direction LONG of the dock frame 199) and lateral sides 131 (e.g., extending laterally or in the lateral direction LAT of the dock frame 199). One or more of the longitudinal sides 130 and lateral sides 131 includes the docking interface 199A. For example, FIG. 1C illustrates a dock frame module 150A that includes the dock frame 199 where the dock frame 199 is configured so that the docking interface 199A is disposed on one or more of the longitudinal sides 130. FIGS. 1D and 1E illustrate dock frame modules 150B, 150C that each includes a respective dock frame 199 where the respective dock frame 199 is configured so that the docking interface 199A is disposed on one or more of the longitudinal sides 130 and one or more of the lateral sides 131. FIGS. 1F and 1G illustrate dock frame modules 150D, 150E that include the dock frame 199 where the dock frame 199 is configured with more than one docking interface 199A on one or more of the longitudinal sides 130 and lateral sides 131. For example, the dock frame module 150D includes a dock frame 199 that has three docking interfaces 199A disposed on one or more of the longitudinal sides 130. The dock frame module 150E includes dock frame 199 that includes two docking interfaces 199A disposed on one or more of the longitudinal sides 130 and one docking interface 199A disposed on one or more of the lateral sides 131. As may be realized the dock frame 199 configurations described herein are exemplary and the dock frame 199 may have any suitable number of docking interfaces 199A on each side of the dock frame 199.

The dock frame module 150, 150A-150E configurations described herein are also exemplary such that the dock frame module 150, 150A-150E may have any suitable configuration. For example, the dock frame module 150A is configured as a robot-less module that, in one aspect, may include workpiece holding stations or nests 900 (see FIG. 4B). Dock frame module 150B is illustrated as having a robot 120 (e.g., having more than three degrees of freedom, such as a six axis robot) and one or more nests 900 that are accessible by the robot 120. Dock frame module 150C is also illustrated as having a robot 120 (e.g., having at least three degrees of freedom, such as a selective compliant articulated robot arm with or without Z axis movement) and one or more nests 900 that are accessible by the robot 120. Dock station 150D is illustrated as having a sliding workstation that moves in the longitudinal direction of the dock frame 199. Here the sliding workstation includes one or more of a storage carousel 20000ES, at least one nest 900, delidding devices, regripping devices and a robot 120 (and any other suitable processing devices) that move as a unit with the sliding workstation to increase overall throughput of the processing system. Dock station 150E is illustrated as having at least one stationary nest and a sliding robot 120, where the robot moves in the longitudinal direction of the dock frame 199. It should be understood that where a robot 120 is included in the dock frame module, the robot 120 is fungible such that any suitable robot(s) may be disposed on any one or more of the dock frame modules 150, 150A-150E.

Figure 4A:
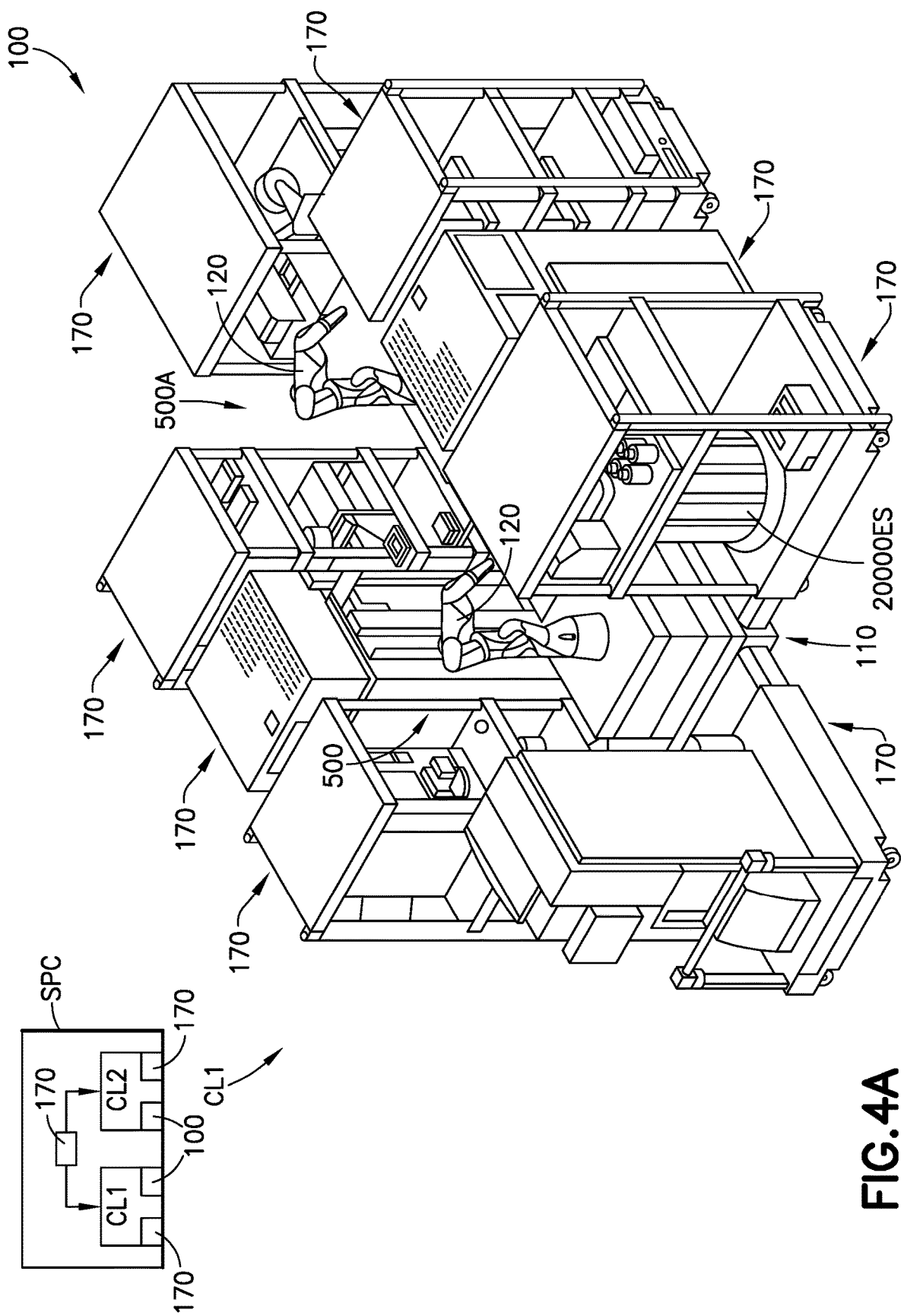
FIGS. 4A and 4B are respective isometric and plan views of the robotic processing system of FIG. 1A in yet another exemplary configuration in accordance with aspects of the disclosed embodiment.
Figure 4B:
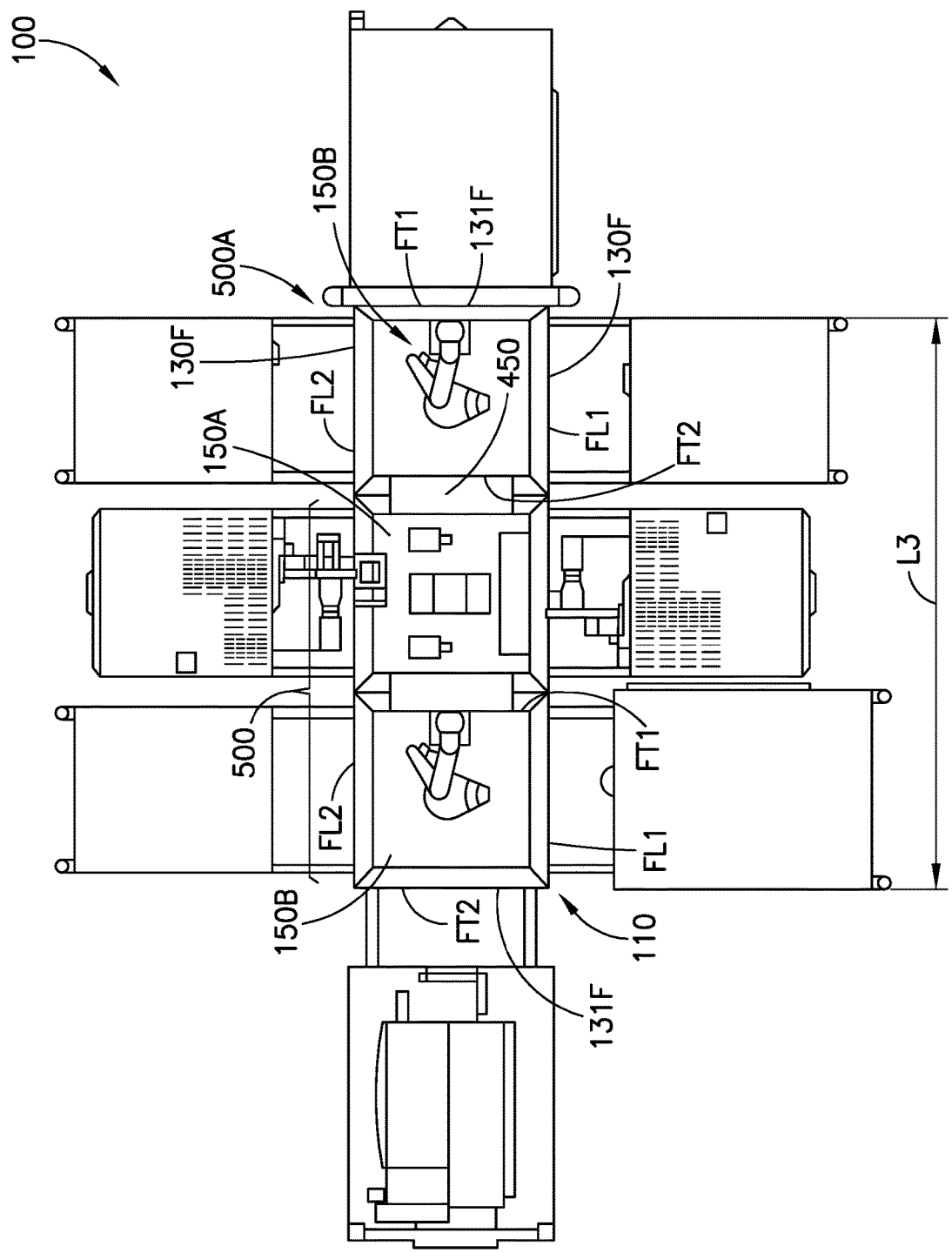
Figure 5:
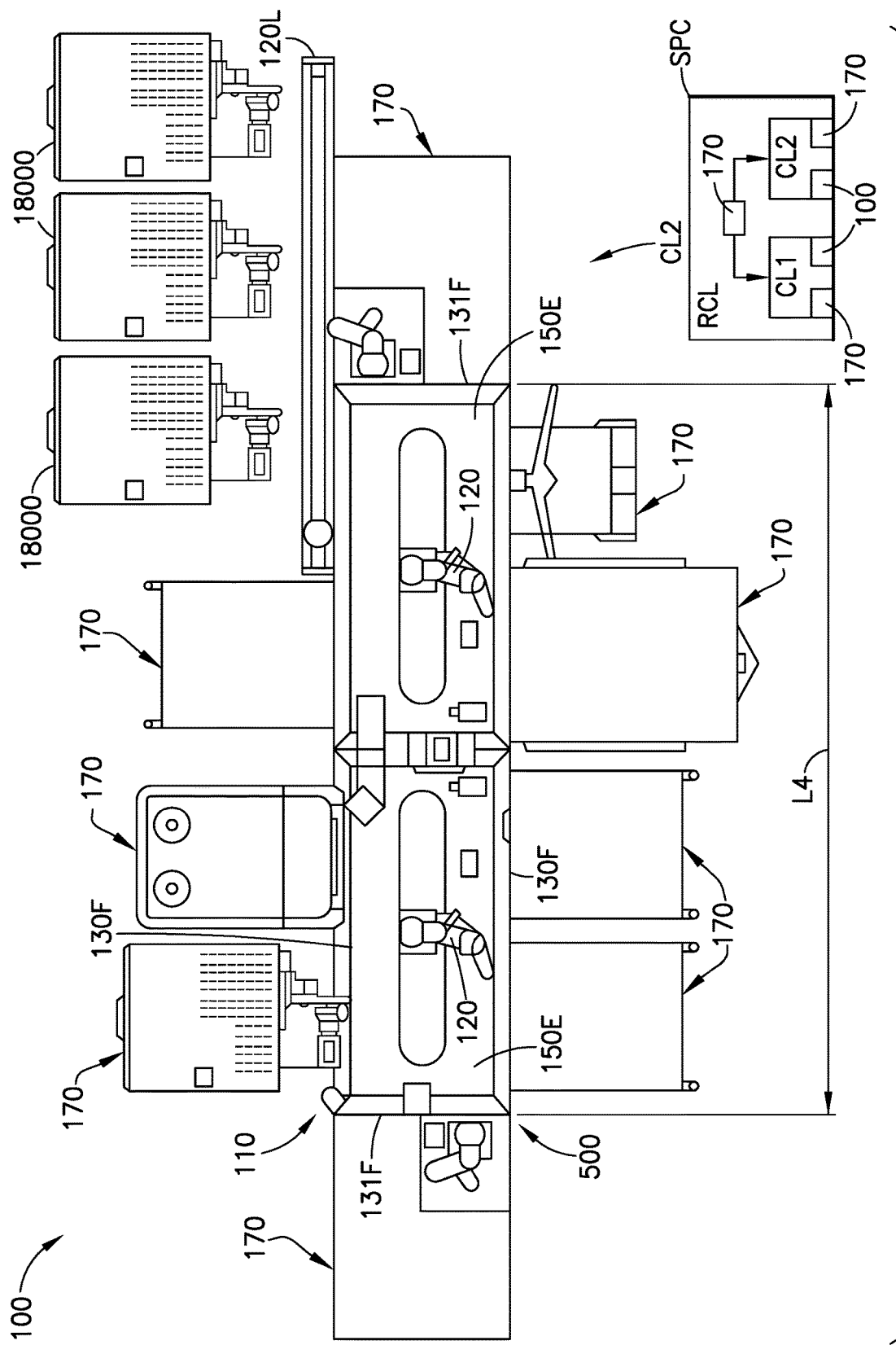
FIG. 5 is an isometric view of the robotic processing system of FIG. 1A in still another exemplary configuration in accordance with aspects of the disclosed embodiment.
Figure 9A:
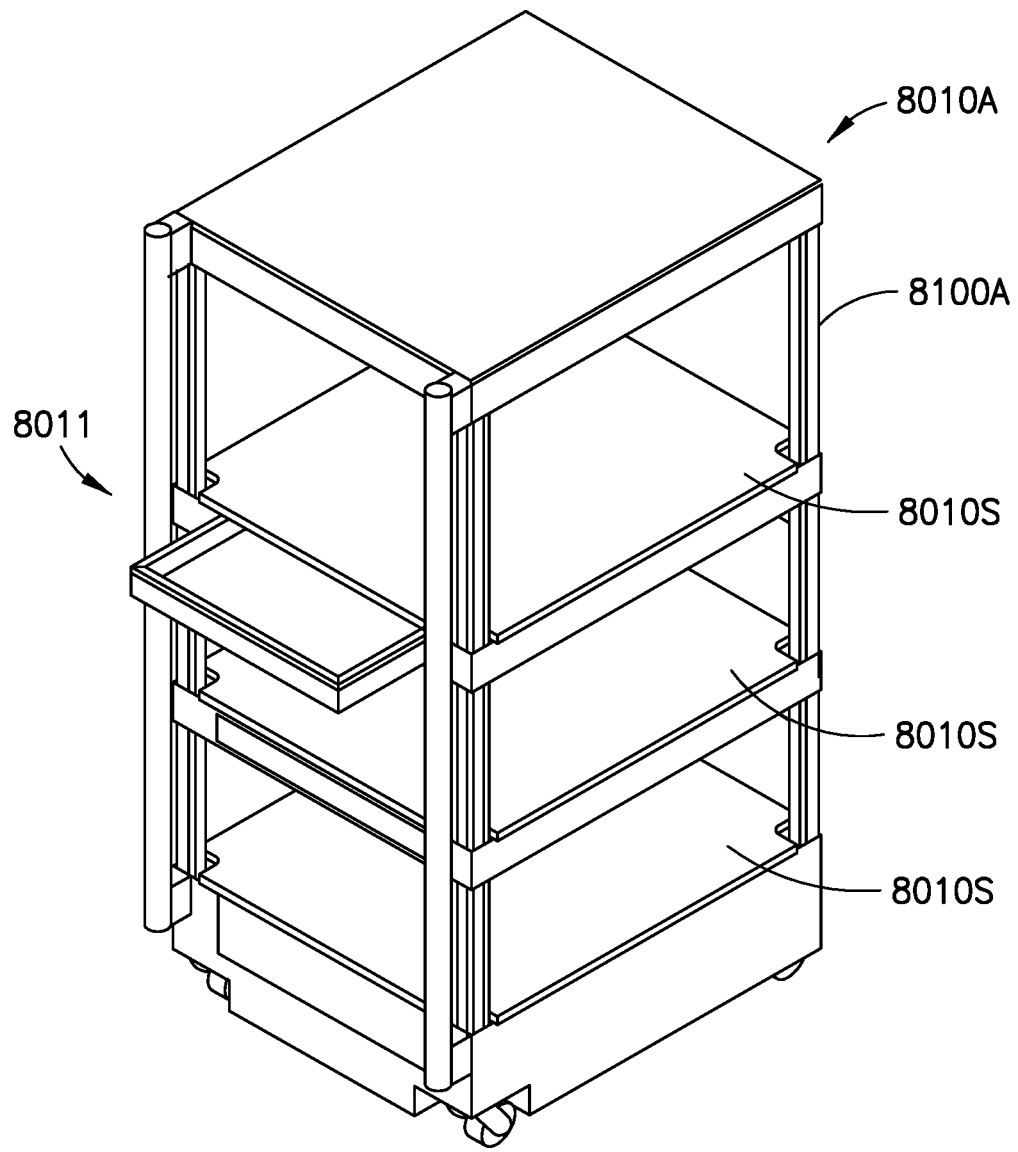
FIGS. 9A-9D are schematic illustrations of some of the exemplary interchangeable carts of FIG. 8 in accordance with aspects of the disclosed embodiment.
Figure 9B:
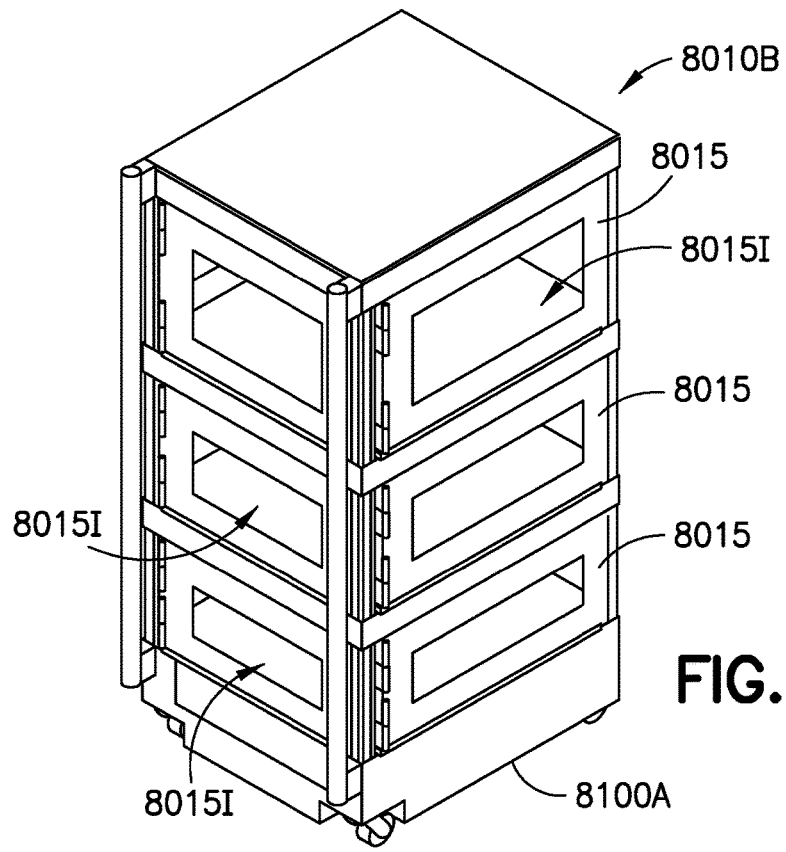
Figure 9C:
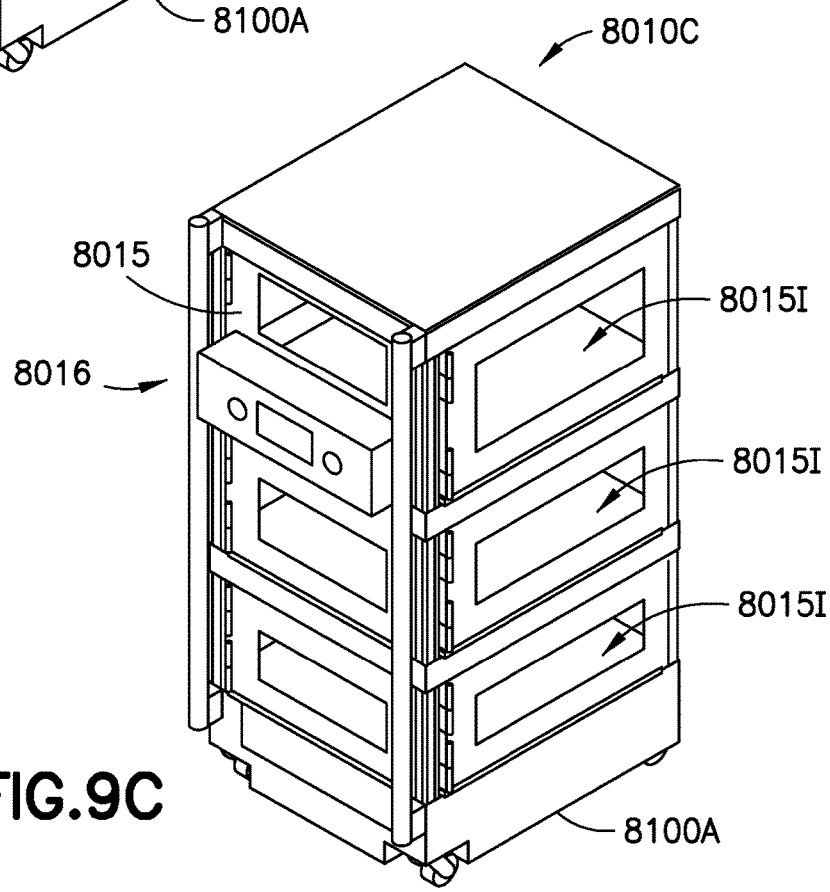
Figure 9D:
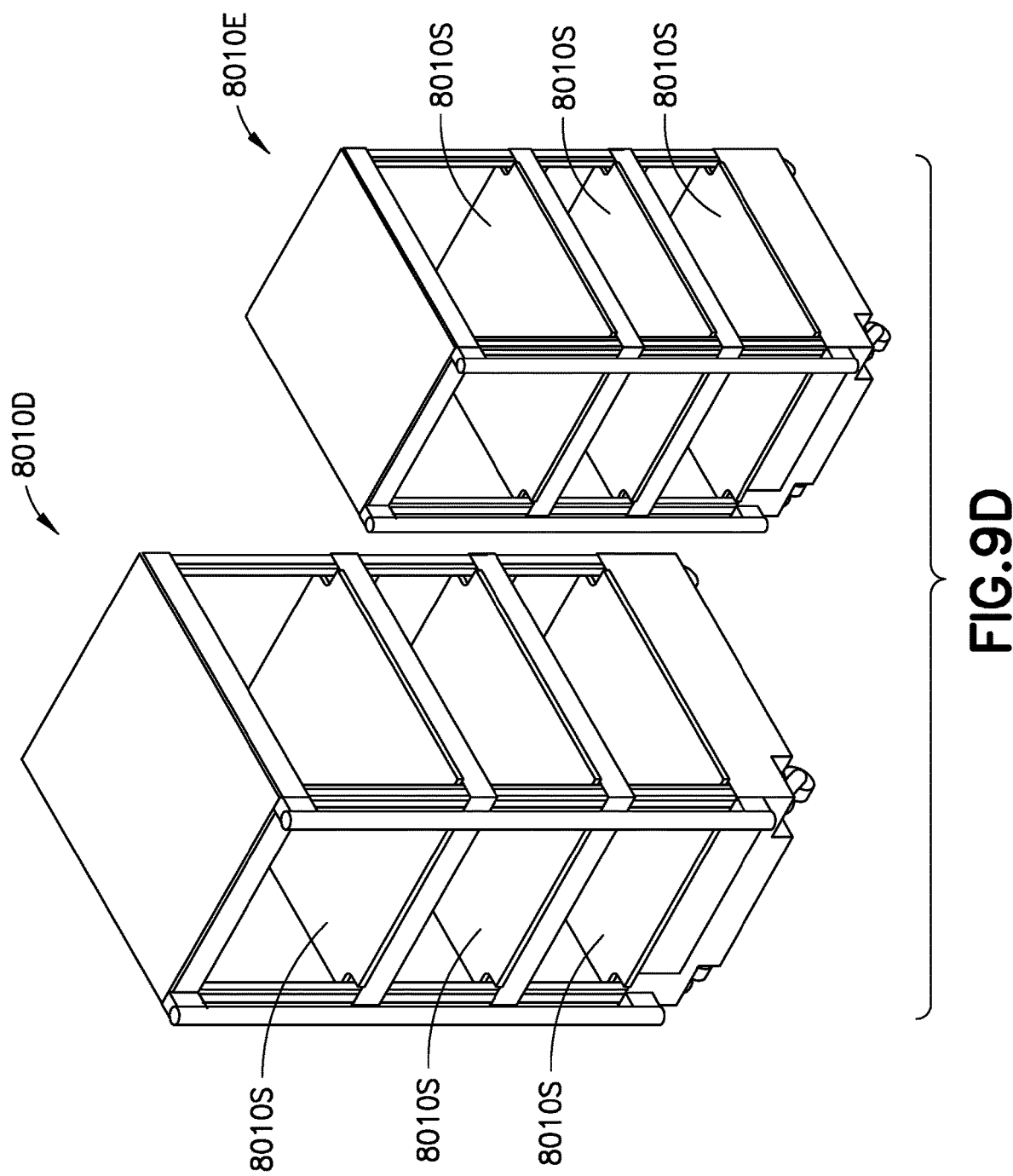

Referring also to FIG. 5, in one aspect, more than one of the at least one dock frame module 150, 150A-150D are joined together forming a coupling node assembly module 500 of the spine structure 110. Whether the robotic processing system 100 includes a single dock frame module 150, 150A-105D (which may be also be referred to as a coupling node module 500A) or a coupling node assembly module 500, each of the single dock frame module 150, 150A-105D and the coupling node assembly module 500 has at least two linearly off set facets 130F defining longitudinal sides (e.g., longitudinal extending) of the spine structure 110 along which the at least one of the laboratory instrumentation and the storage cabinet are arrayed. As described above, where more than one of the at least one dock frame module 150, 150A-150D are joined together, each facet 130F includes a corresponding one of the more dock frame modules 150, 150A-150D and the respective docking interfaces 199A. In one aspect, referring to FIGS. 4A and 4B, more than one of the coupling node assembly modules 500 (or more than one of the coupling node modules 500A, or a combination of coupling node assembly modules 500 and coupling node modules 500A) are coupled to each other in linear configuration so as to select the variably elongated configuration and longitudinal length L1-L4 of the dock frame 199, and the at least one of the laboratory instrumentation and the storage cabinet are arrayed at least along facets 130F, 131F forming at least one side of the spine structure 110. In one aspect, the coupling node assembly module 500 (and the coupling node modules 400) has hexahedron shape with opposing facets 130F, 131F, each with a dock frame module 150 with respective docking interface 199A.

Figure 2:
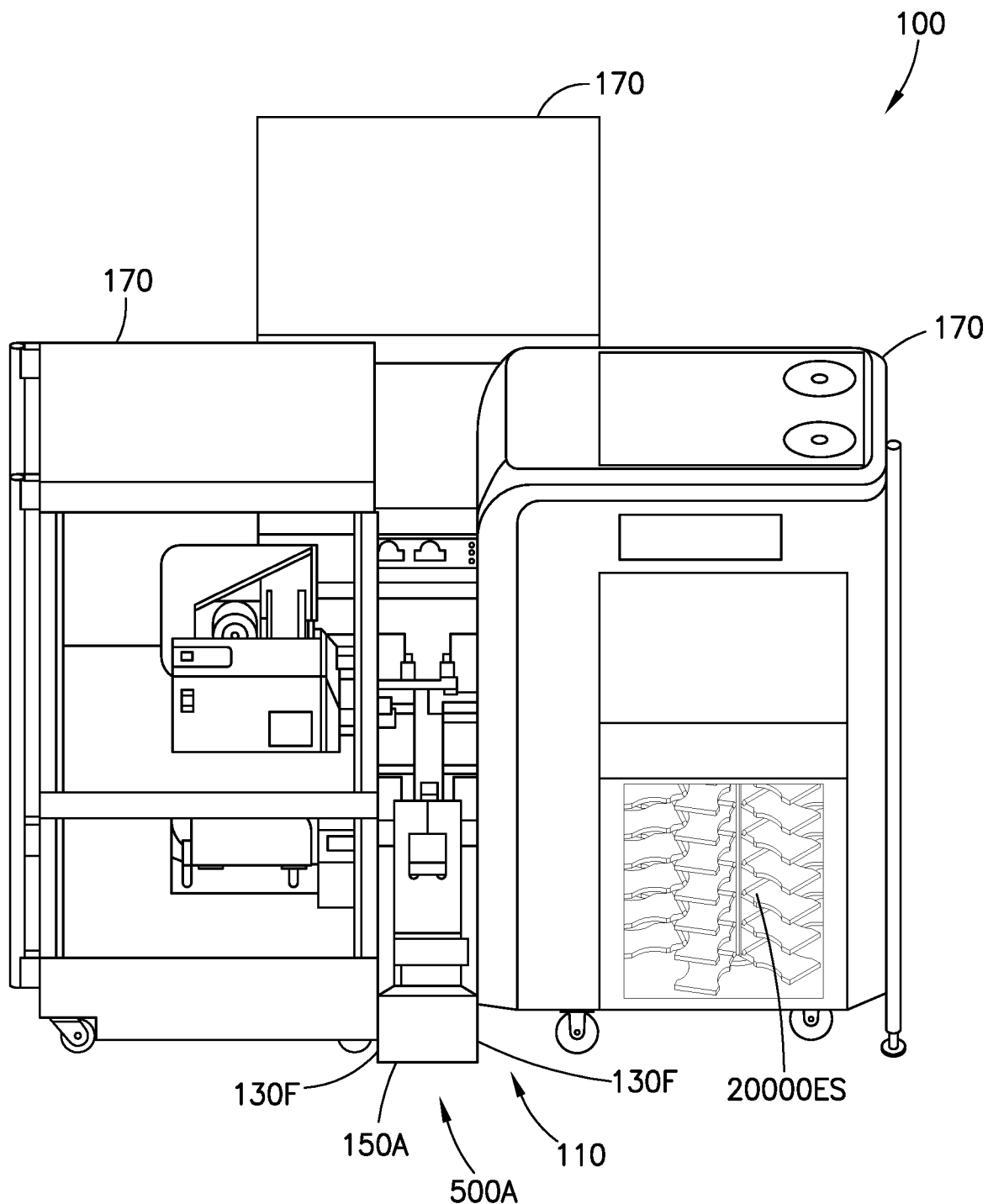
FIG. 2 is an isometric view of the robotic processing system of FIG. 1A in one exemplary configuration in accordance with aspects of the disclosed embodiment.
Figure 3:
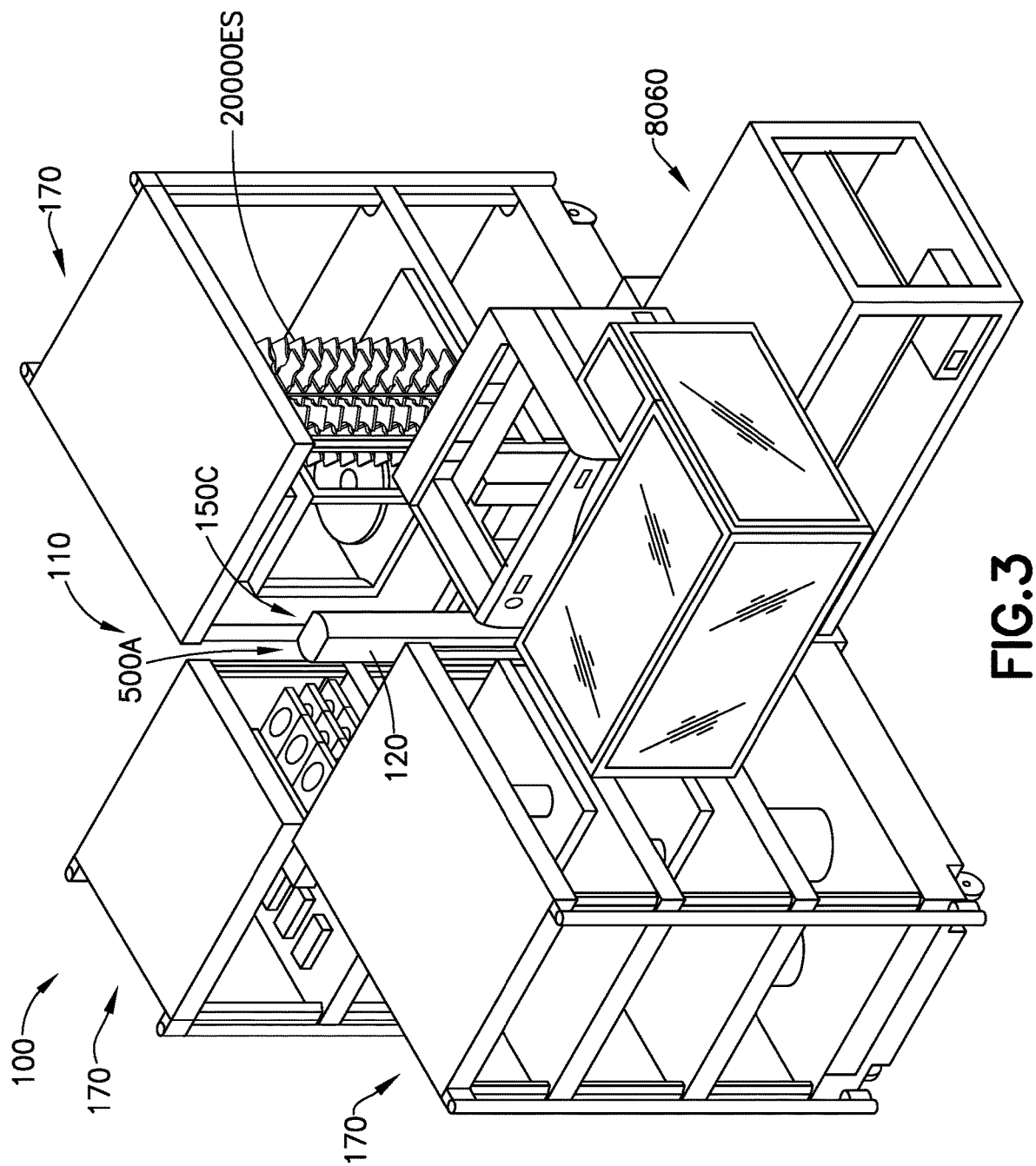
FIG. 3 is an isometric view of the robotic processing system of FIG. 1A in another exemplary configuration in accordance with aspects of the disclosed embodiment.

As an example, FIG. 2 illustrates a coupling node module 500A formed by dock frame module 150A where interchangeable mobile carts 170 are coupled to the docking interface 199A on at least facets 130F. FIG. 3 illustrates a coupling node module 500A formed by dock frame module 150C where interchangeable mobile carts 170 and table 8060 are coupled to docking interfaces on facets 130F, 131F. FIGS. 4A and 4B illustrate a coupling node assembly 500 and a coupling node 500 that are coupled to each other so that interchangeable mobile carts 170 are arrayed along facets 130F and on facets 131F. FIG. 5 illustrates a coupling node assembly 500 formed by dock frame modules 150E where interchangeable mobile carts 170 are arrayed along facets 130F and on facets 131F. Here a sliding robot 120L is also coupled to one of the facets 130F for transfer of lab ware to and from any suitable processing equipment such as storage carts 18000. FIG. 6 illustrates a coupling node module 500A formed by dock frame module 150D where interchangeable mobile carts 170 are coupled to one longitudinal side forming facet 130F. Here a storage cart 18000 is positioned adjacent facet 131F within the reach of the robot 120. FIGS. 7A and 7B illustrate a coupling node module 500A formed by dock frame module 150D where interchangeable mobile carts 170 are coupled to both longitudinal sides forming facets 130F. Here two storage carts 18000 are positioned adjacent facet 131F within the reach of the robot 120.

Referring to FIGS. 1A and 1B, as described above, each of the at least one dock frame module 150 is interchangeable with at least another dock frame module 150, and has control features 199CONT (FIG. 1) with a predetermined relationship to a reference datum 150D of the dock frame module 150 and with a reference datum 199D of the dock frame 199. In one aspect, the reference datum 199D of the dock frame may be a location established by a seating surface 199S of the dock frame 199 (e.g., on which the docking interface is seated) and the control features 199CONT (such as such as pins or apertures 199C and/or surface 199DS) of the docking interface 199S. The reference datum 150D of the dock frame module 150 may be located at any suitable location on the dock frame 150 from which operations of the dock frame 150 are referenced. For example, the reference datum 150D of the dock frame module 150 may be a mounting location of the robot 120, a mounting location of a nest 900 or other position on the dock frame module 150 from which a location of the robot 120 and/or nest 190 is determined (e.g., the robot 120 and/or nest 900 have a known spatial relationship with the reference datum 150D).

To couple one dock frame module 150 (e.g., a coupling node module 500A) to another dock frame module 150 (e.g., another coupling node module 500A) so as to form a coupling node assembly module 500, a coupling unit 450 (FIG. 4B) may be provided. The coupling unit 450 includes a first end 450E1 and a second end 450E2 each forming a docking interface 199B that reciprocally mates with docking interface 199A. For example, the docking interface 199B on each end 450E1, 450E2 has control features 199B that form a reference datum of the coupling unit 450. The control features may be disposed in a common plane so that the mating of the docking interface 199B on the first end 450E1 of the coupling unit 450 with the docking interface 199A of a first dock frame module 150 and the mating of the docking interface 199B on the second end 450E2 of the coupling unit 450 with the docking interface 199A of a second dock frame module 150 aligns the a first and second dock frame modules 150 with each other to select the variably elongated configuration and longitudinal length L1-L4 of the dock frame 110. The coupling unit 450 may also have a predetermined distance between seating surfaces 450S1, 450S2 of the docking interfaces 199B on the first and second ends 450E1, 450E2 so that the reference datums 150D of the first and second dock frame modules 150 are in predetermined known spatial relationship with one another. In other aspects the docking interfaces 199A of the dock frame modules may be configured to provide for substantially direct coupling between dock frame modules 150 in any suitable manner that effects a predetermined known spatial relationship between the reference datums 150D of the first and second dock frame modules 150. The known spatial relationship between the different dock frame modules 150 effects controlled placement of, for example, robotic slides (e.g., along which a robot 120 may traverse) or other processing equipment, on the different dock frame modules 150 so the robotic slides or other processing equipment spans across two or more of the different dock frame modules 150 in a predetermined known relationship with respect to the reference datums 150D of the different dock frame modules 150.

As described herein, the dock frame 199 has a selectably variable longitudinal length L1-L4. The selectably variable length L1-L4 is selected by adding or removing dock frame modules 150 to or from other dock frame modules 150. Here the dock frame 199, and docking interface(s) 199A included therewith, of each dock frame module 150 are arranged to provide true interchangeability between the dock frame modules 150. For example, the dock frame 199 may be provided with position and inclination control surfaces and features FL1, FL2, FT1, FT2 (represented in FIGS. 1C and 1D). In one aspect, the position and inclination control surfaces and features FL1, FL2, FT1, FT2 may be disposed on or formed by the docking interface 199A but in other aspects the position and inclination control surfaces and features FL1, FL2, FT1, FT2 may be formed by any suitable portion of the dock frame 199. The position and inclination control surfaces and features FL1, FL2, FT1, FT2 may be of any suitable kind, such as kinematic coupling features (e.g., such as control features 199CONT in the form of pins or apertures 199C and/or surface 199DS) or any other suitable relaxed coupling features that effect alignment between two components.

The position and inclination control surfaces and features FL1, FL2, FT1, FT2 are configured to repeatably position one dock frame 199 (and corresponding dock frame module 150) relative to another dock frame 199 (and corresponding dock frame module 150 (see, e.g., FIG. 4B). The position and inclination control surfaces and features FL1, FL2, FT1, FT2 are also configured to repeatably position the mobile carts 170 (such as interchangeable mobile carts 8000, 8010, 8020, 8030, 8040—see FIG. 8) and/or stationary tables or racks 8050, 8060 (see FIG. 8) to a dock frame 199 (and corresponding dock frame module 150). As noted above, coupling unit 450 (FIG. 4B) may be employed for coupling two dock frames 199 to each other and includes a docking interface 199B that reciprocally mates with docking interface 199A of the dock frame 199. The mobile carts 170 and stationary tables or racks 8050, 8060 may also include docking interfaces 199B (see, e.g., FIGS. 11A-11C). The docking interfaces 199B of the mobile carts 170 and stationary tables or racks 8050, 8060 each include position and inclination control surfaces and features FL1 similar to those described above. The docking interfaces 199B of the coupling unit 450 may also include position and inclination control surfaces and features FT1, FT2 substantially similar to those described above.

As an example, the position and inclination control surfaces and features 199CONT of the docking interface 199A on the dock frame 199 defines a positioning reference basis/datum 199D of the dock frame 199 and the mating interface 199B of the coupling unit 450, or mobile carts 170, and/or stationary tables or racks 8050, 8060 interfaces with the docking interface 199A to locate the coupling unit 450, or mobile carts 170, and/or stationary tables or racks 8050, 8060 and provide the coupling unit 450, or mobile carts 170, and/or stationary tables or racks 8050, 8060 with a kinematic (or relaxed) pose to repeatably position the coupling unit 450, or mobile carts 170, and/or stationary tables or racks 8050, 8060 relative to the dock frame 199.

In one aspect, each of the mobile carts 170 includes one or more datum surfaces or features (such as those of the docking interface 199B described above) that are in a known spatial relationship with a sensor (or other detectable feature) of a respective mobile cart 170. In one aspect, the features (such as robotic transport arms, workpiece holding stations and any other instrumentation/equipment) of each mobile cart 170 are in a known relationship with the one or more datum surfaces or features where the robotic processing system 100 may include a device or tool for sending a signal indicating the position of the mobile cart features to the dock frame module 150 as described in, for example, United States Patent Publication No. 2011/0270445 A1, the disclosure of which is incorporated herein in its entirety. Here the docking interface 199B of the mobile carts 170 substantially automatically sets a position of the mobile carts 170 relative to the device or tool (such as the dock frame 199 and corresponding dock frame module 150). The stationary tables or racks 8050, 8060 may be similarly configured where the table support surfaces or supports of the racks are in a predetermined known spatial relationship with the docking interface 199B so that the docking interface 199B of the stationary tables or racks 8050, 8060 substantially automatically sets a position of the stationary tables or racks 8050, 8060 relative to the device or tool (such as the dock frame 199 and corresponding dock frame module 150).

The predetermined known spatial relationships between the processing components disposed on the dock frame modules 150, the coupling unit 450, mobile carts 170, and stationary tables or racks 8050, 8060 with respect to their respective docking interfaces 199A, 199B true interchangeability between these components and substantially automatically sets a position of one component relative to another upon coupling of the docking interfaces 199A, 199B. In one aspect, the docking interfaces 199A, 199B include provisions for substantially automatically connecting air, gases, communication and power between the dock frame 199 and other dock frames 199, coupling units 450, mobile carts 170, and stationary tables or racks 8050, 8060. In one aspect, the signal indicating the position of the mobile cart 170 (or stationary tables or racks 8050, 8060, or coupling unit 450) features described above may be communicated to the dock frame 199 through the coupling of the docking interface 199A, 199B so that a presence of the respective component (and any processing equipment thereon) is communicated to the processing equipment of the dock frame module 150 (e.g., automatic registration of the cart, etc. and the processing equipment thereon with the dock frame module and the processing component located thereon).

In one aspect, referring to FIG. 1A, the robotic processing system 100 includes any suitable control system 157 for operating the processing equipment within the robotic processing system 100. In one aspect, the control system 157 is formed by one or more of the dock frame controllers 157D, robot controllers 157R, storage carousel controllers 157S, cart controllers 157C, and any other suitable controller of any suitable processing equipment that forms a part of the robotic processing system 100. The different controllers of the control system 157 may be ganged controllers having control modules that are communicably coupled to each other through, for example, a controller area network (CAN) bus architecture where the connectivity between controllers (at least for the different dock frame modules 150, mobile carts 170, stationary tables 8050, stationary racks 8060, and coupling unit 450) is provided by the coupling of the docking interfaces 199A, 199B of the respective components. In one aspect, the coupling unit 450 may be pass through module without a controller where air, gases, communication and power is passed through the coupling unit 450 without being affected by the coupling unit 450.

The robotic processing system 100 may also be provided with a common power supply 158, a common air supply 156, and/or a common gas supply 159. For example, one or more of the common power supply 158, common air supply 156, and common gas supply 159 may be coupled to a dock frame module 150 of the robotic processing system 100, such as through a docking interface 199A or other suitable couplings. The power, air, and/or gas may be supplied throughout the spine structure 110 formed by the dock frames 199 (e.g., from docking module to docking module) through the couplings formed by the docking interfaces 199A. The power, air, and/or gas may also be supplied to the mobile carts 170, and stationary tables or racks 8050, 8060 coupled to the spine structure 110 through couplings formed between the docking interfaces 199A of the dock frame modules 150 and the respective docking interfaces 199B of the mobile carts 170, and stationary tables or racks 8050, 8060.

Referring to FIGS. 1A and 1B, the docking interfaces 199A, 199B provide for zero footprint docking (e.g., one component may be abutted substantially directly against another component when docked). In other aspects, referring to FIGS. 34A-34C, the docking interfaces 199A' may be substantially similar to that described in U.S. Pat. No. 8,734,720 titled "AUTOMATED TESTING SYSTEM ARRANGEMENTS USING DOCKING STATION," issued on May 27, 2014, the disclosure of which is incorporated by reference in its entirety. Referring to FIGS. 1A, 1B, and 34A-34C, One or more of the docking interfaces 199A, 199B, 199A' may be extendable (docking interfaces 199A, 199A' are shown as being extendable in FIGS. 1B and 34A-34C for exemplary purposes). For example, the docking interface 199A may include a seating surface interface member 199A1 and a component interface member 199A2 that are movable relative to each other in direction 177 (see FIG. 1B) so that the seating surface interface member 199A1 and component interface member 199A2 move towards and away from each other. Similarly, the docking interface 199A' may include a seating surface interface member 199A1' (e.g., that may establish a datum plane/surface (such as similar to datum surface 199S), be part of a spine structure 110 or dock frame 199 datum/datum plane, or have a known relationship with the spine structure 110 or the dock frame 199 datum/datum plane for locating the docking interface 199A' relative to one or more of the dock frame 199, the spine structure 110 and/or a dock frame module 150) and a component interface locating member 199A2' (illustrated in FIGS. 34A-34C as an end plate of the docking interface 199A' but in other aspects, may be any suitable features having a known spatial relationship with a cart coupled to the docking interface) that are movable relative to each other in direction 177 (see FIG. 34C) so that the seating surface interface member 199A1' and component interface locating member 199A2' move towards and away from each other. Any suitable guiding members 199G may be provided so that the movement between the seating surface interface member 199A1 and the component interface member 199A2 and between the seating surface interface member 199A1' and the component interface locating member 199A2' is a controlled guided movement so as to maintain a known predetermined spatial relationship between the control features 199CONT disposed on the component interface member 192A2'/component interface locating member 199A2' and the datum surface 199S of the dock frame 199 (and the datum established thereby) so that the repeatable positioning of the robotic processing system 100 components is maintained in the manner described above. In one aspect, the guiding members may be a scissors type guiding member 199G1 (FIG. 1B), linear slides 199G2 FIGS. 34A-34C), pistons, etc. In one aspect, relative movement between the seating surface interface member 199A1 and the component interface member 199A2/component interface locating member 199A2' may be biased so that the seating surface interface member 199A1 and the component interface member 199A2 are biased together or biased apart. In other aspects the relative movement between the seating surface interface member 199A1 and the component interface member 199A2/component interface locating member 199A2' may be manual so as to manually adjust the distance between the seating surface interface member 199A1 and the component interface member 199A2/component interface locating member 199A2'. Providing an extendable docking interface 199A, 199A', 199B provides for spacing of one or more of the mobile carts 170, and stationary tables or racks 8050, 8060 at optimal distances to suit a predetermined laboratory process (see, e.g., FIG. 1 where the mobile cart 17 is configured as a storage cart having laboratory equipment holders and a robot extending therefrom and a position of the laboratory equipment holders and robot is set using the extendable docking interface 199A).

Referring now to FIGS. 8-19, interchangeable (also referred to as universal) carts 170, such as carts 8000, 8010, 8020, 8030, 8040, having different configurations are illustrated. In one aspect, the interchangeable carts 8000, 8010, 8020, 8030, 8040 each include a frame 8100 having the mating docking interface 199B. As described herein, the docking interface 199B is configured to interface with the docking interface 199A of a dock frame module 150 (or in other aspects another interchangeable cart 170, rack 8050 or table 8060) and may include any suitable electrical connections, fluid couplings, kinematic couplings, etc., for registering and providing, e.g., power, air, water, etc. to the interchangeable carts 8000, 8010, 8020, 8030, 8040.

In one aspect, one or more third-party component 8999 (i.e., a high throughput screening reader, a microplate reader, a high content imaging system, a plate sealer, a plate peeler, a washer, a dispenser, robots, etc. as illustrated in the Figs.) and or OES components (such as the storage carousel 20000ES, robots, or any other OES supplied processing equipment as illustrated in the Figs.) may be disposed on one or more of the interchangeable cart 8000, 8010, 8020, 8030, 8040 so that each interchangeable cart 8000, 8010, 8020, 8030, 8040 supports the one or more third party components 8999 and/or OES components disposed thereon. In one aspect, the interchangeable carts 8000, 8010, 8020, 8030, 8040 may be pre-configured (i.e., wiring, piping, etc.) to provide electrical power, fluid, air, gas, etc. from the docking interface 199B to the third party components 8999 and/or OES components disposed on the respective interchangeable carts 8000, 8010, 8020, 8030, 8040. In one aspect, the interchangeable carts 8000, 8010, 8020, 8030, 8040 may be constructed of any suitable material, such as sheet metal, plastic, etc., or any suitable combination thereof.

As noted above, each of the interchangeable carts 8000, 8010, 8020, 8030, 8040 may have a different configuration. For example, in the aspect the frame 8100 may be a standardized or common frame 8100S (see FIG. 8) that is common to all cart configurations so that the carts are modular and built off of the common frame 8100S. For example, the common frame 8100S, may form a base for modular components (e.g., shelves, robots, nests, push handles, etc.) of a respective cart and may include any suitable coupling/attachment points 8101 for attaching interchangeable modular cart attachments (having features substantially similar to those described below with respect to the stand-alone carts) to the common frame 8100S.

In other aspect, each interchangeable cart 8000, 8010, 8020, 8030, 8040 may be a stand-alone cart having a different configuration as described herein, where a different frame 8100 is provided for each of the different configurations. For example, referring to FIGS. 9A-9D, the universal cart 8010A may include a frame 8100A having multiple shelves 8010S coupled to the frame 8100A for supporting any suitable processing equipment, such as the third party and OES equipment described herein. In this aspect, the universal cart 8010A is illustrated as having an "open" cart configuration (i.e., cart 8010A has shelves stacked one above the other with no walls/doors or enclosures such that any suitable lab ware may be freely picked from and/or placed on the multiple shelves 8010S). In one aspect, the cart 8010A may include a fixed tray 8011 configured to support, e.g., various laboratory instruments/supplies thereon. In another aspect, the universal cart 8010B may have a "sealed" or "closed" configuration including any suitable doors 8015 to seal or close the multiple shelves 8010S (i.e., an interior 8015I is formed between each shelf of the multiple shelves 8010S). In yet another aspect, the universal cart 8010C may further include any suitable filter 8016, such as a HEPA filter, coupled to, e.g., the frame 8100A to filter the interior 8015I. The universal cart 8010 may be configured to any desired size. For example, the universal cart 8010D may have a large configuration (i.e., either a large length, width, or both) or the universal cart 8010E may have a small configuration (i.e., either a small length, width, or both) depending on the desired size.

Figure 10:
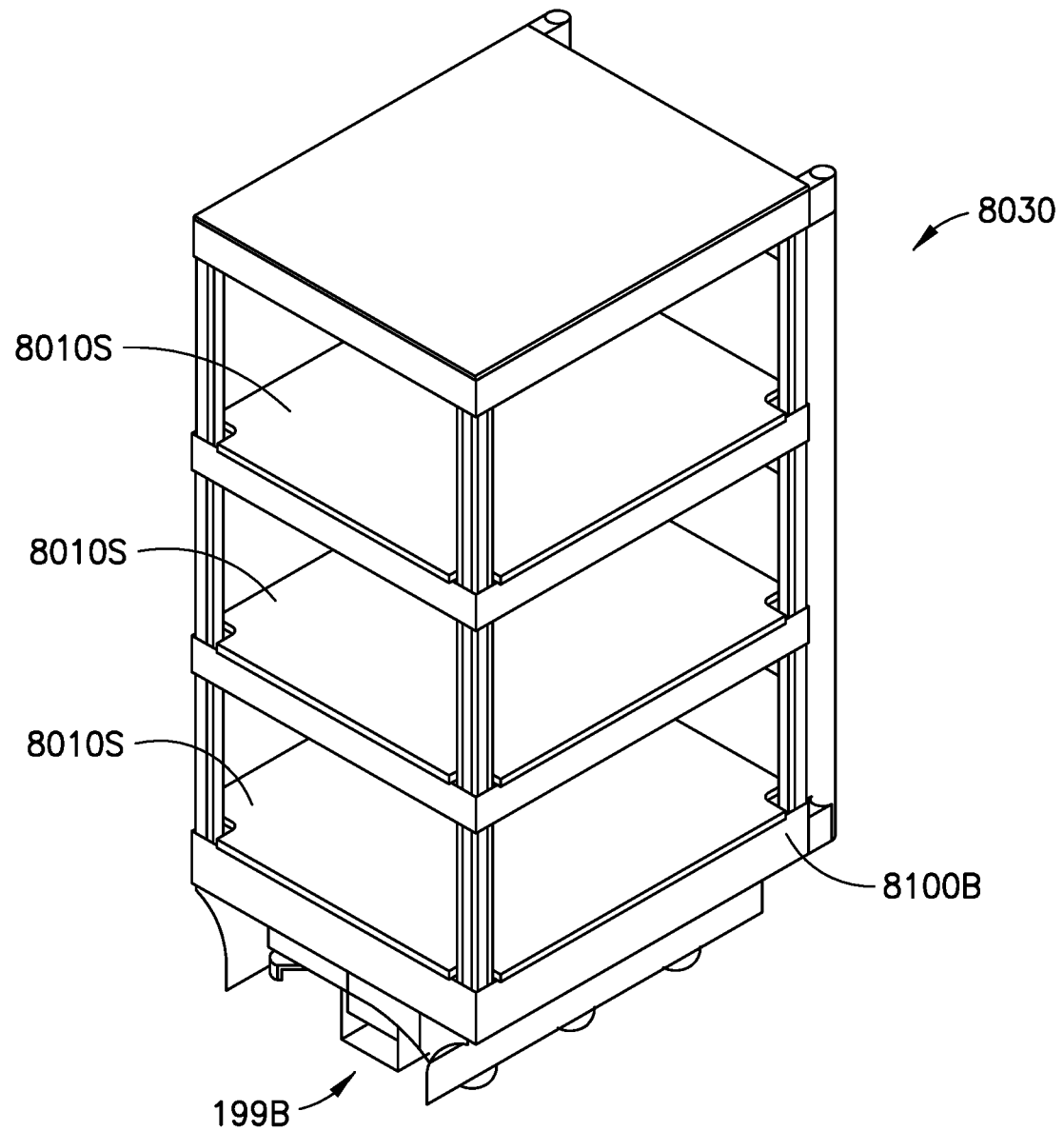
FIG. 10 is a schematic illustration of one of the interchangeable carts of FIG. 8 in accordance with aspects of the disclosed embodiment.

Referring now to FIG. 10, in another configuration, the interchangeable cart 8030 may have an MIR cart configuration. The interchangeable cart 8030 includes a frame 8100B and multiple shelves 8030S. The frame 8100B may be configured to interface with an autonomous drive section, as further described below, to autonomously drive or move the interchangeable cart 8030 to any desired location in the facility space SPC (FIG. 1).

Referring now to FIGS. 11A-11D, the interchangeable carts 8000A, 8000B, 8000C, 8000D may include a frame 8100C, multiple shelves 8000S and any suitable robot arm 120 (such as those described herein) thereon. In one aspect, each of the interchangeable carts 8000A, 8000B, 8000C, 8000D may have an open cart configuration including the multiple shelves 8000S having any suitable configuration. For example, the multiple shelves 8000S may have a full shelf configuration 8000FS, a partial shelf configuration 8000PS, or any combination thereof. The shelves are also arranged/configured to provide operating space for the robot 120. In other aspects, the multiple shelves 8000S of the interchangeable carts 8000A, 8000B, 8000C, 8000D may be spaced close together or further apart (e.g., the vertical pitch of the shelves) to provide for more or less vertical space for the various components 8999 stored thereon. As may be realized, the interchangeable carts 8000A, 8000B, 8000C, 8000D may include any of the features described above with respect to interchangeable carts 8010-8010E, such as including doors 8015, filters 8016, etc.

Referring now to FIG. 12, another interchangeable cart configuration is illustrated. Here, the interchangeable cart 8020A-8020C may include frame 8100D which has a single flat surface (i.e., the interchangeable carts 8020A-8020C do not include stacked shelves) configured to transport, e.g., large components such as storage carousel 20000ES (see cart 8020A), any suitable lab ware reader equipment (see cart 8020B), and any suitable lab ware or sample imaging equipment (see cart 8020C).

Figure 15:
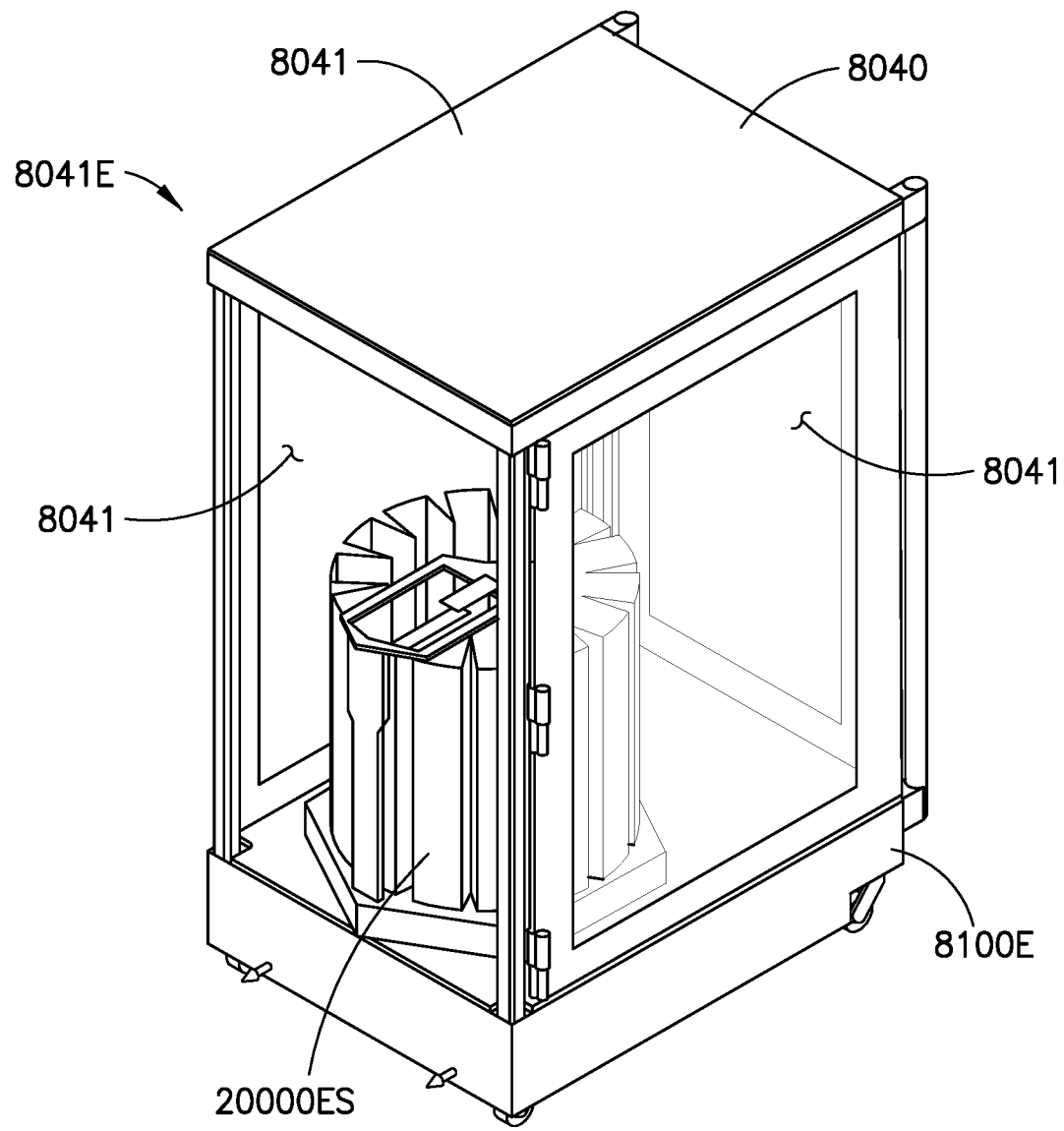
FIG. 15 is a schematic illustration of one of the interchangeable carts of FIG. 8 in accordance with aspects of the disclosed embodiment.

Referring now to FIG. 15, in one aspect, the interchangeable cart 8040 may be substantially similar to interchangeable cart 8020A-8020C but have an enclosed cart configuration. For example, the interchangeable cart 8040 may include a frame 8100E and may be "fully" or "partially" enclosed by, for example, walls/doors 8041 of the cart 8040. The enclosure 8041E formed by the walls/doors 8041 may be configured to house any suitable component or processing equipment, such as, a storage carousel 20000ES described herein in an enclosed environment. In one aspect, the environment within the enclosure 8041E may be a controlled environment. The enclosure 8041E may be configured with any suitable apertures configured to allow picking and placing lab ware to and from the storage carousel 20000ES or other processing equipment disposed therein.

Referring now to FIGS. 13A-13E, a collaborative workspace cart 13000 is illustrated. The collaborative workspace cart may have a configuration substantially similar to that described in, for example, U.S. Pat. Application No. 62/625, 796 titled "AUTO-NAVIGATING ROBOTIC PROCESSING VEHICLE," filed on Feb. 2, 2018, and U.S. patent application Ser. No. 62/625,796 titled "AUTO-NAVIGATING ROBOTIC PROCESSING VEHICLE," the disclosures of which are incorporated by reference herein in their entireties. For example, the collaborative workspace cart may include a carriage frame 13000F having a robot arm 120 mounted thereon. The robot arm 120 may include an arm end 13001 with at least one independent degree of freedom with respect to the carriage frame 13000F, and configured to couple with one of a selection of end effectors 13001A-B disposed on the cart 13000. The carriage frame 13000F is configured to support, e.g., any of the third party and/or OES components described herein, such as the storage carousel 20000ES, nests, pipette heads, etc. The end effector 13001 of the robot arm 120B may be configured to interface with the components supported on the carriage frame 13000F. The collaborative workspace cart 13000 is generally movable and may include an autonomous drive section 13010 that is separable from the collaborative workspace cart 13000 such that a coupling engagement is formed between the collaborative workspace cart 13000 and the autonomous drive section 13010 when the collaborative workspace cart 13000 is moved by the drive section 13010. In other aspects, the collaborative workspace cart may be manually carted throughout the facility space SPC.

Figure 14:
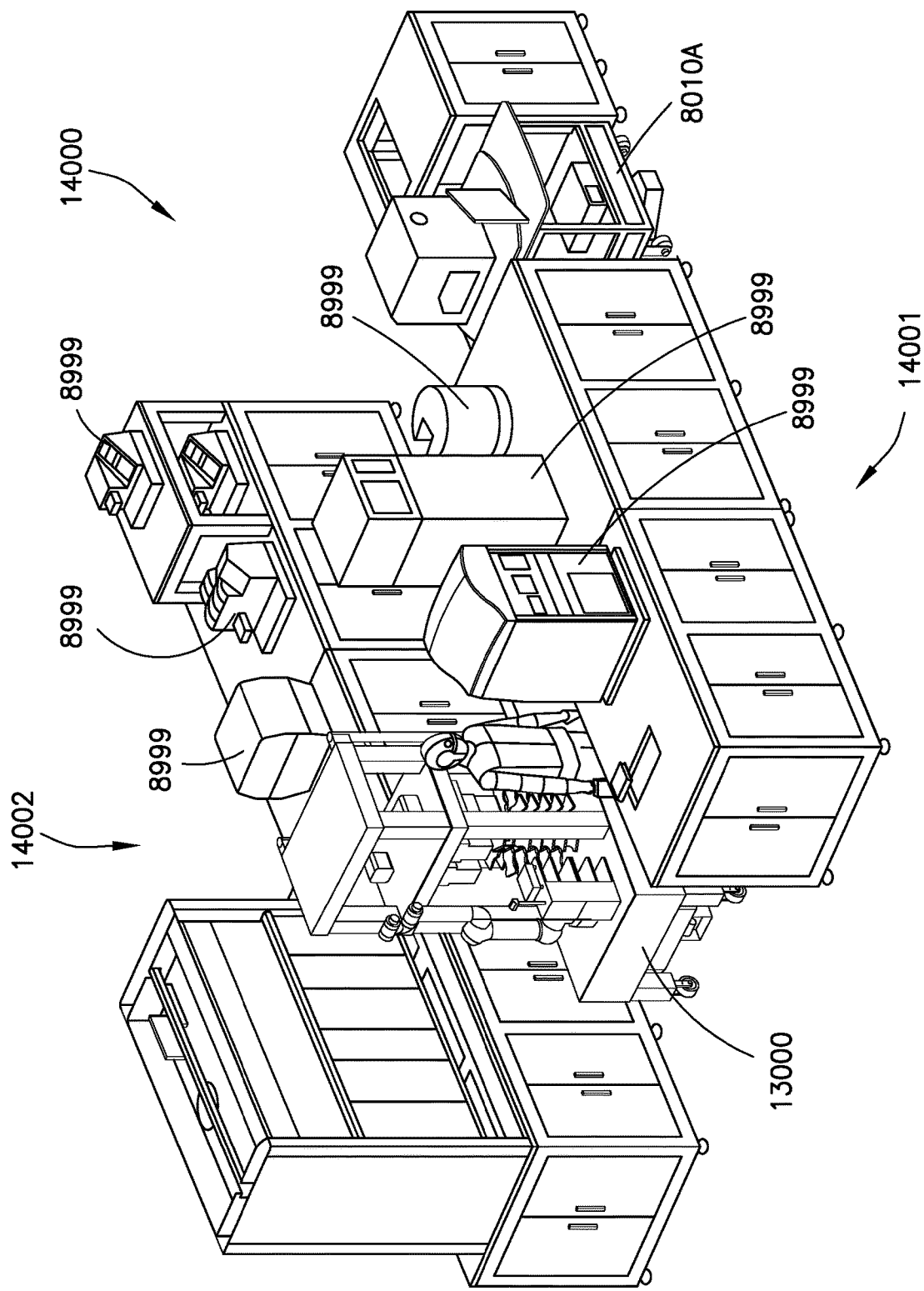
FIG. 14 is a schematic illustration of an exemplary collaborative workspace in which aspects of the disclosed embodiment may be employed.

Referring also to FIG. 14, as noted above the facility space SPC may be or include a collaborative workspace 14000. The collaborative workspace 14000 may be substantially similar to that described in, for example, U.S. Pat. Application No. 62/625,796 and U.S. patent application Ser. No. 62/625,796 previously incorporated by reference herein in their entireties. The collaborative workspace 14000 includes linearly arranged processing stations 14001, 14002 (which in one aspect may be similar to the robotic processing systems described herein) with one or more third party or OES component disposed thereon. Any one of the interchangeable carts 8000, 8010, 8020, 8030, 8040 and the workspace cart 13000 may be operate within or upon in the collaborative workspace 14000.

Figure 17:
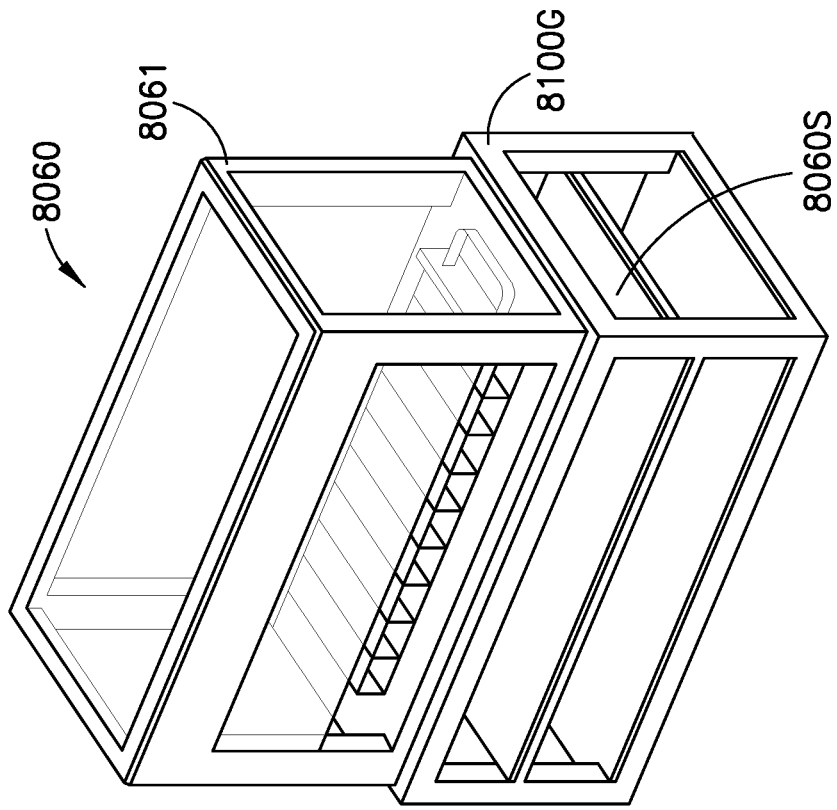
FIG. 17 is a schematic illustration of another exemplary interchangeable table of FIG. 8 in accordance with aspects of the disclosed embodiment.
Figure 16:
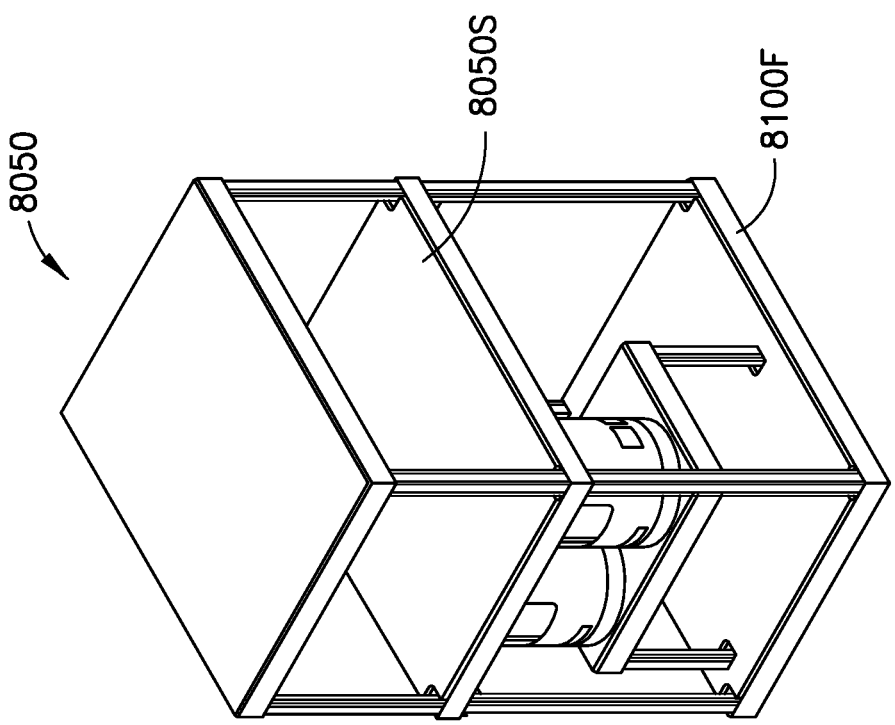
FIG. 16 is a schematic illustration of an exemplary interchangeable table of FIG. 8 in accordance with aspects of the disclosed embodiment.

Referring now to FIGS. 16 and 17, a universal stationary table 8050 (upon which any suitable processing equipment may be placed) and a pipette table 8060 are illustrated. The stationary table 8050 includes a frame 8100F and one or more shelves 8050S. The stationary table 8050 may have a configuration substantially similar to carts 8010A-8010E described with respect to FIGS. 9A-9D, however the stationary table 8050 is not mobile and may be supported by any suitable legs or leveling feet. The pipette table 8060 includes a frame 8100G configured to support pipetting equipment 8061 thereon. The pipette table 8060 may include one or more shelves 8060S for storing, e.g., any suitable lab ware or laboratory equipment.

Figure 35:
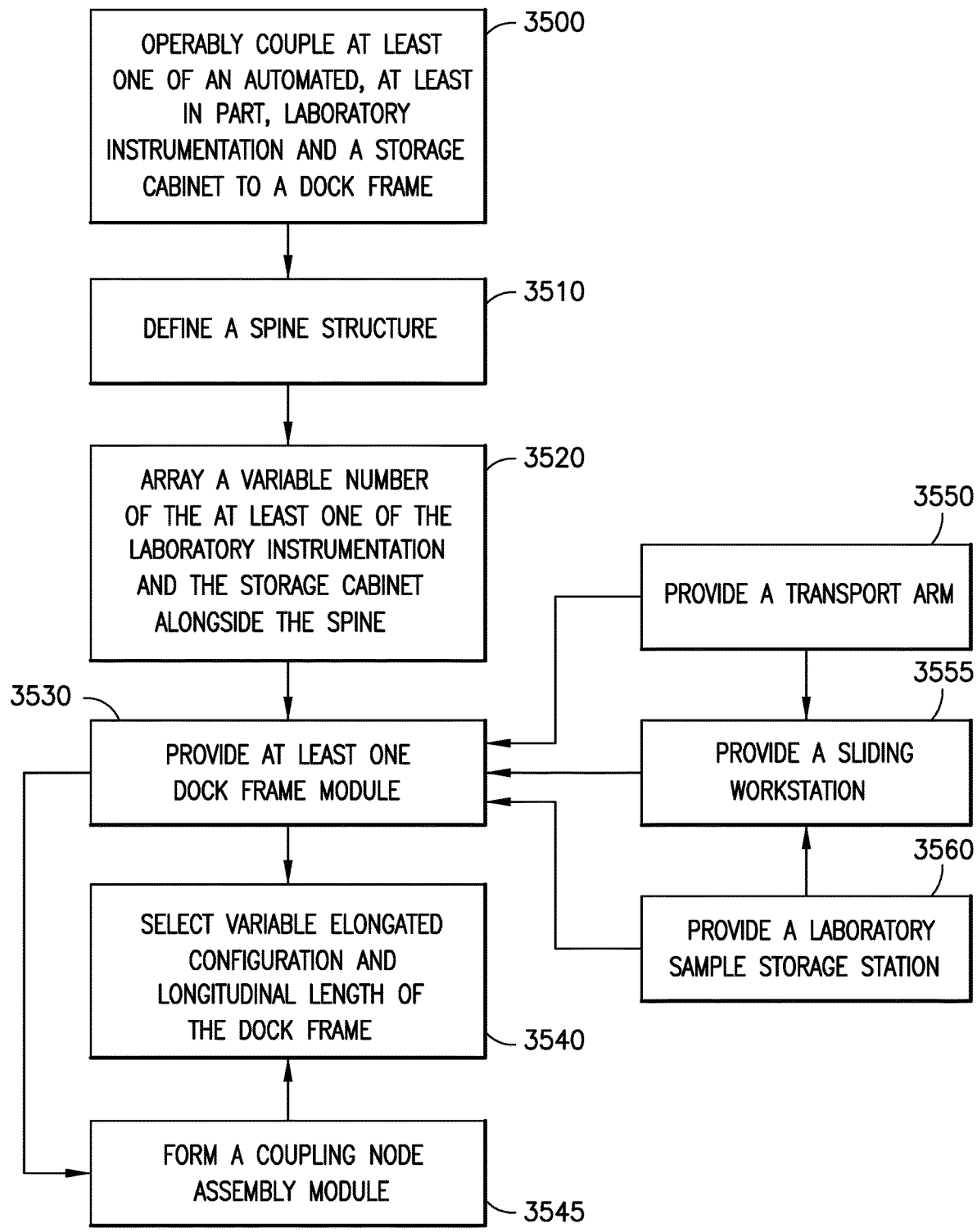
FIG. 35 is an exemplary flow diagram of a method in accordance with aspects of the disclosed embodiment.

Referring now to FIGS. 1A-8 and 35 an exemplary method for automated laboratory testing or storage of a biological or chemical sample will be described. The method includes operably coupling at least one of an automated, at least in part, laboratory instrumentation and a storage cabinet see the interchangeable carts, tables and racks and the instrumentation provided thereon as described herein with respect to FIGS. 8-13E, 15-21) to a dock frame 199 (FIG. 35, Block 3500) via a docking interface 199A of the dock frame 199 so that the dock frame 199 is coupled to an interfaced with the laboratory instrumentation and the storage cabinet. A spine structure 110 of an automated processing system is defined with the dock frame 199 (FIG. 35, Block 3510) and a variable number of the at least one of the laboratory instrumentation and the storage cabinet are arrayed alongside the spine structure 110 (FIG. 35, Block 3520), where the dock frame 199 extends longitudinally and has a selectably variable elongated configuration with a selectably variable longitudinal length L1-L4. At least one dock frame module 150 is provided (FIG. 35, Block 3530), including the docking interface 199A, where each of the at least one dock frame module 150 is interchangeable with at least another dock frame module 150, and has control features 199CONT with a predetermined relationship to a reference datum 150D of the dock frame module 150 and with a reference datum 199D of the dock frame 199, formed of more than one of the at least one dock frame module 150 and relating the dock frame 199 to each of the more than one dock frame modules 150, so that the at least one dock frame module 150 is interchangeably coupled in linear configuration with at least the other dock frame module 150 and/or a cart 170 so as to select the variable elongated configuration and longitudinal length L of the dock frame 199 (FIG. 35, Block 3540) from a number of different elongated configurations and longitudinal lengths L1-L4 of the dock frame 199. In one aspect, more than one of the at least one dock frame module 150 are joined together forming a coupling node assembly module 500 (FIG. 35, Block 3545) of the spine structure 110, with at least two linearly offset facets 130F defining longitudinal sides of the spine structure 110 along which the at least one of the laboratory instrumentation and the storage cabinet are arrayed, each facet 130F including a corresponding one of the at least one dock frame module 150, 150A-150D and respective docking interfaces 199A. In one aspect, the dock frame module 150 is provided with a transport arm 120 (FIG. 35, Block 3550), a sliding workstation (FIG. 35, Block 3555), and/or a laboratory storage station (FIG. 35, Block 3560).

Figure 18:
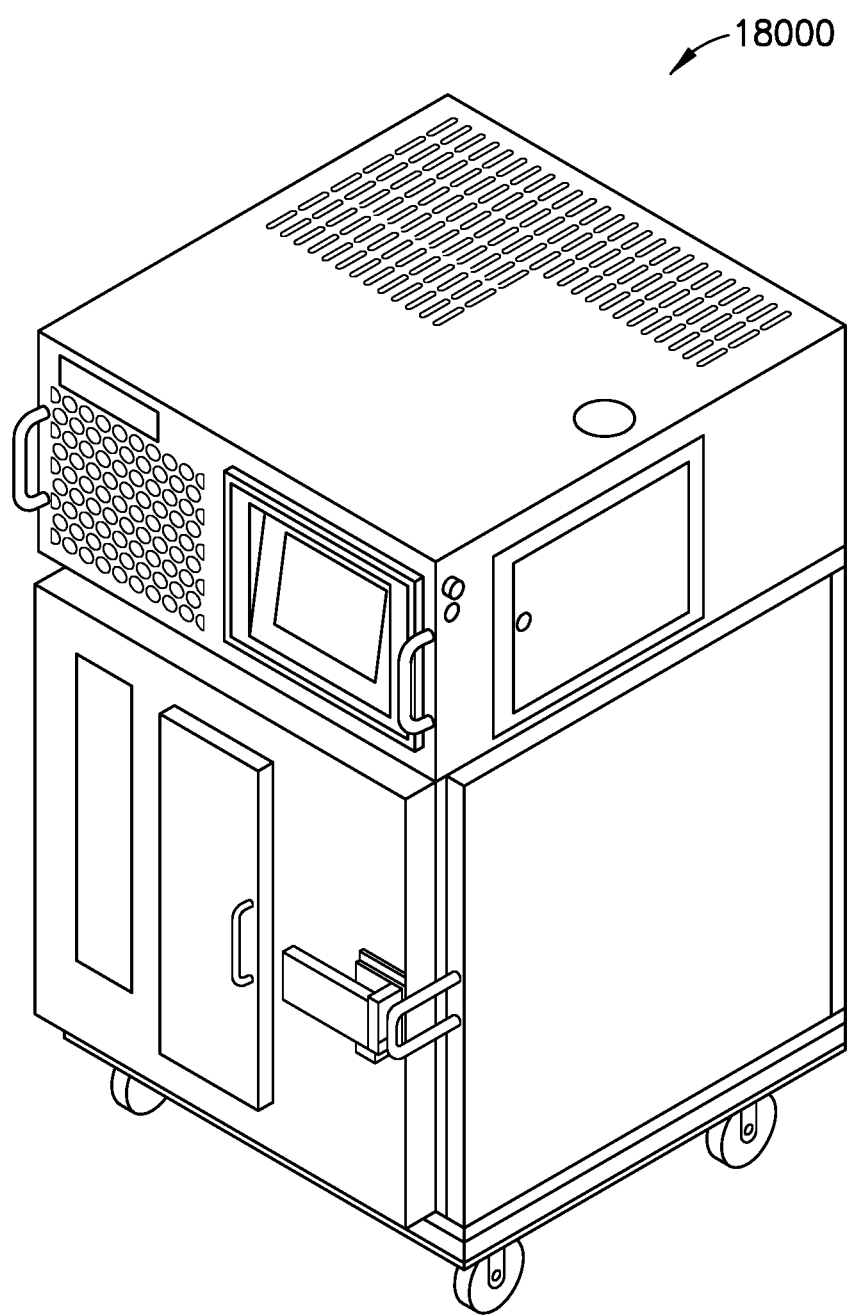
FIGS. 18 and 19 are schematic illustrations of exemplary controlled environment interchangeable carts in accordance with aspects of the disclosed embodiment.
Figure 19:
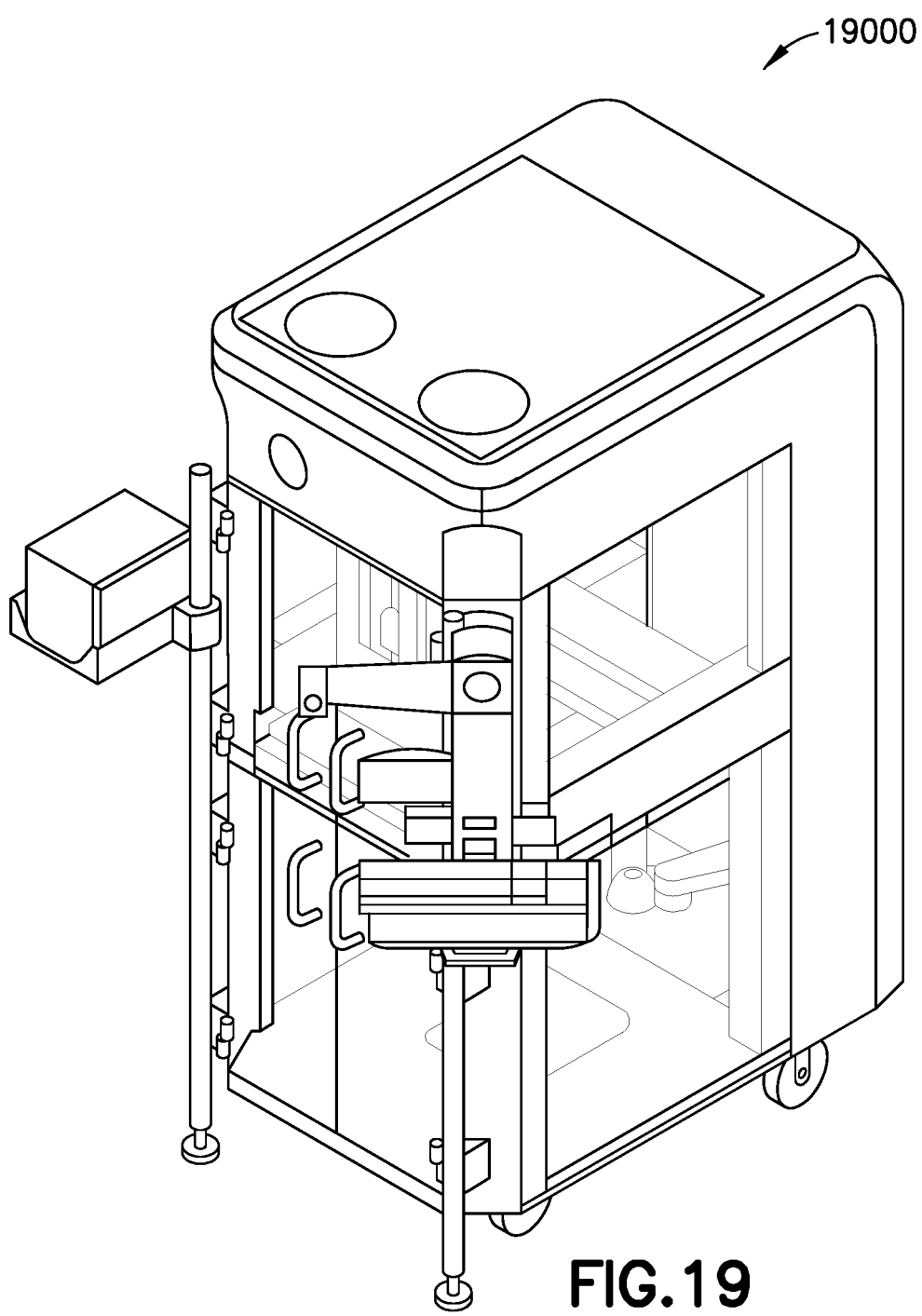

Referring now to FIGS. 18 and 19, climate control environment carts 18000, 19000 are illustrated. The climate control environment carts 18000, 19000 are configured to hold any suitable processing equipment, such as, those described herein. For example, cart 18000 may house the storage carousel 20000ES. Cart 19000 may include shelves for holding any suitable processing equipment and/or lab ware.

Referring now to FIGS. 1A, 20A, and 20B, one or more of the dock frame modules 150, mobile carts 170, and stationary tables or racks 8050, 8060 disclosed herein may include a storage system 20000 will be described in greater detail. The storage system 20000 includes a frame 20000EF that, in one aspect, is integral to a dock frame 199 of the dock frame modules 150, a frame of the mobile carts 170, and a frame of the stationary tables or racks 8050, 8060 to which the storage system 20000 is mounted. In other aspects, the frame 20000EF may be coupled to the dock frame modules 150, mobile carts 170, and stationary tables or racks 8050, 8060 in any suitable manner. Where the storage system 20000 forms or is otherwise mounted to a mobile cart (e.g., as illustrated in FIGS. 11C, 11D, 12, 13A-13E, 14, 15, 18), the mobile cart 8000C, 8000D, 8020A, 13000, 8040 (and/or any of the other mobile carts described herein), generally referred to as mobile cart 170, may be configured for hand carting (and/or automated) movement relative to different climate sections CL1, CL2 (FIGS. 1A, 4A and 5) of the of the laboratory facility space SPC (FIG. 1) so that the storage system 20000 may be pushed or pulled (either by hand or with automation) along a laboratory floor for insertion or removal of the storage system 20000 to/from any one or more of the robotic processing systems 100 (see FIGS. 1A, 4A, and 5) illustrated in FIGS. 1A-7B described above. Here, the storage system 20000 (and the components thereof) is movable as a unit within the laboratory facility space SPC to one of the different controlled climate sections CL1, CL2 of the laboratory facility space from another of the different climate sections CL1, CL2 of the laboratory facility space SPC.

The movable storage system 20000 may include any suitable leveling system (e.g., such as leveling feet) so that the components of the mobile storage 20000 may be leveled with respect to other portions of the robotic processing system 100 as described above. For example, the cart to which the storage system 20000 is mounted may be suitably leveled to allow for the coupling of the docking interfaces 199A, 199B so as to effect the repeatable coupling described herein.

In other aspects, the where the frame 20000EF is integral to or mounted to a stationary table or rack 8050, 8060 that is configured to remain stationary (although the size of the stationary table or rack 8050, 8060 may provide for transport of the storage system 20000 such as by carrying the storage system 20000 with any suitable transport lift or by hand), the frame may include any suitable leveling system, such as leveling feet, so that the components of the storage system 20000 may be leveled with respect to other portions of the robotic processing system 100 in a manner similar to that described above.

The storage system 20000 includes at least one storage carousel 20000ES mounted to the frame 20000EF. The storage carousel 20000ES is sized and shaped so that the frame 20000EF and the storage carousel 20000ES is movably mounted thereto are movable as a unit. As will be described herein, the storage carousel 20000ES includes an array 530A of rack stations 530. The array 530A is movably mounted to and dependent from the movable frame 20000EF so as to move as a unit with the movable frame 20000EF where the storage array movable mounting to the movable frame (as described herein, such as through the drive section 1000—see, e.g., FIGS. 22A-22C and 10) provides the storage array 530A, mounted to the movable frame, a degree of freedom of motion (such as rotation about axis 1020 ((as described herein, such as through the drive section 1000—see, e.g., FIGS. 22A-22C and 10) relative to the movable frame 20000EF. Each rack station has a rack location 530L so as to define an array of holder storage racks

520. Each of the holder storage racks 520 is disposed at a respective rack location 530L of a respective rack station 530. The holder storage racks 520 are configured to, and are disposed in the array 520 of holder storage racks 520, store stacked sample holders 518 therein (see also FIG. 16 which illustrates sample holders 518 stacked within the storage carousel 20000ES).

Figure 23C:
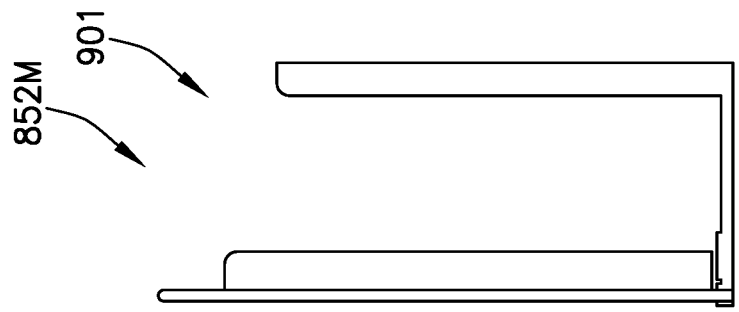
FIGS. 23A-23C are schematic illustrations of a portion of the storage system of FIGS. 20A and 20B in accordance with aspects of the disclosed embodiment.
Figure 23B:
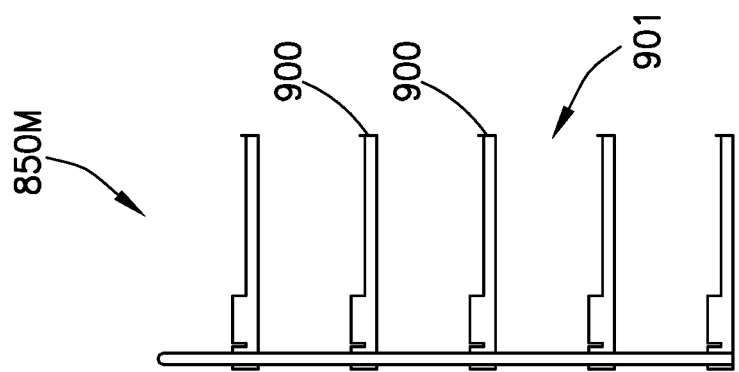
Figure 23A:
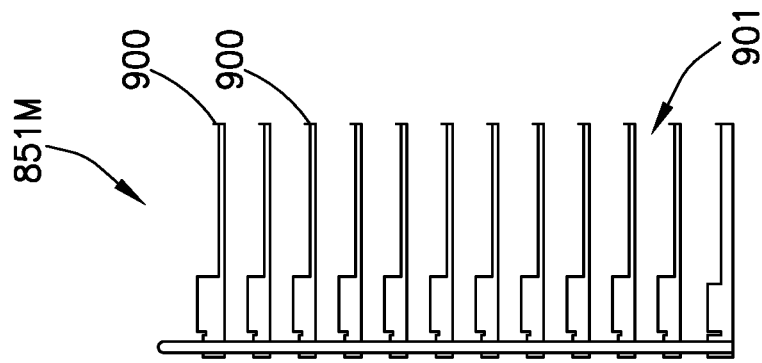
Figure 24:
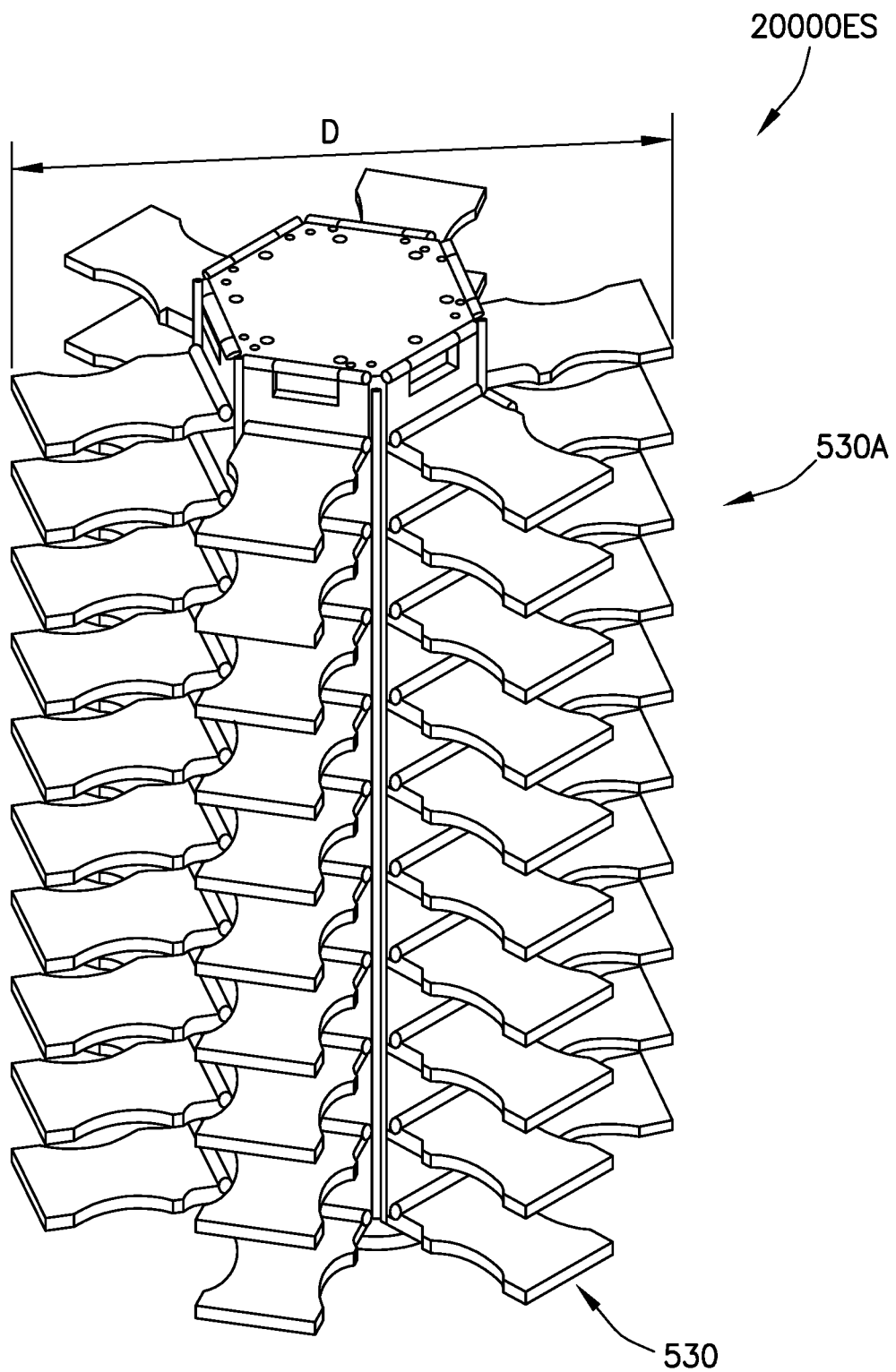
FIG. 24 is a schematic illustration of a portion of the storage system of FIGS. 20A and 20B in accordance with aspects of the disclosed embodiment.
Figure 25:
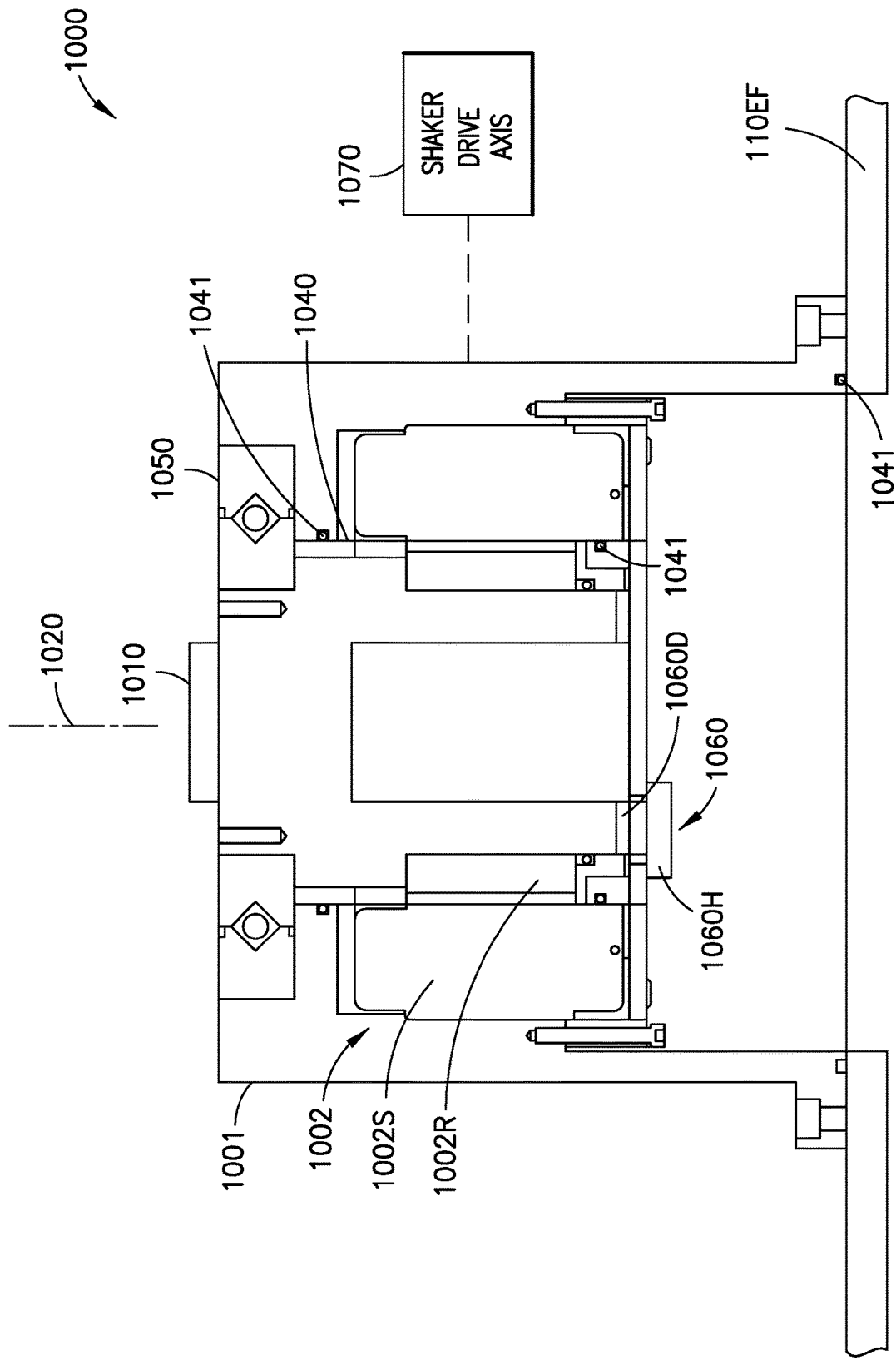
FIG. 25 is a schematic illustration of a drive section of the storage system of FIGS. 20A and 20B in accordance with aspects of the disclosed embodiment.

Still referring to FIGS. 20A and 20B, in one aspect, the storage carousel 20000ES has a selectably variable footprint (e.g., the area A, A1 the storage carousel 20000ES occupies when viewed from the top as determined by a variable diameter D, D1 of the storage carousel 20000ES). In other aspects, as illustrated in FIG. 24, the diameter D of the storage carousel 20000ES may be fixed (but otherwise has a similar configuration to that described herein with respect to FIGS. 20A-20B, 22A-23C). Where the storage carousel 20000ES has a selectably variable footprint, the selectably variable footprint is effected by a selectably variable total number of rack stations 530 forming the array 530A of rack stations 530. The selectably variable total number of rack stations 530 is selectable between different numbers of more than one total rack stations 530 by selectably adding or removing storage racks 530 to the array 530A so as to correspondingly increase or decrease the selected total number of storage rack stations 530 from a first total number (see one of FIG. 20A or 20B) of the more than one rack stations 530 to a different second total number (see the other one of FIGS. 20A and 20B) of the more than one rack stations 530 within a common enclosed perimeter PER of the storage carousel 20000ES. The selectably variable footprint of the storage carousel depends on the selected total number of the more than one rack stations 530.

Changing the total number of storage rack stations 530 from the first total number of the more than one storage rack stations 530 to the different second total number of the more than one storage rack stations also effects selection of the selectably variable footprint from a first selectable predetermined footprint size D to a second selectable predetermined footprint size D1. The first selectable predetermined footprint size D corresponds to the first total number of the more than one storage rack stations 530 and the second selectable predetermined footprint size D1 corresponds to the second total number of the more than one storage rack stations 530. In one aspect, each of the different selectable total number of the more than one rack stations 530 defines a different corresponding predetermined footprint size D, D1 of the storage carousel 20000ES. In one aspect, the predetermined footprint size D1, D2 may be sized so that the storage carousel 20000ES fits within an enclosure ENC (see FIGS. 1B and 2) of any suitable processing system (such as a refrigerator, freezer, incubator, etc.).

Referring now to FIGS. 20A, 20B, 22A-22C and 23A-23C, the array 530A of rack stations 530 may be modular so as to include different array modules 880 that form one or more modular carousel levels 870-873 (a height of the stacked levels 870-873 being limited by an enclosure in which the carousel is located). The modular carousel levels 870-873 may be stacked one on top of the other in any suitable manner to increase or decrease the storage capacity of the storage carousel 20000ES. As may be realized, the modular carousel levels 870-873 may include any suitable alignment features (e.g., alignment pins, slots and grooves, etc.) so that the rack stations 530 of one modular carousel level 870-873 are substantially vertically aligned with the rack stations 530 of other ones of the stacked modular carousel levels 870-873. The modular carousel levels may be coupled to each other with any suitable fasteners, such as mechanical fasteners to form a vertical stack 899 of more than one carousel level 870-873. In one aspect, any suitable controller, such as those described herein (see e.g., any suitable controller of control system 157), is communicably connected to the storage carousel 20000ES so as to register the selected total number of storage rack stations 530 of the array 530A, and a predetermined storage characteristic affecting storage arrangement of the storage rack modules 850M-852M at each storage rack station 530 of the total number of storage rack stations 530 of the storage carousel 20000ES.

Each of the carousel levels 870-873 includes, as described above, an array 530A of rack stations 530. Each of the rack stations 530 is configured to hold the holder storage racks 521. In one aspect, one or more of the holder storage racks 521 forms an interchangeable storage rack module 850M, 851M, 852M. Here, the holder storage racks 521, disposed at the rack stations 530, are selectable from a number of different interchangeable storage rack modules 850M, 851M, 852M. At least one of the different interchangeable storage rack modules 850M, 851M, 852M has a different predetermined storage characteristic, defining an in rack storage arrangement of sample holders 518 (see, e.g., FIGS. 20A, 20B), than another storage rack module 850M, 851M, 852M from the number of different interchangeable storage rack modules 850M, 851M, 852M. In one aspect, the different predetermined storage characteristic is a stacked sample holder capacity (see e.g., FIGS. 23A and 23B) of the respective storage rack module 850M, 851M, 852M, so that at least one of the different interchangeable storage rack modules 850M, 851M, 852M has a different capacity of sample holders 518 stacked therein than another capacity of sample holders 518 stacked in storage rack of another of the different interchangeable storage rack modules 850M, 851M, 852M. For example, referring to FIGS. 23A and 23B, the storage rack module 851M has a different storage pitch (e.g., a storage pitch of 12 sample holders) compared to the storage pitch (e.g., a storage pitch of 5) of the storage rack module 850M. The different storage pitches may provide for the storage of lab ware where the lab ware have different heights.

In another aspect, the different predetermined storage characteristic is a random or non-random storage configuration. For example, referring to FIGS. 23A-23C, the storage rack modules 850M, 851M have individual shelves (or nests) for each sample holder 518 which provides for random access of the sample holders 518 stored therein. Storage rack module 852 includes a stacker storage arrangement where the sample holders 518 are stacked one upon the other to provide for a first in last out access of the sample holders 518 stored therein. In another aspect, the predetermined storage characteristic is an in/out access opening 901 configuration, disposed to access stacked storage holders (or nests) 900 in the storage rack module 850M, 851M, 852M, which access opening 901 is configured in at least one of the different interchangeable storage rack modules 850M, 851M, 852M so as to provide for different access to the stacked storage holders 900 than access provided by another opening configuration of another of the interchangeable storage rack modules 850M, 851M, 852M.

Figure 22C:
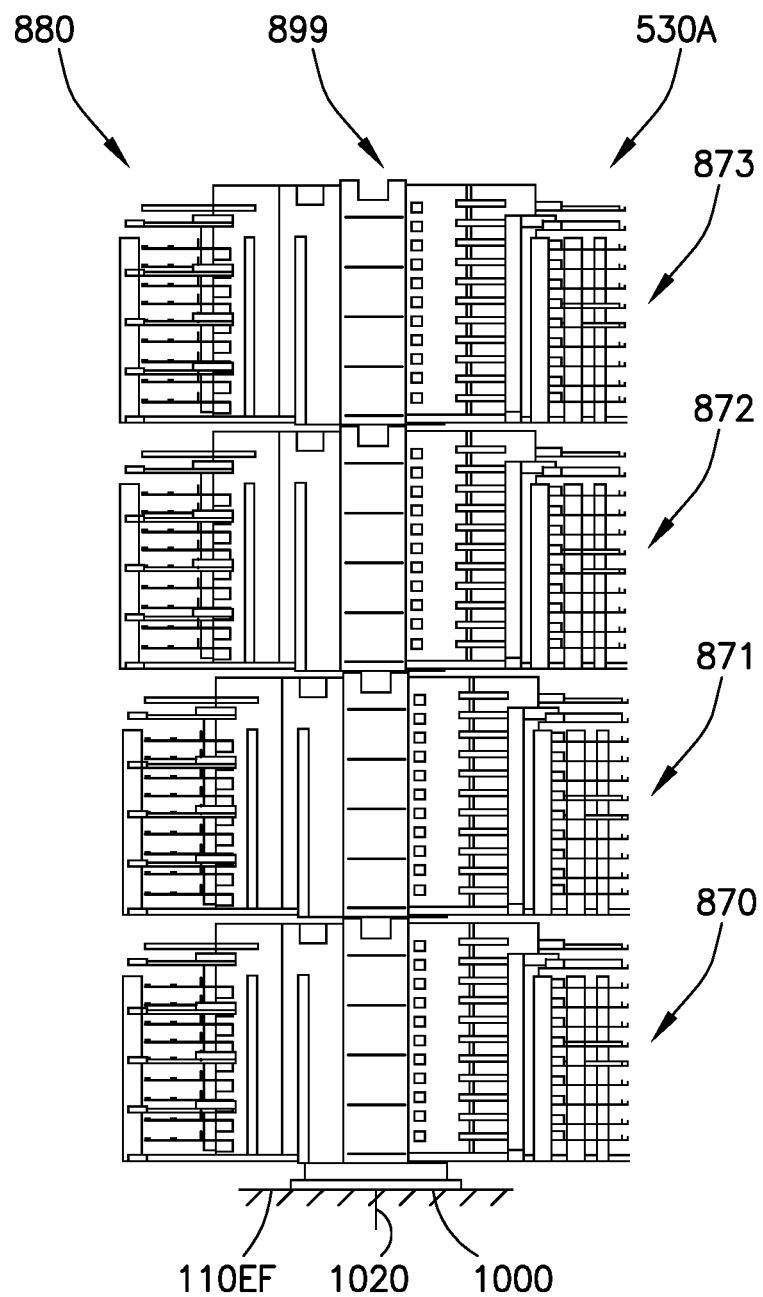

The different storage rack modules 850M, 851M, 852M may be inserted to respective ones of the rack stations 530 so that each of the one or more carousel levels 870, 871, 872 include any suitable combination of the storage rack modules 850M, 851M, 852M. For example, respective ones of the one or more carousel levels 870, 871, 872 may be configured with all storage rack modules 850M, all storage rack modules 851M, all storage rack modules 852M, or any combination thereof. As an example, FIGS. 22A-22C illustrates stacks 850-852 of lab ware where stack 850 is formed from storage rack modules 850M, stacks 852 are formed from storage rack modules 852M, and stacks 851 are formed from storage rack modules 851M.

Referring to FIGS. 20A, 20B, 22A-22C, and 25, the storage carousel 20000ES includes any suitable drive section 1000. The drive section 1000 may be mounted to the movable frame 20000EF so as to move as a unit with the movable frame 20000EF. As described herein, the drive section 1000 has a motor 1002 driving a drive shaft 1010 defining at least one independent drive axis operably coupled to the storage array 530A so that the at least one independent drive axis drives storage array movement in the degree of freedom (e.g., about axis 1020) relative to the movable frame 20000EF. As an example, the array 530A of rack stations 530 may be mounted in any suitable manner to the drive section 1000. The drive section 1000 may include a housing 1001 and any suitable motor 1002. The drive section may be mounted to the frame 20000EF in any suitable manner. The motor 1002 may be mounted at least partially within the housing 1001 in any suitable manner. In one aspect, the drive section 1000 may be configured as a direct drive system (illustrated in FIG. 25) where the motor 1002 directly drives a carousel drive shaft 1010 (e.g., substantially without any intervening transmission drive members). For example, the motor 1002 includes a stator 1002S that is held stationary within the housing 1001. The motor also includes a rotor 1002R that is movably mounted within the housing 1001 so as to be driven by the stator 1002S in any suitable manner. The rotor 1002R may be coupled to (or integrally formed with) the carousel drive shaft 1010 in any suitable manner so that the rotor 1002R and the carousel drive shaft 1010 rotate as a unit about a drive axis of rotation 1020. The direct drive motor system may reduce a part count of the drive section 1000 while simplifying the drive section design and increasing reliability compared to transmission driven drive systems.

In one aspect, the motor 1002 may be configured as a sealed motor so that the storage carousel 20000ES may be transported to the different climates of the laboratory facility. For example, the sealed motor configures a common storage carousel 20000ES to be transported to and operated within a low temperature freezer, a dry heat sterilizing incubator where the motor 1002 can be exposed to temperatures ranging from, for example, about 4° C. to about 200° C. with up to about 98% relative humidity. For example, the drive section 1000 includes a seal 1040 that isolates each shaft 1010 of the drive section 1000 in a sealed environment from each motor stator 1002S of the motor 1002, and each seal 1040 that isolates each shaft 1010 in the sealed environment from each motor stator 1002S is a static seal. The static seal 1040 is disposed between the stator 1002S and rotor 1002R. The static seal 1040 may be coupled to the housing 1001 in any suitable manner and sealed to the housing with, for example, O-rings 1041 or other sealing members. The housing 1001 may also be sealed to the frame 20000EF in any suitable manner, such as with O-ring(s) 1041. Sealing of the motor 1002 provides for only the drive shaft 1010 and rotor 1002R being exposed to an operating environment of the storage carousel 20000ES. One or more of the drive shaft 1010 or any suitable bearings 1050 of the housing 1001 may form a seating surface for the array 530A of rack stations 530 so as to support the array 530A of rack stations 530 on the frame 20000EF. In one aspect, where the mobile cart 20000EF is hand carted to a climate section of CL1, CL2, the sealed environment in which the drive shaft 1010 is located is common with the controlled climate of one of the climate sections of the different climate sections.

The drive section 1000 may include any suitable encoders 1060 (having read heads 1060H and encoder disks 1060D) for providing positional information of the storage carousel 20000ES to any suitable controller of the processing system so that the carousel may be rotated about drive axis 1020 for picking and placing sample holders 518 to and from the storage carousel 20000ES. In one aspect, the drive section 1000 includes an additional drive axis, such as a shaker drive axis 1070 (e.g., an oscillating drive), that is configured to oscillate the entire storage carousel 20000ES to shake the sample holders 518 stored within the storage carousel 20000ES.

In other aspects, the drive section 1000 may be configured as an indirect drive system where the motor 1002 drives the carousel drive shaft 1010 through any suitable transmission (e.g., gears, belts/pulleys, etc.).

Referring to FIGS. 1A, 1D-1G, 3, 4A, 4B, 5, 6, 7B, 11A-11D, 13A-13E, 14, 20A, 20B, and 21, in one aspect, the robotic transport arm 120 is an articulated arm robot mounted to a respective frame (e.g., a respective interchangeable cart, shelf or rack frame 8100 or a dock frame module 150 dock frame 199). In one aspect, where the robotic transport arm 120 is mounted to the interchangeable cart frame 8100, the robotic transport arm 120 is mounted to the interchangeable cart frame 8100 so that the frame 8100, the robotic transport arm 120, and any other processing equipment (such as, e.g., the storage carousel 20000ES) and are movable as a unit, and wherein the robotic transport arm 120 is configured so as to move relative to the frame 8100 so as to access, along at least one substantially horizontal axis, each storage holder (or nest 900) in each storage rack module 850M-852M at each storage rack station 530 of the storage carousel 20000ES or any other suitable workpiece holding station disposed on or off of the frame 8100 and within the reach of the robotic transport arm 120.

As described herein, the robotic transport arm 120 is fungible and may comprise or be replaced with any other suitable robotic arm. For example, in one aspect, referring to FIGS. 1D and 1E, the robotic transport arm 120 includes one or more arm links 422A-422E and end effector 423 and may include any suitable number of drive axes and degrees of freedom. The robotic transport arm 120 is configured to transport lab ware to and from, for example, the storage carousel 20000ES and/or between any suitable components of the robotic processing system 100 that are located within the reach of the robotic transport arm 120. The end effector 423 is configured to pick and place lab ware from the random and non-random storage stack modules 850M, 851M, 852M (see FIGS. 23A-23C) such as in the storage carousel 20000ES or at any other suitable location (such as one or more nests, etc.). In one aspect, the robotic transport arm 120 may be a two link arm (as illustrated in, e.g., FIG. 1E) where the end effector 423 is constrained to move in the radial direction (e.g., where the robotic transport arm 120 includes a 3-axis drive system). In other aspects, the robotic transport arm 120 may be a two link arm (as illustrated in FIG. 1E) where the end effector 423 is independently rotatable about axis DX (e.g., where the robotic transport arm 120, 120A includes a 4-axis drive system). In one aspect, a fifth or additional drive axes may be provided for rotating more than one end effector 423 about the axis DX. In other aspects, the robotic transport arm 120 may be a six axis robotic arm (as illustrated in FIG. 1D) or have any suitable number of drive axis for moving the end effector 423 to a predetermined spatial location for picking and placing lab ware.

In one aspect, as can be seen in FIG. 1E, the robotic transport arm 120 includes a carriage 424 that is movably mounted to a Z axis track 425 for movement along the Z axis. The robotic transport arm 120 includes any suitable drive section 426 that is connected to a frame 427 of the robotic transport arm 120, where the drive section 426 is configured to move the robotic transport arm 120 in the manner described herein to pick and place lab ware any suitable location. For example, the robotic transport arm 120 may be coupled to the drive section 426 so that the drive section 426 provides the robotic transport arm 120 with robot motion in at least one axis moving at least a portion of the robotic transport arm 120 in a collaborative operating space such as facility space SPC, corresponding to the frame 427, from a first location to another different location of at least the portion of the facility space SPC. In one aspect, the carriage 424 may be configured to rotate about a rotation axis AX of the robotic transport arm 120 (and may also be movable in the Z axis), while in other aspects, the carriage 424 is mounted for movement along the X or Y axes (and may also be movable in the Z axis, where the Z-axis is weight balanced to allow for free movement of the Z-axis by hand if desired) as shown in FIG. 1F.

Referring again to FIG. 1A, where the robot 120 comprises a selective compliant articulated robot arm (SCARA arm), a first end of arm link 422A is rotatably coupled to the carriage 424 about axis BX. A first end of arm link 422B is rotatably coupled to the second end of arm link 422A about axis CX. The end effector 423 is rotatably coupled to the second end of arm link 422B about axis DX. While two arm links 422A, 422B and end effector 423 are illustrated as being serially coupled to one another in other aspects the robotic transport arm 422 may include more than two arm links (as illustrated in FIG. 1D) and more than one end effector. It is noted that providing more than one end effector may provide for fast swapping of lab ware (where each of the more than one end effector are independently rotatable about the axis DX). In one aspect, the joints of the robotic transport arm 120 may be sealed joints to provide for wash downs and exposure of the robotic transport arm 120 to, for example, vapor hydrogen peroxide.

Figure 26:
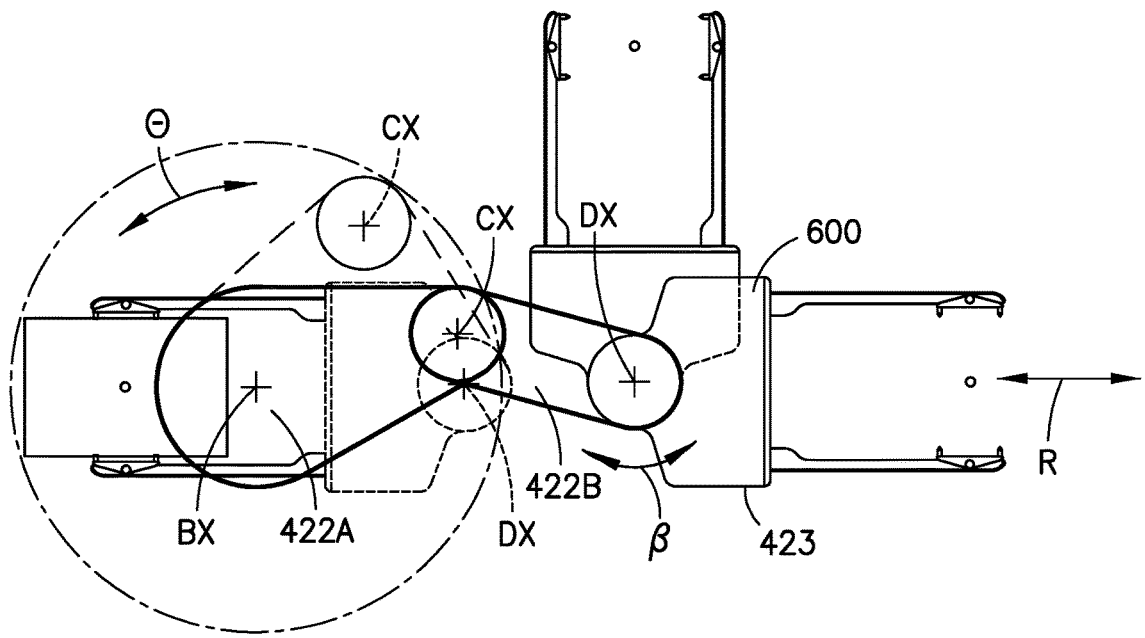
FIG. 26 is a schematic plan view of a portion of a robot of the storage system of FIG. 1A in accordance with aspects of the disclosed embodiment.

The robotic transport arm 120, such as the SCARA arm, is configured to move the end effector 423, under the control of any suitable controller (such as those described herein), in a theta θ direction (FIG. 1A) about, for example, axis BX and in a radial direction R (in other aspects Cartesian coordinates may be used where the end effector is moved in the X and/or Y directions in a manner comparable to movement in the radial direction R) and, in the 4-axis configuration, move the end effector 423 in a β direction about the axis DX (see also FIG. 26). The six axis arm may be configured to move the end effector 423 along any suitable path in any suitable coordinate system space for picking and placing the lab ware.

Figure 27:
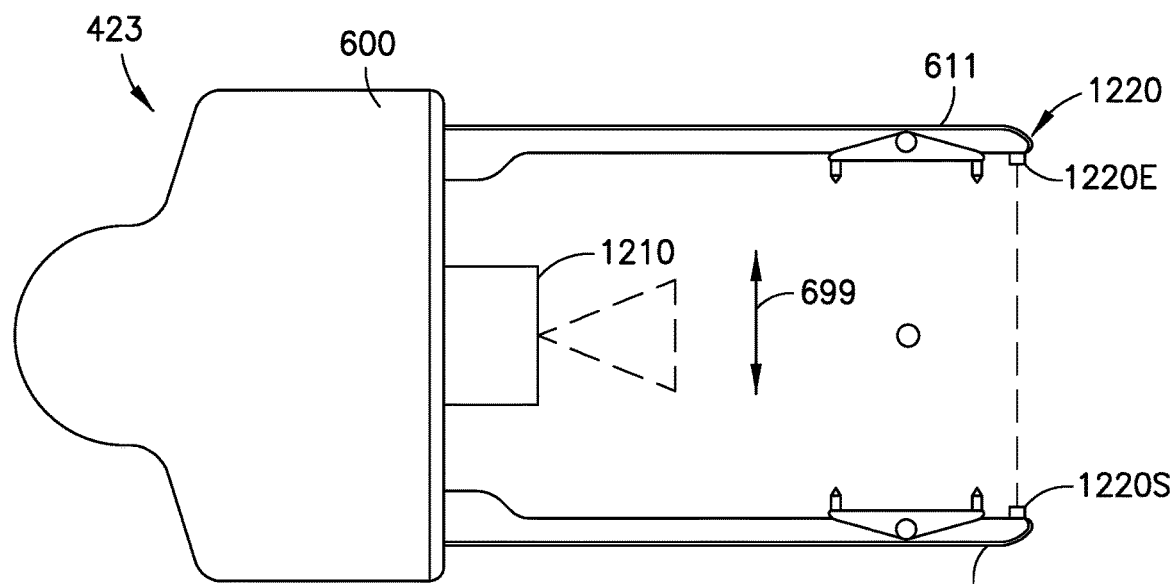
FIG. 27 is a schematic plan view of a portion of the robot of FIG. 26 in accordance with aspects of the disclosed embodiment.

Referring also to FIG. 27, the end effector 423 includes/is provided with a base portion 600 and workpiece grip 610 having workpiece engagement members 611, 612 that are configured to engage and hold a workpiece, such as pipetting trays or any other suitable lab ware, during workpiece transport, such as by the robotic transport arm motion in at least one axis of motion. In one aspect, the workpiece engagement members 611, 612 are movably coupled to the base portion 600 so that at least one of the workpiece engagement members 611, 612 is movable, through activation of the drive section 426 (FIGS. 1D and 1E), in direction 699 relative to each other and/or the base portion 600 for effecting the gripping and release of the workpiece (e.g. the workpiece engagement members 611, 612 are active gripping members) while, in other aspects, the workpiece engagement members 611, 612 may be stationarily coupled to the base portion 600 for passively engaging the workpiece without relative movement between each other and/or the base portion 600 (e.g. the workpiece engagement members 611, 612 are passive griping members). While one or more of the workpiece engagement members 611, 612 are described as being configured for linear translation in direction 699, it should be understood that in other aspects the workpiece engagement members 611, 612 may be moved in any suitable manner relative to each other and/or the base portion 600B for gripping and releasing the workpiece. For example, the workpiece engagement members 611, 612 may be rotatably mounted to the base portion 600B for gripping and releasing the workpiece through a rotation of one or more of the workpiece engagement members 611, 612.

Figure 28A:
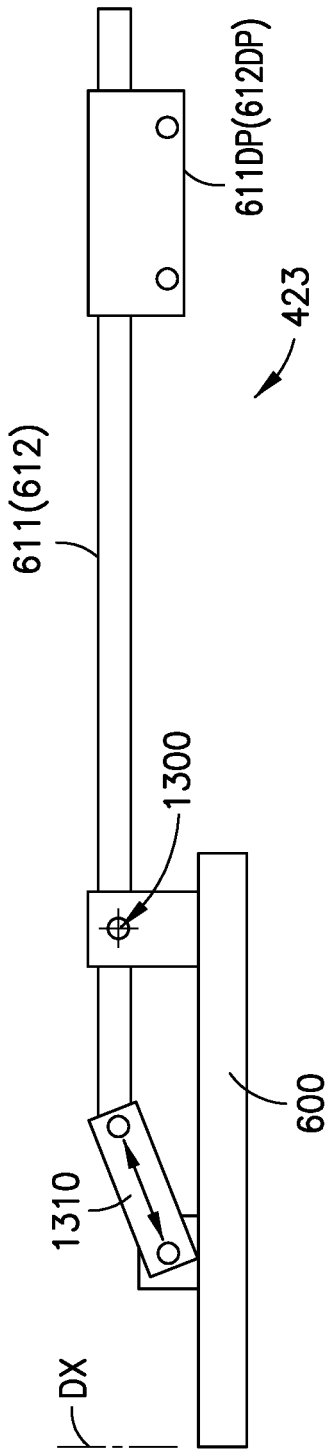
FIGS. 28A and 28B are schematic elevation views of a portion of the robot of FIG. 26 in accordance with aspects of the disclosed embodiment.
Figure 28B:
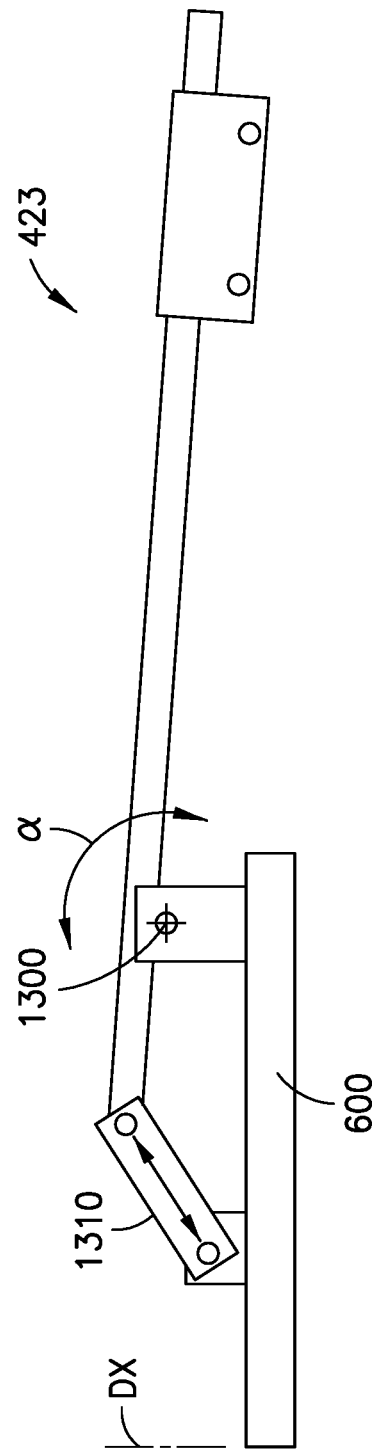

In one aspect, referring also to FIGS. 28A and 28B, in addition to or in lieu of movement of the workpiece engagement members 611, 612 in direction 699, the workpiece engagement members 611, 612 may also be pivotable in direction α (e.g., in a plane substantially parallel to, for example, axis DX) to adjust a pitch or roll of the end effector 423, such as in the case of a SCARA arm. For example, the workpiece engagement members 611, 612 may be mounted to base portion 600 about a pivot axis 1300. Each of the workpiece engagement members 611, 612 may be coupled to a respective actuator 1310 that is coupled to the base portion 600 in any suitable manner. The actuator 1310 is configured to pivot the respective workpiece engagement member 611, 612 about the pivot axis 1300 to rotate the respective workpiece engagement member 611, 612 in direction α. The workpiece engagement members 611, 612 may be moved in direction α together in the same direction to a adjust pitch of the end effector (e.g., relative to a lab ware holding location) or in opposite directions to adjust roll of the end effector 423 (e.g., relative to a lab ware holding location).

Figure 29:
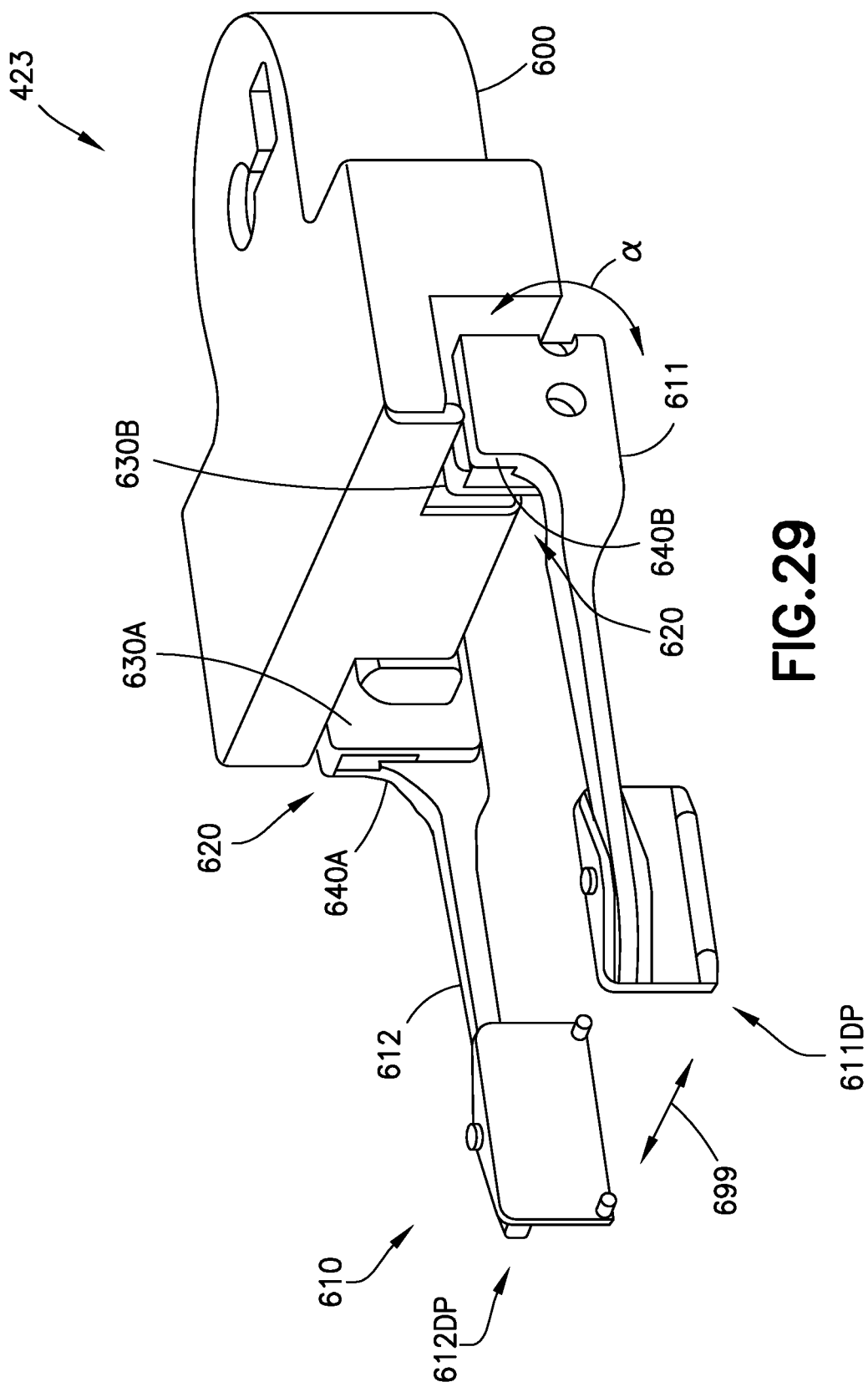
FIG. 29 is a schematic isometric view of a portion of the robot of FIG. 26 in accordance with aspects of the disclosed embodiment.

In one aspect, referring to FIG. 29, at least one of the workpiece engagement members 611, 612 is coupled to the base portion 600 so that the workpiece engagement member 611, 612 is frangibly compliant in a manner substantially similar to that described in U.S. patent application Ser. No. 15/689,986 filed on Aug. 29, 2017 and entitled "Robotic Processing System", the disclosure of which is incorporated herein by reference in its entirety. For example, at least one of the workpiece engagement members 611, 612 is coupled to the base portion 600 by a frangible compliant coupling 620 that is located between a distal portion 611DP, 612DP of the workpiece engagement member 611, 612 and the base portion 600 of the end effector 423 from which the at least one workpiece engagement member 611, 612 depends. The frangible compliant coupling 620 is configured to remain rigid until frangible yielding reaction in a snap on engagement interface (described below) of the frangible compliant coupling 620 breaks away (with resultant break away of the workpiece engagement member 611, 612 from the base portion 600 of the end effector 423) at a predetermined force threshold, such as specified in e.g. the American National Standards Institute (ANSI) R 15.06 standards, the International Organization for Standardization (ISO) 10218-1 standards and/or the ISO/TS-15066 standards, all of which standards are incorporated herein by reference in their entireties. In one aspect, any suitable portions of the robotic transport arm 120 may be covered with compliant materials or include compliant surfaces that are configured to deform and reduce an impact force in the event the robotic transport arm 120 impacts an object.

Figure 21:
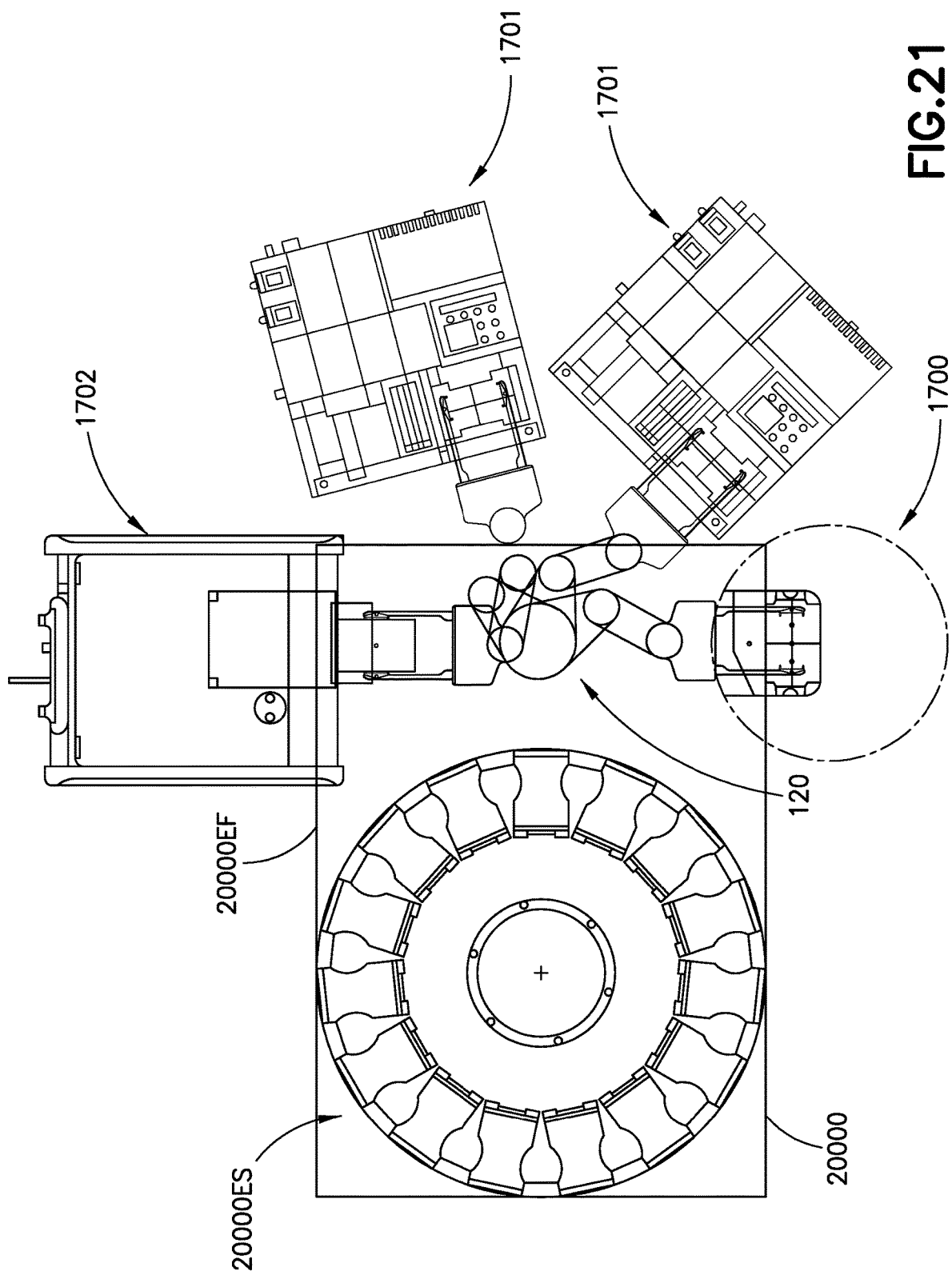
FIG. 21 is a top plan view of the storage system of FIGS. 20A and 20B in accordance with aspects of the disclosed embodiment.

In one aspect, referring to FIG. 21, the storage system 20000 may include any suitable lab ware scanner (or reader) and presence detector. For example, in one aspect, the storage system 20000 includes any suitable scanner/presence detector unit 1702 mounted to the frame 20000EF. The scanner/presence detector unit 1702 may be positioned relative to the storage carousel 20000ES so that the scanner/presence detector unit 1702 is configured to identify and detect a presence (or lack thereof) of lab ware stored in the storage carousel 20000ES. In other aspects, the scanner/presence detector unit 1702 may be disposed within a reach of the robotic transport arm 120 so that lab ware handled by the robotic transport arm 120 may be identified. In other aspects, the end effector 423 may include any suitable lab ware scanner and/or lab ware presence detector. For example, referring to FIG. 27, a bar code scanner 1210 may be mounted to any suitable location of the base portion 600 so as to identify lab ware being picked or otherwise held by the end effector 423. A through beam sensor 1220 may also be disposed on the end effector 423 for detecting a presence of lab ware stored in the storage carousel 20000ES (or at any other suitable location of the processing systems described herein). In one aspect, the through beam sensor 1220 may be disposed on the workpiece engagement members 611, 612 where an emitter 1220E is disposed on one of the workpiece engagement members 611, 612 and a receiver 1220S is disposed on the other of the workpiece engagement members 611, 612.

The through beam sensor 1220 may be configured to determine if lab ware is present in each nest 900 of a random access storage rack modules 850M, 851M. The through beam sensor 1220 may also be configured to determine how may pieces of lab ware (such as sample holders 518) are stacked in a non-random storage rack modules 852M. For example, the through beam sensor 1220 may be configured with a fast capture input/output that latches the encoder position on the Z-axis motor. The transition points between the individual pieces of lab ware are then filtered and compared to empty storage rack modules 850M, 851M, 852M measurements to determine differences. In one aspect, the through beam sensor 1220 may also be latched to arm motor positions (e.g., θ, R, β drive motors) and can be used for auto-teaching lab ware holding locations to the different drive axes of the robotic transport arm 120 (such as by determining a location of nest features or special fiducials) to a controller of the robotic transport arm 120.

Figure 11A:
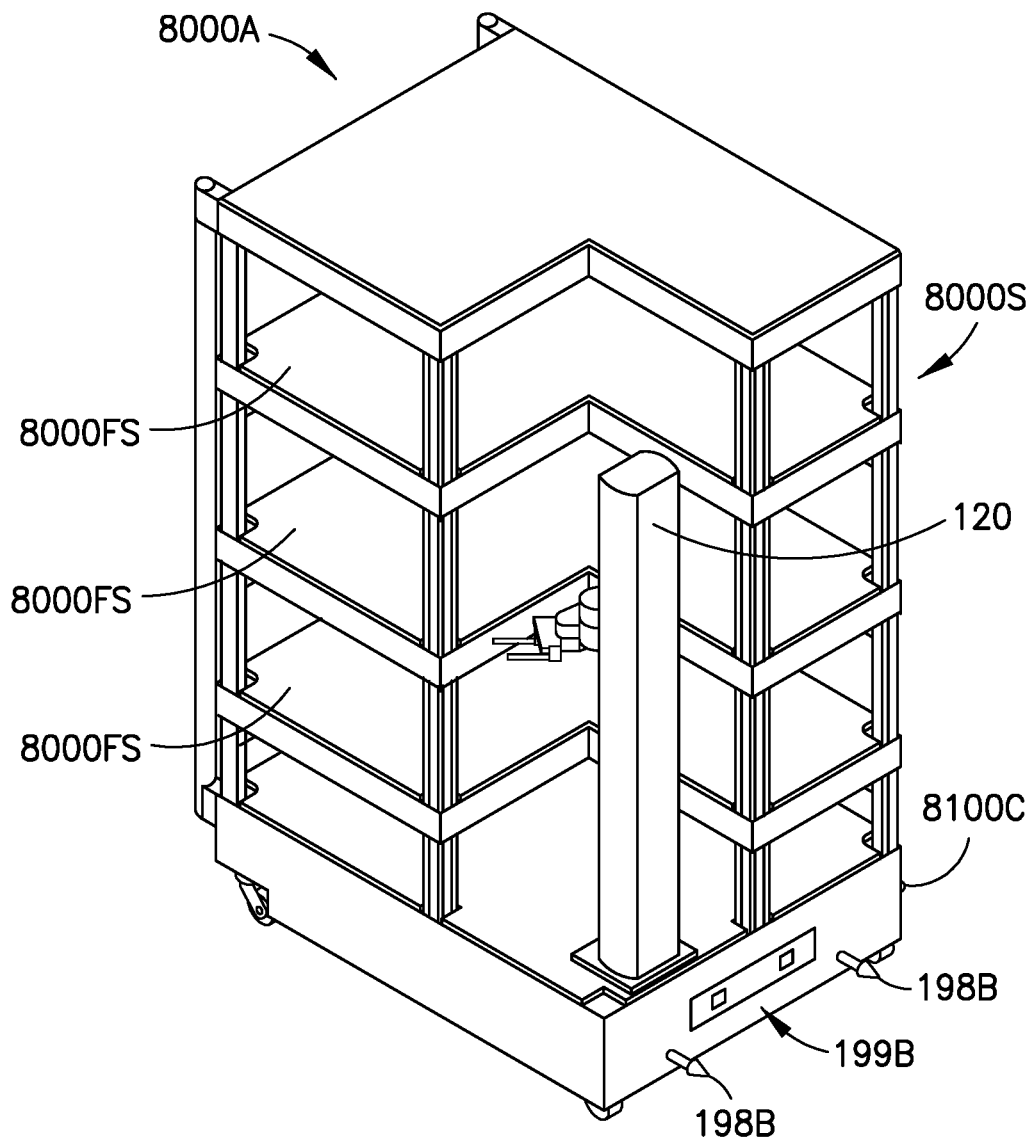
FIGS. 11A-11D are schematic illustrations of some of the exemplary interchangeable carts of FIG. 8 in accordance with aspects of the disclosed embodiment.
Figure 11B:
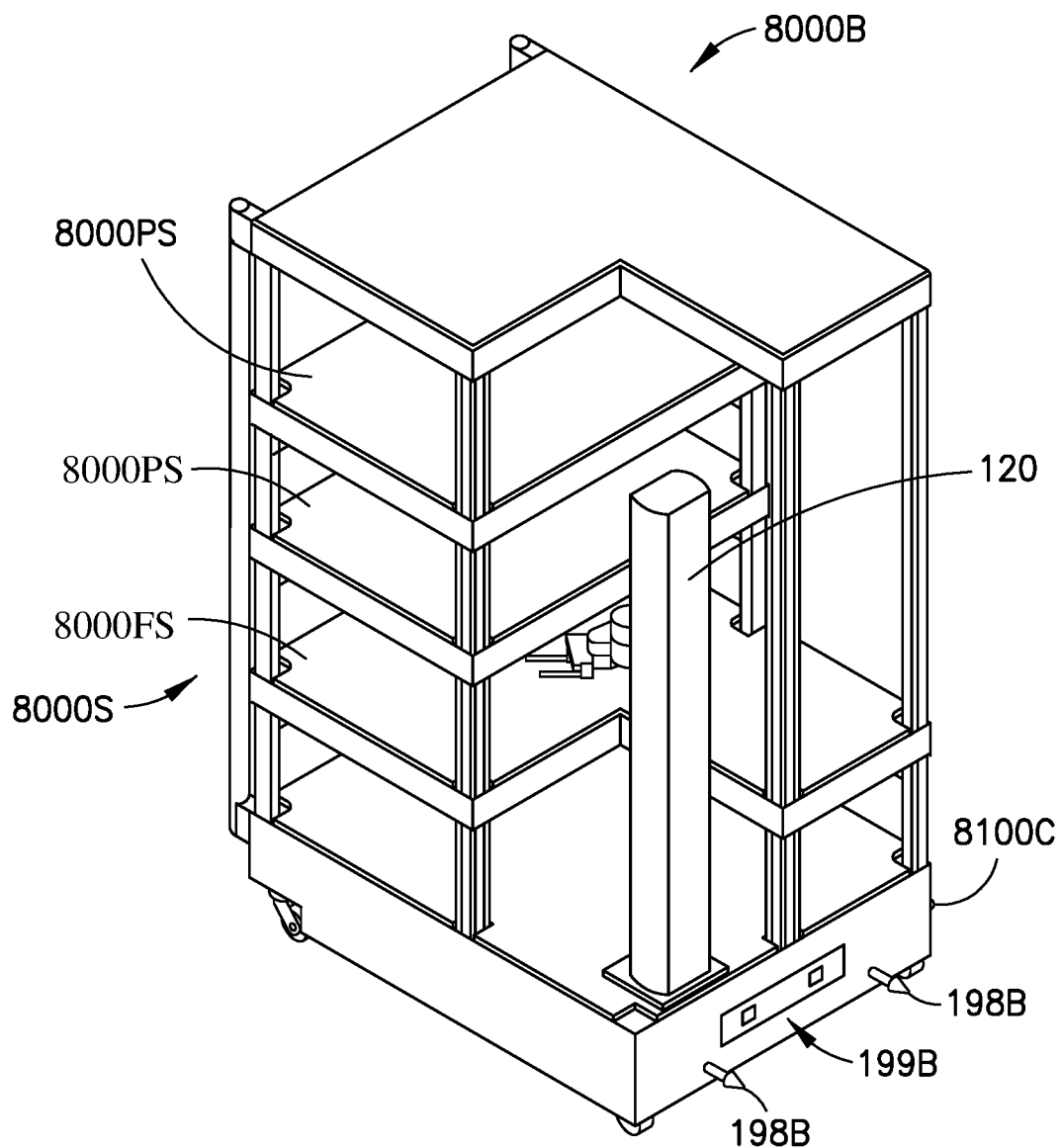
Figure 11C:
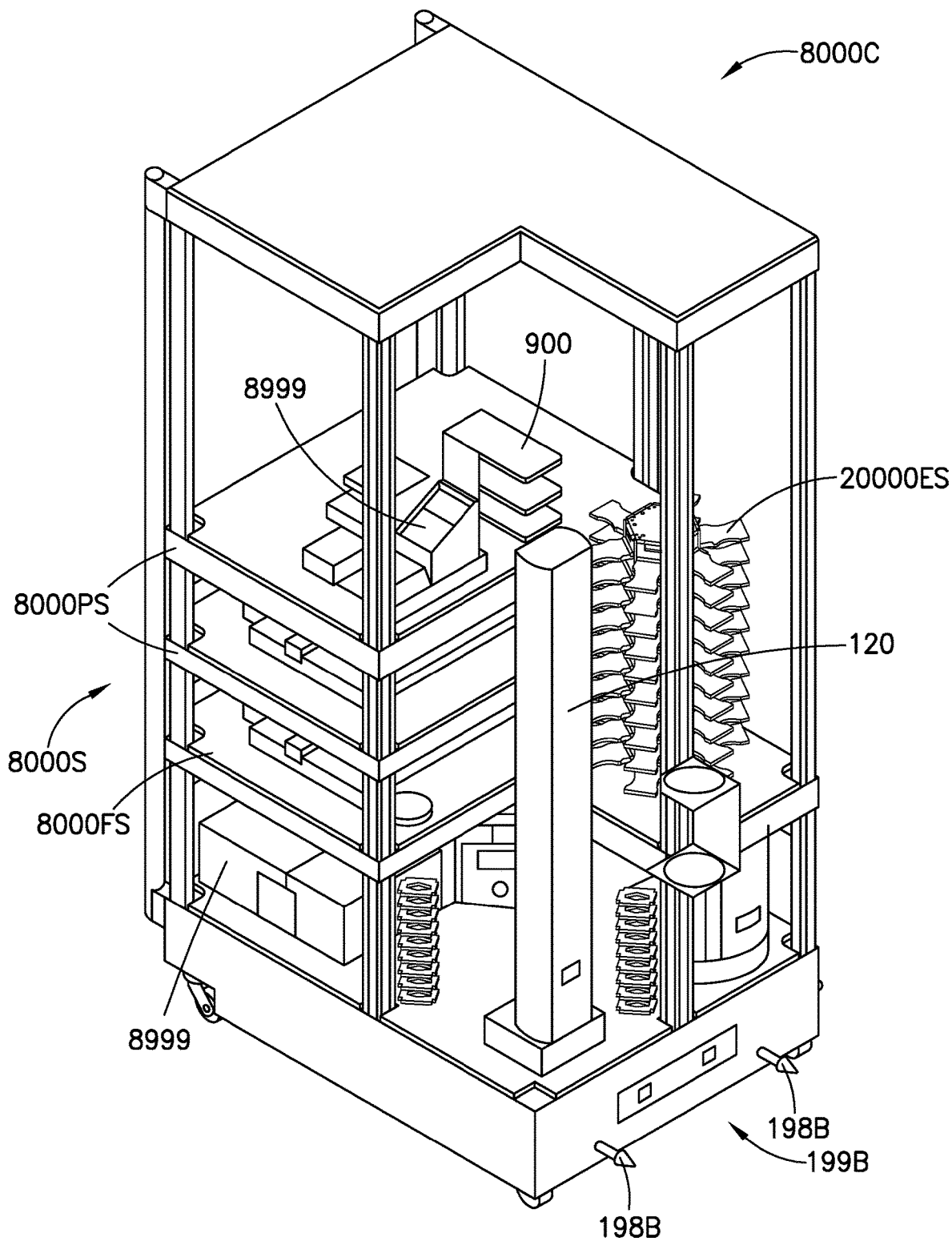
Figure 11D:
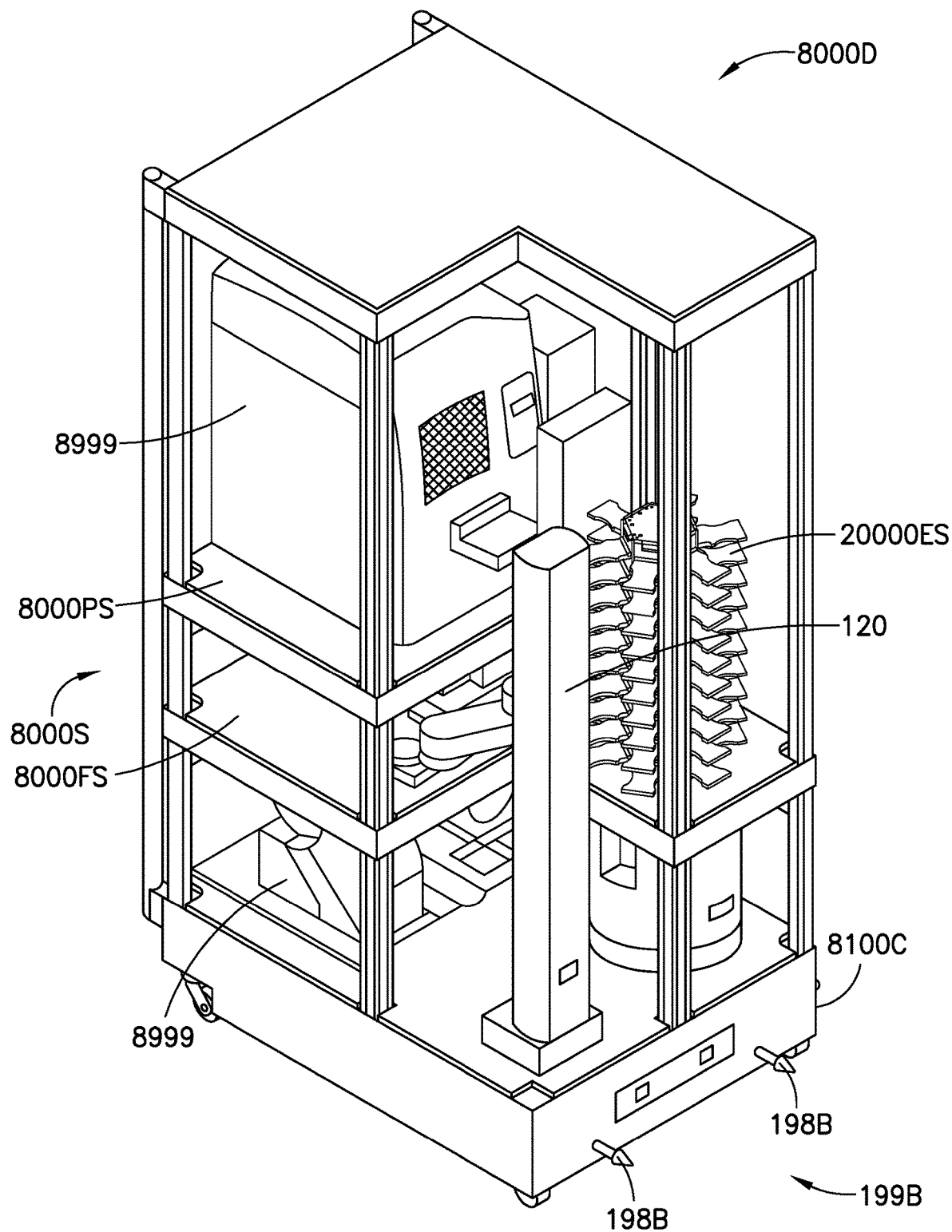
Figure 13A:
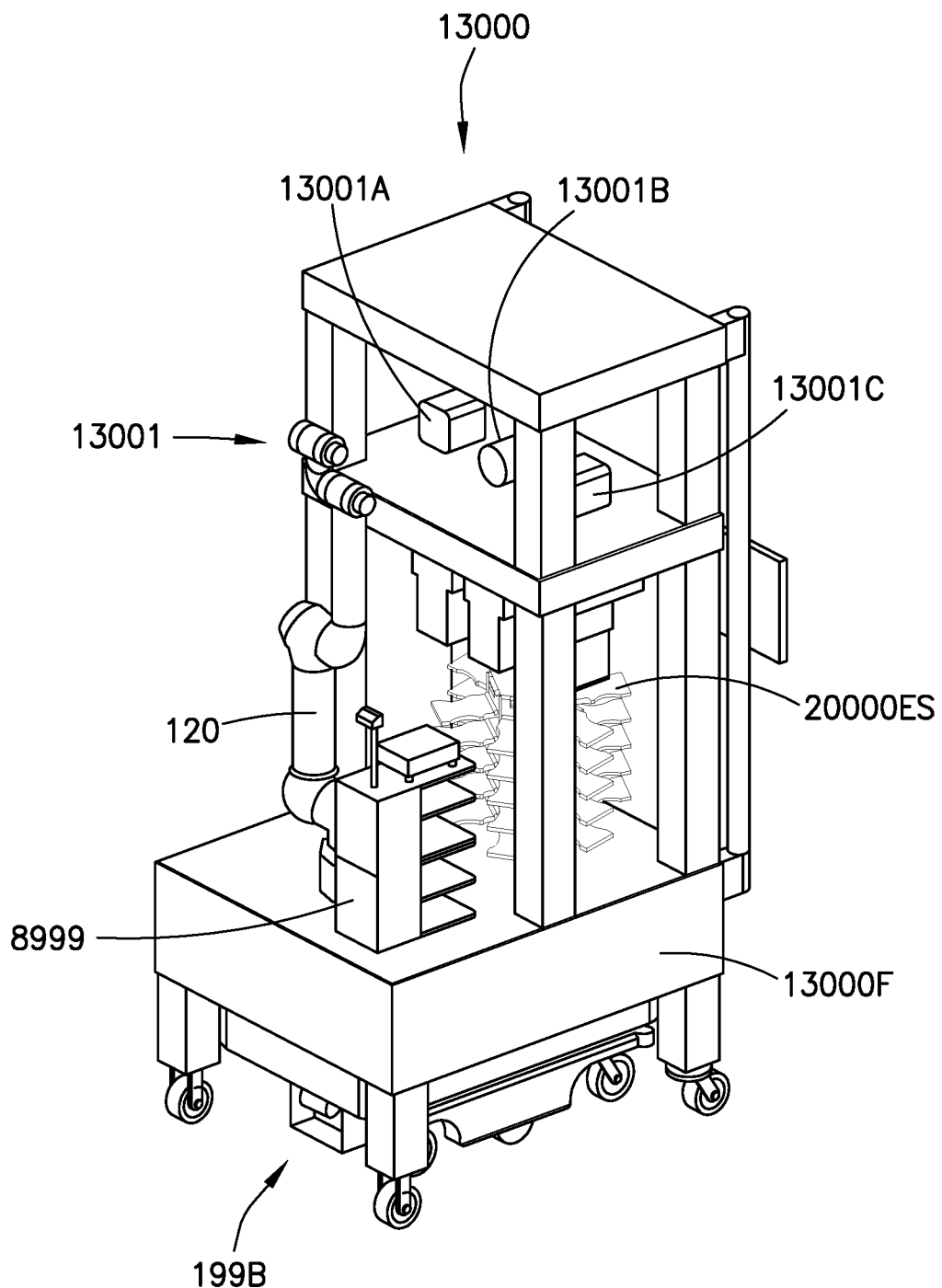
FIGS. 13A-13E are schematic illustrations of some of the exemplary interchangeable carts of FIG. 8 in accordance with aspects of the disclosed embodiment.
Figure 13B:
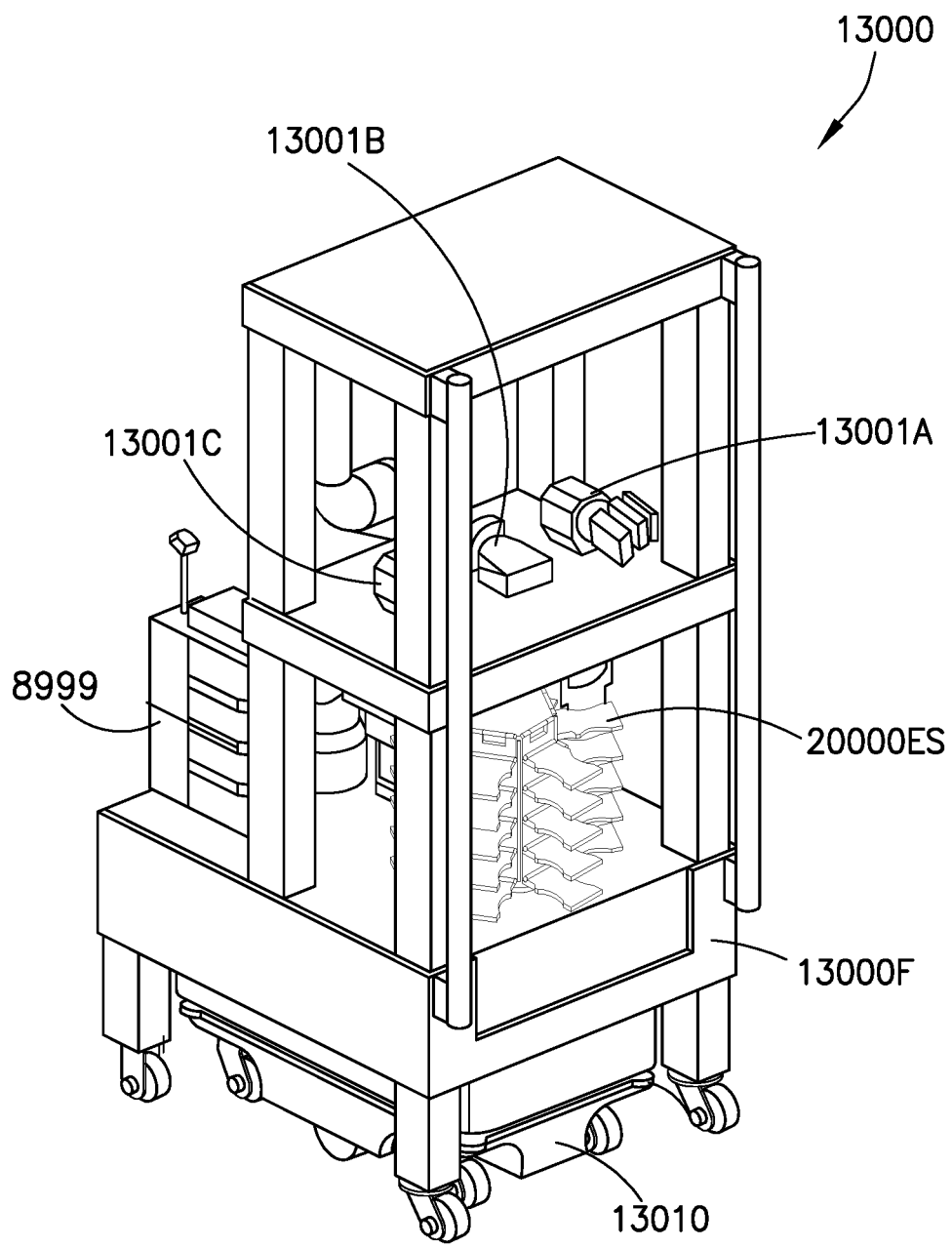
Figure 13C:
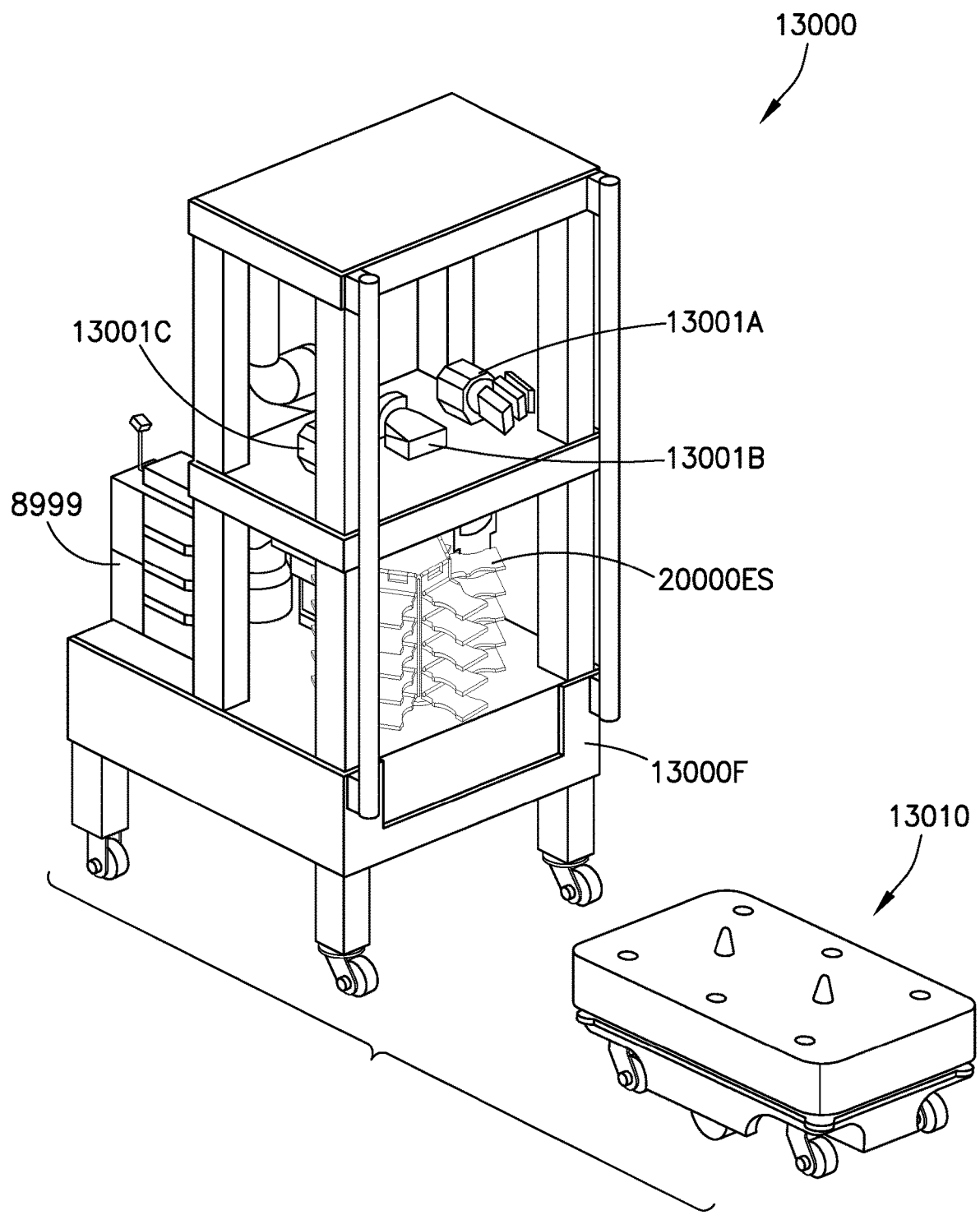
Figure 13D:
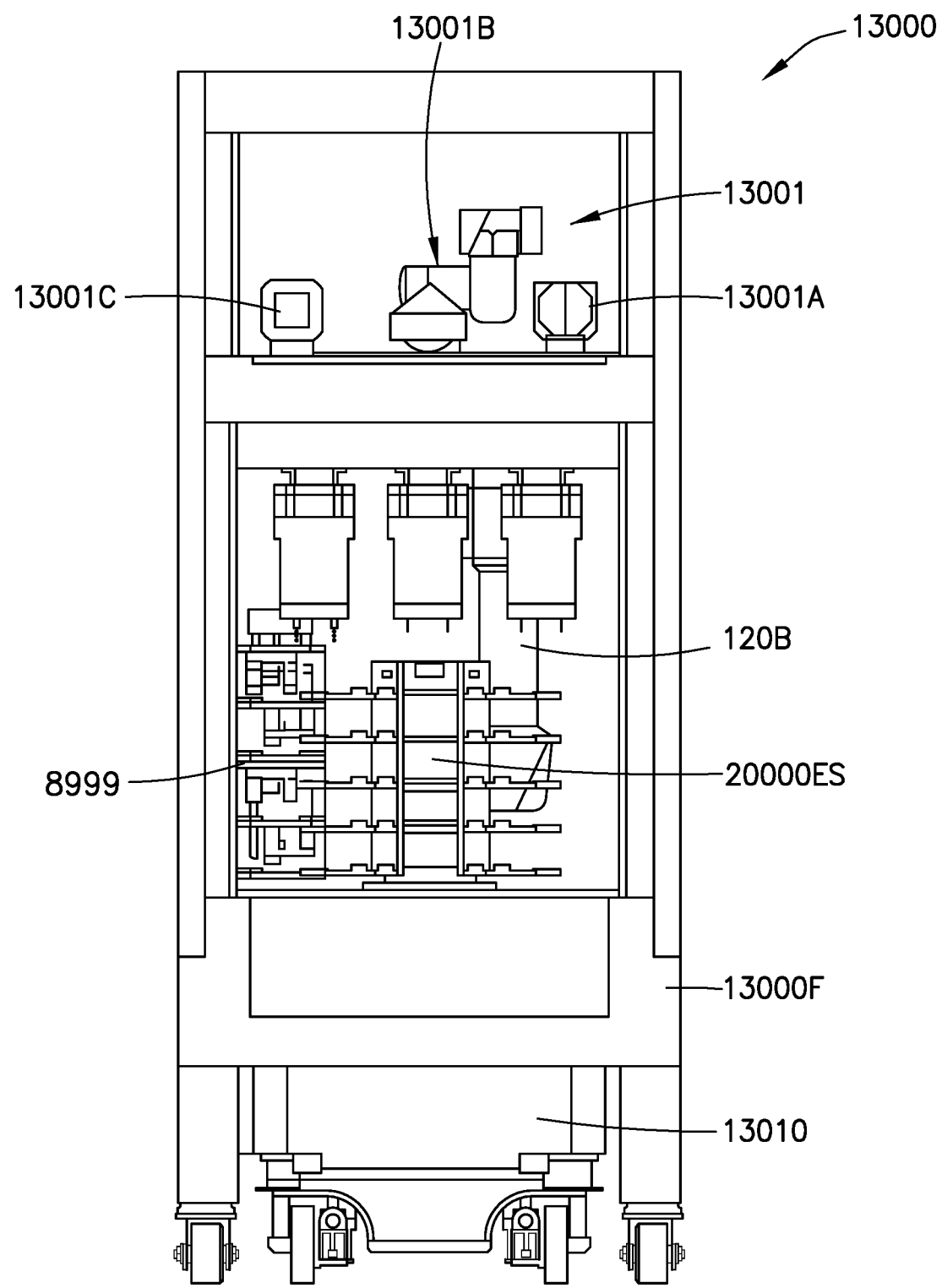
Figure 13E:
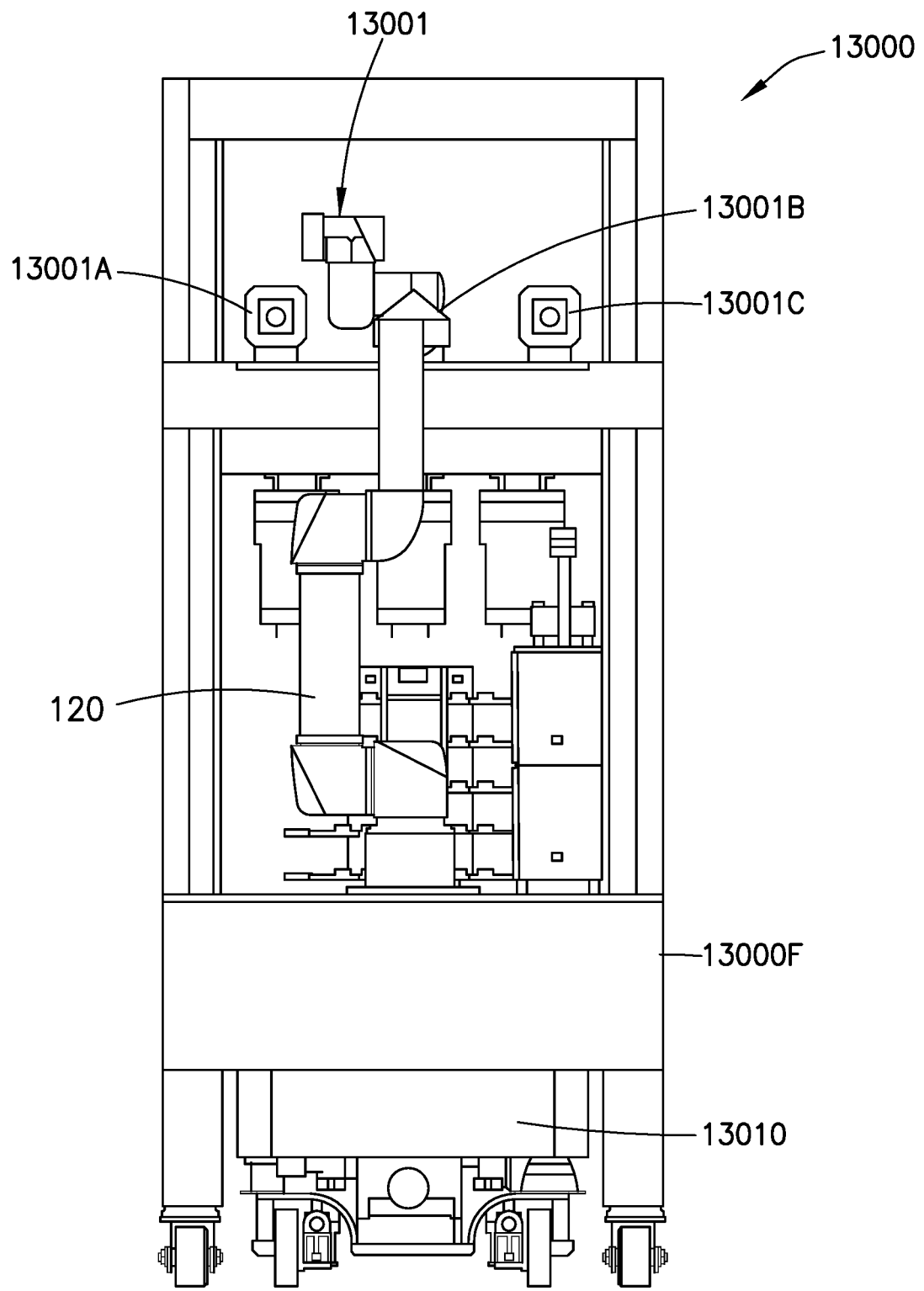

Referring now to FIG. 21, as described herein the storage carousel 20000ES and the storage system 20000 may be employed with any suitable processing equipment. For example, as illustrated in FIG. 21, a centrifuge 1700, dispensers 1701 and a reader or scanner 1702 are positioned relative to the storage system 20000 and within a reach of the robot 120. Here the robot may transfer lab ware between the storage carousel 20000ES and any one or more of the centrifuge 1700, dispensers 1701 and reader 1702. In one aspect, any one or more of the centrifuge 1700, dispensers 1701 and reader 1702 may be vertically stacked where the robot 120 is configured with a Z-axis (as described above) for accessing the vertically stacked centrifuge 1700, dispensers 1701 and reader 1702. FIG. 11C for example, illustrates the storage carousel 20000ES as an ambient storage device with one or more lab ware holding nests 900 located on the frame 20000EF of the interchangeable mobile cart. Here the robot 120 transfers lab ware between the storage carousel 20000ES and the nests 900 (or any other suitable processing equipment disposed on the interchangeable mobile cart).

As also illustrated in FIG. 15, the mobile storage system 20000 may be configured as mobile cart 8040 that may lack robot 120 so that the storage carousel 20000ES and the frame 20000EF form a stand-alone mobile unit that may be coupled to or otherwise interfaced with other mobile storage systems or any other suitable processing equipment (such any one of the dock frame modules 150 and/or mobile carts described herein) where a robot 120 of the other interchangeable mobile carts (or other processing equipment such as the dock frame modules 150) substantially directly accesses the storage carousel 20000ES for transferring lab ware to and from the storage carousel 20000ES.

Figure 30:
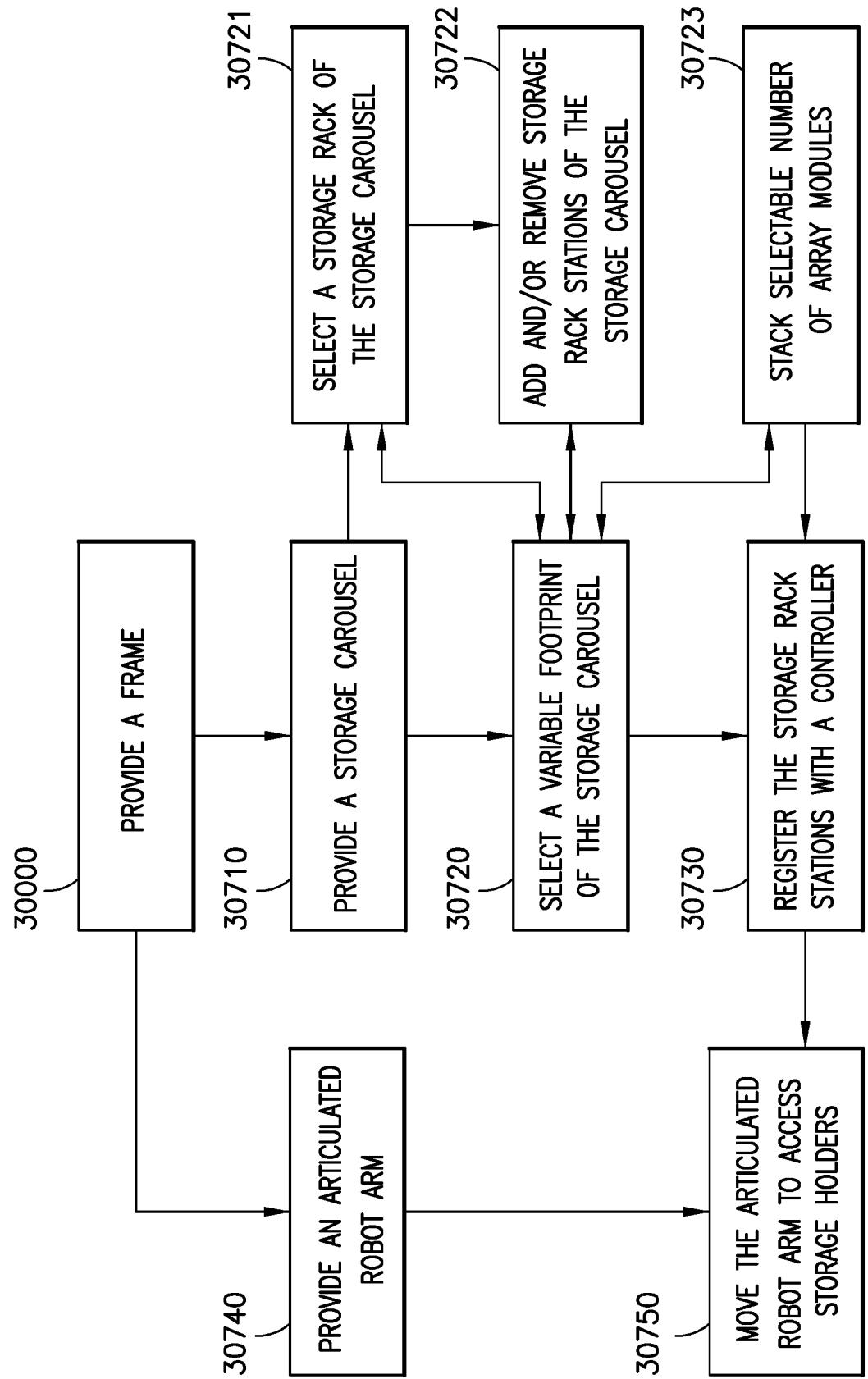
FIG. 30 is an exemplary flow diagram of a method in accordance with aspects of the disclosed embodiment.

Referring now to FIGS. 1A, 20A, 20B, and 22A-22C an exemplary method will be described for storing climate controlled process samples (such as in sample holders) in a facility space SPC, having different climate sections (such as climate sections CL1, CL2 shown in FIGS. 4A and 5 where the robotic processing system of FIG. 4A is located within climate section CL1 and the robotic processing system of FIG. 5 is located in climate section CL2). The different climate sections may be formed in any suitable manner such as with any suitable enclosure or rooms in the facility space SPC each with different climates and at least one of which is a controlled climate other than room habitation climate RCL. In one aspect, storage array 530A disposed on an interchangeable mobile cart is movable as a unit with the cart in the facility space SPC to the controlled climate section CL1, CL2 from another of the different climate sections CL1, CL2 for example. The method includes providing a frame 20000EF (FIG. 30, Block 30000). A storage carousel 20000ES is also provided (FIG. 30, Block 30710) and is mounted to the frame. The storage carousel 20000ES is sized and shaped so that the frame 20000EF and storage carousel mounted thereto are movable as a unit, the storage carousel defining an array of holder storage racks, each disposed for storage therein of stacked sample holders, removably mounted to and distributed at a storage rack station, each storage rack station with a rack location, of the carousel. A variable footprint D, D1 of the storage carousel 20000ES is selected (FIG. 30, Block 30720) by selecting a variable total number of the storage rack stations 530 forming the array 530A, where the storage rack stations 530 are selectable between different numbers of more than one total storage rack stations 530 by selectably adding or removing storage rack stations 530 to the array 530A so as to correspondingly increase or decrease the selected total number of storage rack stations 530 from a first total number of the more than one total storage rack stations 530 to a different second total number of the more than one total storage rack stations 530 within a common enclosed perimeter PER of the storage carousel 20000ES.

In one aspect, the method includes selecting the storage rack 521 (FIG. 30, Block 30721) at each of the storage rack stations 530 from a number of different interchangeable storage rack modules 850M, 851M, 852M (FIGS. 23A-23C) at least one of which has a different predetermined storage characteristic, defining an in rack storage arrangement of sample holders (or nests) 900 (FIGS. 23A-23C), than another storage rack module 850M, 851M, 852M from the number of different interchangeable storage rack modules 850M, 851M, 852M. storage rack stations 530 may be added and removed (FIG. 30, Block 30722) to and from the storage carousel 20000ES by correspondingly coupling and decoupling the selected different interchangeable storage rack modules 850M, 851M, 852M to the storage carousel 20000ES, where each of the different interchangeable storage rack modules 850M, 851M, 852M is configured so that each defines a corresponding storage rack station 530 and storage rack 521. The selected total number of storage rack stations 530 of the array 530A and a predetermined storage characteristic affecting storage arrangement of the interchangeable storage rack modules 850M, 851M, 852M at each storage rack station of the total storage rack stations of the storage carousel are registered with a controller (such as those described herein) (FIG. 30, Block 30730). In one aspect, the selectable number of different array modules 880 may be stacked (FIG. 30, Block 30723) so as to provide the storage carousel 20000ES with different array module levels 870-873, at least one of the array modules 880 having the array 530A of holder storage rack 530, and another of the different array modules 880 having a different array 530A of holder storage racks 530.

A robotic transport arm 120 is provided (FIG. 30, Block 30740) and is mounted to the frame 20000EF so that the frame 20000EF, the storage carousel 20000ES and the articulated arm robot 120 are movable as a unit. The articulated arm robot is moved (FIG. 30, Block 30750) relative to the frame so as to access, along at least one substantially horizontal axis, each storage holder in each storage rack module at each storage rack station of the storage carousel.

Figure 33:
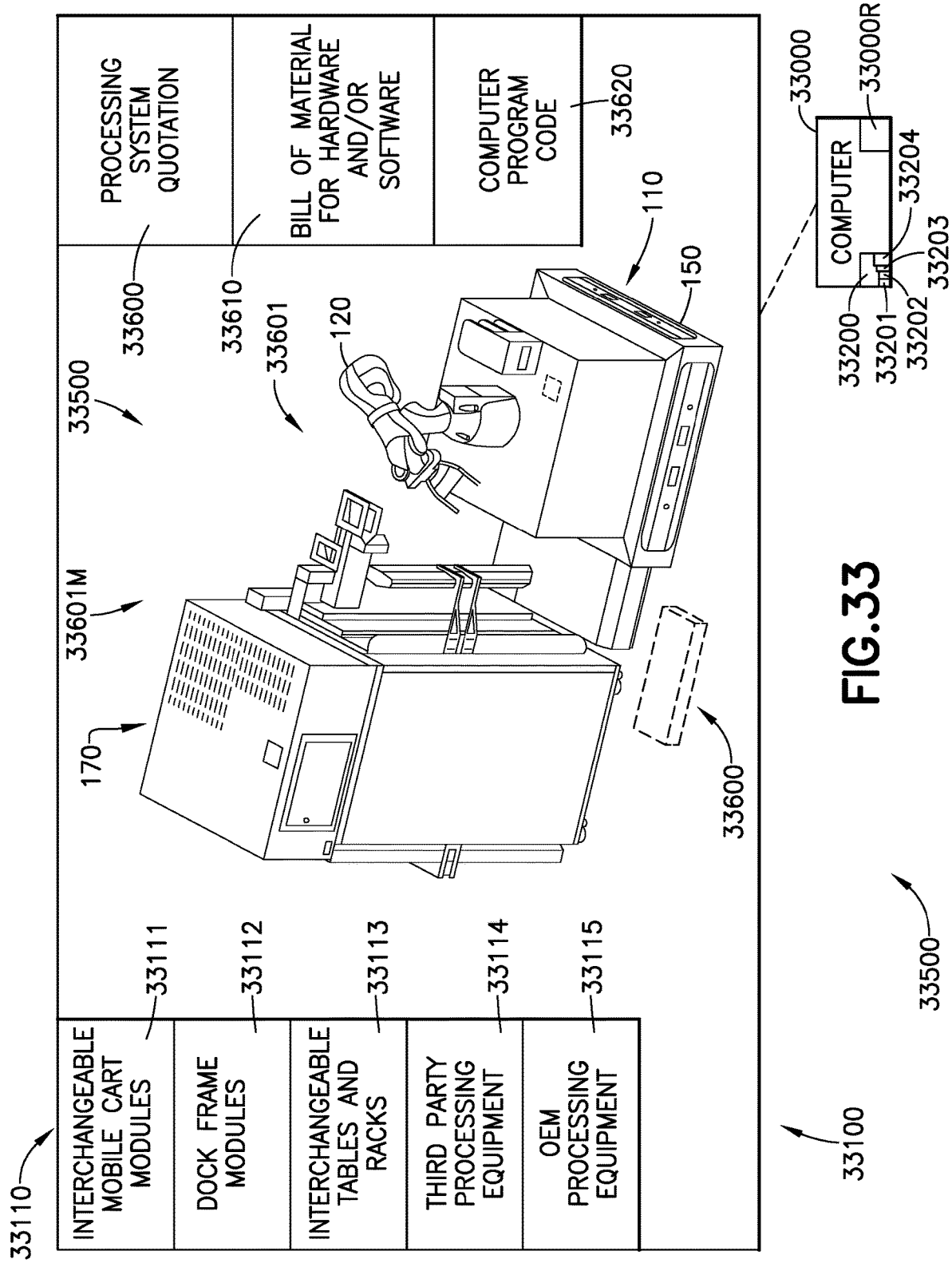
FIG. 33 is an exemplary illustration of a robotic processing system configurator in accordance with aspects of the disclosed embodiment.
Figure 34A:
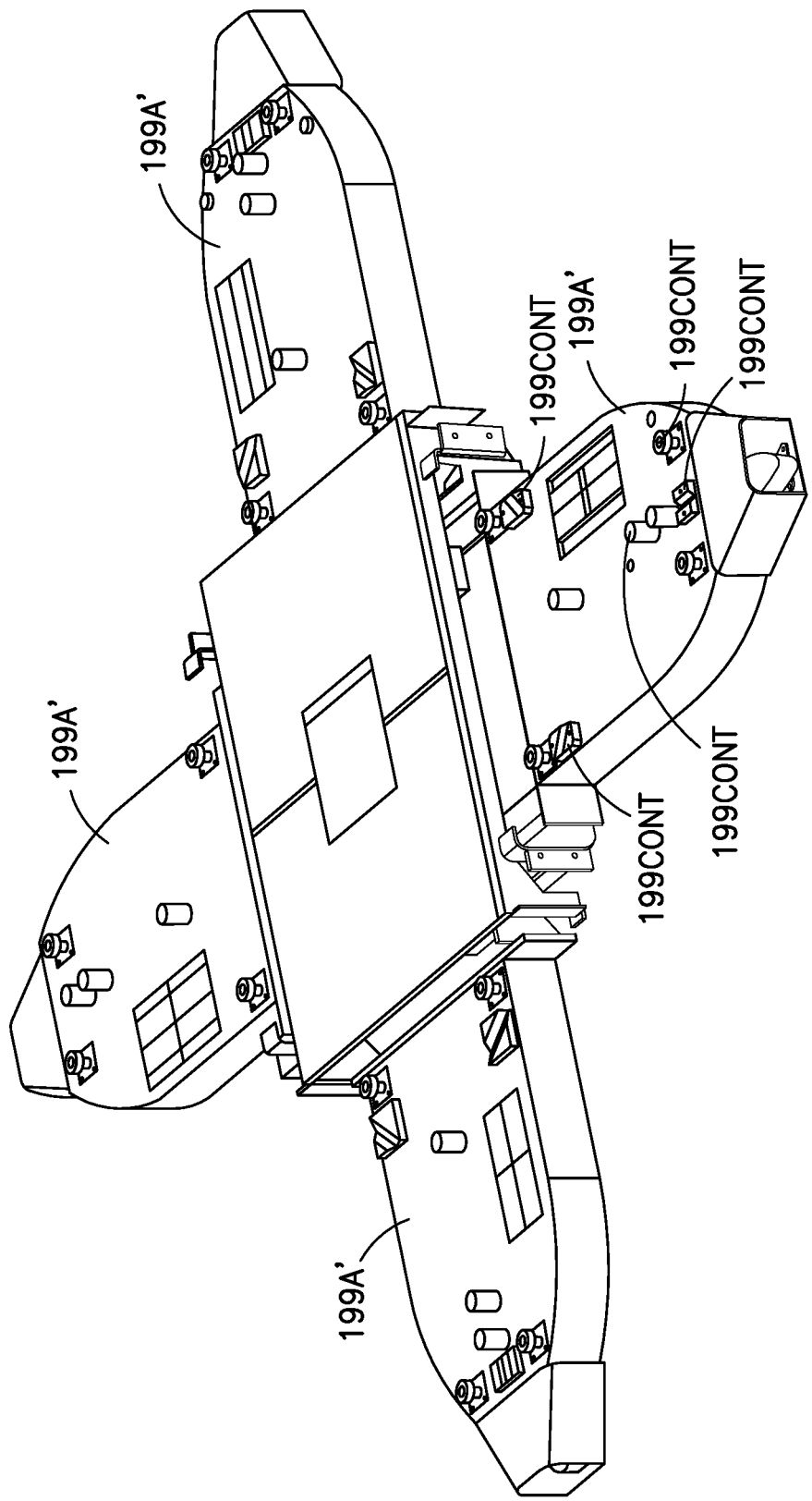
Figure 34C:
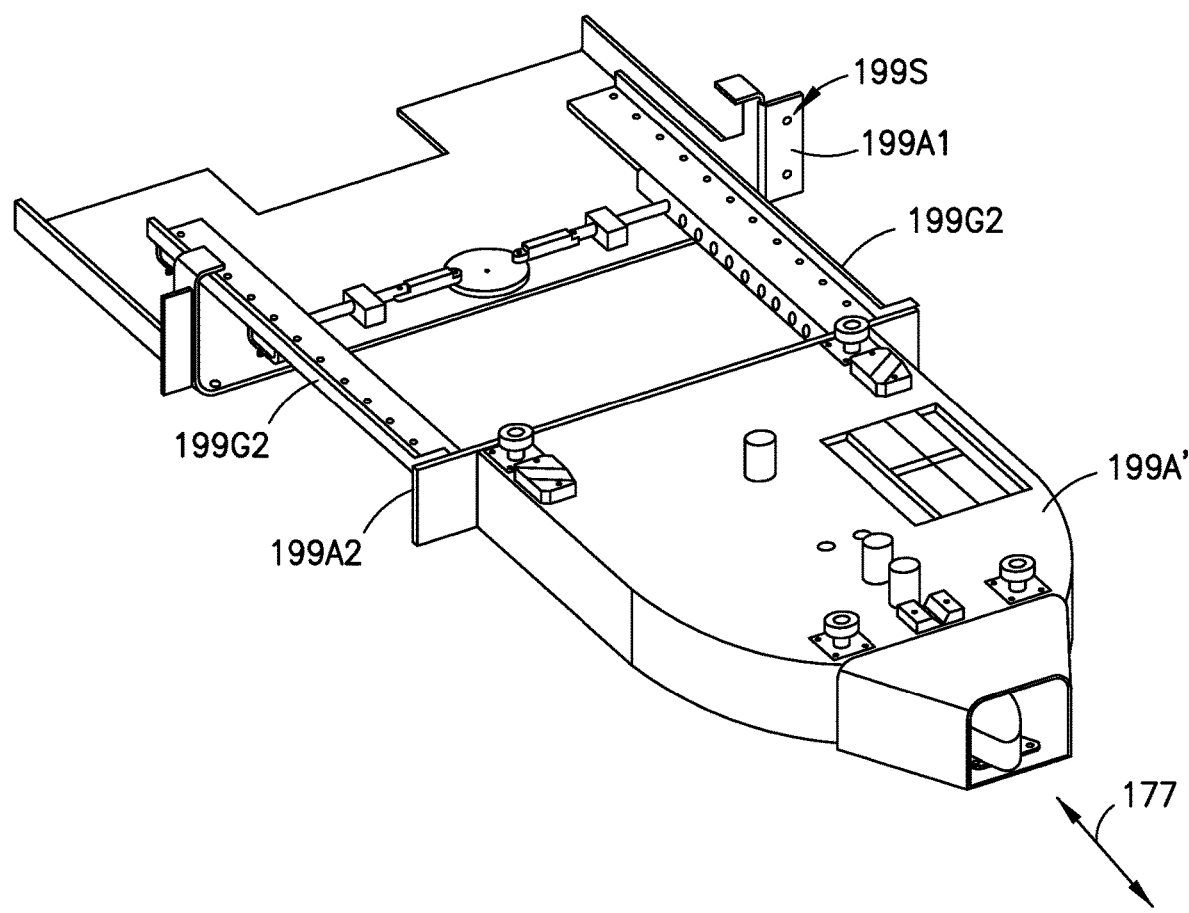

Referring to FIG. 33 an automated biochemical or chemical processing laboratory modeling tool 33500 may be provided for configuring, generating a price quotation, and/or generating a bill of materials for robotic processing systems 100, such as those described herein. The tool 33500 includes an input device 33200 and a processor 33000 coupled to the input device 33200 and having a register 33000R arranged so as to define a general representative laboratory configuration 33600. The general representative laboratory configuration 33600 includes a dock frame 199, with a linearly elongated configuration formed of a number of dock frame modules 150, a number of laboratory stations (disposed on or formed by the cart modules 170), including one or more processing and/or one or more laboratory sample storage stations, the number of laboratory stations being arrayed along a side of and interfacing the dock frame 199, and an array of cart modules 170 along the side and coupled to the dock frame 199, each cart module 170 of the array being interchangeable from a number of different cart modules 170 and configured to position at least one of the laboratory stations in a predetermined position relative to the dock frame 199.

The processor 33000 may be programmed with any suitable non-transitory computer program code for effecting the configuring the robotic processing systems, generating a price quotation, and/or generating a bill of materials as described herein. For example, the processor 33000 is configured to receive data from the input device 33200 identifying a selection of number of the laboratory stations 33201 and type of the laboratory stations 33202 and a process parameter 33203 relating each of the selected laboratory stations to another for a laboratory process model 33204, and configured to at least one of automatically associate and receive a data input from the input device that associates the selected laboratory stations to at least one cart module 170 so that each of the selected laboratory stations is disposed on cart modules 170. The processor 33000 may also be arranged to automatically configure, from the number, type and laboratory process model for the selected laboratory stations, the general laboratory configuration 33600 to a predetermined laboratory configuration 33601 that determines the number of dock frame modules 150 and configuration of the dock frame 199 and the array of cart modules 170, associated with and positioning the selected laboratory stations (disposed on or formed by the carts) relative to the dock frame 199 to effect the laboratory process according to the laboratory process model 33204.

The processor 33000 is configured to provide a robotic system configurator 33100 that is configured to allow a user to configure a robotic processing system according to, for example, the laboratory process model 33204. Based on the laboratory process model 33204 and the input from the user, the robotic system configurator 33100, through the processor, may present to the user a list 33110 of one or more processing system components that may be used to build a system in accordance with the system requirements. In one aspect, the list 33110 may include a selection of interchangeable mobile cart modules 33111, a selection of dock frame modules 33112, a selection of interchangeable tables and racks 33113, a selection of third party processing equipment 33114, and a selection of processing equipment 33115. It is noted that the selection of original equipment supplier (OES) processing equipment 33115 includes a selection of processing equipment provided by the manufacturer of the robotic processing system being configured (e.g. the Original equipment supplier (OES)) whereas the selection of third party processing equipment includes a selection of processing equipment supplied by third party vendors or manufacturers other than the original equipment supplier.

In one aspect, the processor 33000 is configured to automatically generate solid model 33601M of the predetermined laboratory configuration 33601. The processor 33000 may also be configured to automatically generate a location of the selected laboratory stations in a reference frame of the predetermined laboratory configuration 33601. In another aspect, the processor 33000 may be configured so that the user can drag and drop one or more of the interchangeable mobile carts 170, dock frame modules 150, interchangeable tables and racks 8050, 8060, third party equipment and OES processing equipment into a configuration area 33500 where the system components are substantially automatically coupled to each other in a virtual environment.

In one aspect, the robotic system configurator 33100 may, based on the laboratory process model 33204, determine an optimum placement (e.g., special relationship) of the system components to provide an optimized throughput of the robotic processing system. In other aspects, the components may be arranged as desired by a user where the configurator provides for spatial manipulation of the components relative to each other in the virtual environment. The processor 33000, may be configured to determine optimal processing components to be included in the robotic processing system based on the system requirements. For example, the robotic system configurator 33100 may determine a robot(s) 120 configuration, storage array sizes, etc. that would optimize the configuration and/or throughput of the robotic processing system.

In one aspect, the selected laboratory stations include at least one robot. The processor 33000 is configured to automatically generate position locations of the selected laboratory stations for robot motions to and from the selected laboratory stations, and locations identifying obstacles to robot motions in the predetermined laboratory configuration. The processor 33000 is configured to automatically generate points defining robot motions and trajectories at and between the selected laboratory stations. The processor 33000 is configured to automatically generate robot teach locations.

The robotic system configurator 33100 may also be configured to generate a processing system price quotation from the OES to the customer based on a selected processing system configuration. The robotic system configurator 33100 may also be configured to generate a bill of materials 33610 for one or more of the hardware and software of the selected processing system configuration.

The processing system components used in the robotic system configurator 33100 may be generated in any suitable manner, such as through computer aided design models (e.g., solid models) where the reference datums 199D, 150D, etc. described above establish coupling locations of the processing system components in the configuration area 33500. Alignment of the processing system components based on the reference datums may optimize the system design process and may improve costs with respect to in situ system design adjustments. The alignment of the processing system components within the robotic system configurator 33100 may also provide for the generation, by the robotic system configurator 33100, optimized robot trajectories, optimized pick/place locations, and/or an optimized order of processes. In one aspect, the optimized robot trajectories may include an optimized robot home/rest pose, obstacle avoidance, etc. Generation of the optimized robot trajectories. Pick/place locations, and/or processing order may enable the robotic system configurator 33100 to generate or otherwise output computer program code 33620 for operating the different components of the robotic processing system based on the identified optimized system parameters (e.g., trajectories, placements, processing orders, etc.). Robot teach locations (to effect the trajectories) may also be identified by the robotic system configurator to aid in physical set up of a resulting physical robotic processing system. The computer program code 33620 for operating the different components, the teach points, trajectories, etc. may be saved in any suitable robotic driver program that may be installed in the control system 157 for operating the robotic processing system. The teach points established by the robotic system configurator 33100 may be refined for auto-teaching and re-teaching the physical locations of the system components.

The robotic system configurator 33100 is configured to provide virtual commissioning of a robotic processing system (e.g., robot poses, component locations, teach locations, identification of obstacles with respect to component trajectories, trajectory generation between pick and place locations, etc.) so that design and set up of the resulting physical system is more efficient and less expensive. As noted above, solid models of the different system components may be imported into the robotic system configurator 33100 in any suitable manner and based on the alignments of the system components (as described above) the robotic system configurator 33100 creates robot trajectories, creates and verifies teach points and nest locations (which may facilitate the manufacture of table tops and shelves by providing predetermined locations of processing equipment on the table tops and shelves).

In accordance with one or more aspects of the disclosed embodiment an automated processing system for automated laboratory testing or storage of a biological or chemical sample is provided. The system comprises:

a dock frame including at least one docking interface configured to couple to and interface with at least one of an automated, at least in part, laboratory instrumentation and a storage cabinet, so as to operably couple the at least one of the laboratory instrumentation and the storage cabinet to the dock frame via the docking interface;

wherein the dock frame defines a spine structure of the processing system alongside which a variable number of the at least one of the laboratory instrumentation and the storage cabinet are arrayed, operably coupled to the dock frame, the dock frame extends longitudinally and having a selectably variable elongated configuration with a selectably variable longitudinal length; and at least one dock frame module, including the docking interface, each of the at least one dock frame module being interchangeable with at least another dock frame module, and having control features with a predetermined relationship to a reference datum of the dock frame module and with a reference datum of the dock frame, formed of more than one of the at least one dock frame module and relating the dock frame to each of the more than one dock frame modules, so that the at least one dock frame module is interchangeably coupled in linear configuration with at least the other dock frame module so as to select the variable elongated configuration and longitudinal length of the dock frame from a number of different elongated configurations and longitudinal lengths of the dock frame.

In accordance with one or more aspects of the disclosed embodiment more than one of the at least one dock frame module are joined together forming a coupling node assembly module of the spine structure, with at least two linearly offset facets defining longitudinal sides of the spine structure along which the at least one of the laboratory instrumentation and the storage cabinet are arrayed, each facet including a corresponding one of the at least one dock frame module and respective docking interface.

In accordance with one or more aspects of the disclosed embodiment the coupling node assembly modules are coupled to each other in linear configuration so as to select the variably elongated configuration and longitudinal length of the dock frame, and the at least one of the laboratory instrumentation and the storage cabinet are arrayed at least along facets forming one side of the spine structure.

In accordance with one or more aspects of the disclosed embodiment the coupling node assembly module has a hexahedron shape with opposing facets, each with a dock frame module with a respective docking interface.

In accordance with one or more aspects of the disclosed embodiment the dock frame includes longitudinal sides and lateral sides, the lateral sides having a shorter length than the longitudinal sides, where each longitudinal side includes at least one docking interface.

In accordance with one or more aspects of the disclosed embodiment the dock frame includes longitudinal sides and lateral sides, where the longitudinal sides include at least one docking interface.

In accordance with one or more aspects of the disclosed embodiment the dock frame includes longitudinal sides and lateral sides, where each of the longitudinal sides include at least one respective docking interface.

In accordance with one or more aspects of the disclosed embodiment the dock frame includes longitudinal sides and lateral sides, where the longitudinal sides include at least one docking interface and the lateral sides include at least another docking interface.

In accordance with one or more aspects of the disclosed embodiment the dock frame includes longitudinal sides and lateral sides, where each of the longitudinal sides and each of the lateral sides includes at least one respective docking interface.

In accordance with one or more aspects of the disclosed embodiment the dock frame module comprises a transport arm.

In accordance with one or more aspects of the disclosed embodiment the transport arm is an articulated transport arm.

In accordance with one or more aspects of the disclosed embodiment the dock frame comprises a sliding workstation that moves in a longitudinal direction of the dock frame, where the transport arm is mounted to the sliding workstation so as to move as a unit with the sliding workstation.

In accordance with one or more aspects of the disclosed embodiment the dock frame comprises a sliding workstation that moves in a longitudinal direction of the dock frame, and at least one laboratory sample storage station mounted to the sliding workstation so as to move as a unit with the sliding workstation.

In accordance with one or more aspects of the disclosed embodiment an automated biochemical or chemical processing laboratory comprises:

a dock frame with a linearly elongated configuration formed of a number of dock frame modules;

a number of laboratory stations including one or more of a processing station and a laboratory sample storage station, the number of laboratory stations being arrayed along a side of and interfacing the dock frame;

an array of cart modules along the side and coupled to the dock frame, each cart module of the array of cart modules being interchangeable from a number of different cart modules and configured to position at least one of the laboratory stations in a predetermined position relative to the dock frame; and a modular interface configured so that the array of cart modules are coupled to the dock frame so as to selectively configure the linearly elongated configuration from a first linearly elongated configuration to a second different linearly elongated configuration, where the first linearly elongated configuration has a first predetermined array of laboratory stations and the second linearly elongated configuration has a second different predetermined array of laboratory stations.

In accordance with one or more aspects of the disclosed embodiment the laboratory further comprises at least one dock frame module, including the modular interface, each of the at least one dock frame module being interchangeable with at least another dock frame module, and having control features with a predetermined relationship to a reference datum of the dock frame module and with a reference datum of the dock frame, formed of more than one of the at least one dock frame module and relating the dock frame to each of the more than one dock frame modules, so that the at least one dock frame module is interchangeably coupled in linear configuration with at least the other dock frame module so as to select the linearly elongated configuration from the first linearly elongated configuration and the second different linearly elongated configuration and longitudinal lengths of the dock frame; and select a longitudinal length of the dock frame.

In accordance with one or more aspects of the disclosed embodiment more than one of the at least one dock frame module are joined together forming a coupling node assembly module with at least two linearly offset facets defining longitudinal sides of a spine structure along which the array of cart modules are arrayed, each facet including a corresponding one of the at least one dock frame module and respective portion of the modular interface.

In accordance with one or more aspects of the disclosed embodiment the coupling node assembly modules are coupled to each other in linear configuration so as to select the linearly elongated configuration and the longitudinal length of the dock frame, and the array of cart modules are arrayed at least along facets forming one side of the spine structure.

In accordance with one or more aspects of the disclosed embodiment the coupling node assembly module has a hexahedron shape with opposing facets, each with a dock frame module with a respective portion of the modular interface.

In accordance with one or more aspects of the disclosed embodiment the dock frame includes longitudinal sides and lateral sides, the lateral sides having a shorter length than the longitudinal sides, where each longitudinal side includes at least one docking interface.

In accordance with one or more aspects of the disclosed embodiment the dock frame includes longitudinal sides and lateral sides, where the longitudinal sides include at least one docking interface.

In accordance with one or more aspects of the disclosed embodiment the dock frame includes longitudinal sides and lateral sides, where each of the longitudinal sides include at least one respective docking interface.

In accordance with one or more aspects of the disclosed embodiment the dock frame includes longitudinal sides and lateral sides, where the longitudinal sides include at least one docking interface and the lateral sides include at least another docking interface.

In accordance with one or more aspects of the disclosed embodiment the dock frame includes longitudinal sides and lateral sides, where each of the longitudinal sides and each of the lateral sides includes at least one respective docking interface.

In accordance with one or more aspects of the disclosed embodiment the dock frame module comprises a transport arm.

In accordance with one or more aspects of the disclosed embodiment the transport arm is an articulated transport arm.

In accordance with one or more aspects of the disclosed embodiment the dock frame comprises a sliding workstation that moves in a longitudinal direction of the dock frame, where the transport arm is mounted to the sliding workstation so as to move as a unit with the sliding workstation.

In accordance with one or more aspects of the disclosed embodiment the dock frame comprises a sliding workstation that moves in a longitudinal direction of the dock frame, and at least one laboratory sample storage station mounted to the sliding workstation so as to move as a unit with the sliding workstation.

In accordance with one or more aspects of the disclosed embodiment at least two cart modules in the array of cart modules comprises a standardized frame.

In accordance with one or more aspects of the disclosed embodiment at least one cart module in the array of cart modules comprises an automated transport arm.

In accordance with one or more aspects of the disclosed embodiment at least one cart module in the array of cart modules comprises a stack shelf open cart configuration, a stacked shelf at least partially enclosed cart configuration, an MIR cart, an open single flat support surface configuration, an at least partially enclosed single flat support surface configuration, a collaborative workspace cart configuration, and a storage configuration.

In accordance with one or more aspects of the disclosed embodiment a method for automated laboratory testing or storage of a biological or chemical sample, the method comprises:

operably coupling at least one of an automated, at least in part, laboratory instrumentation and a storage cabinet to a dock frame via a docking interface of the dock frame so that the dock frame is coupled to an interfaced with the laboratory instrumentation and the storage cabinet;

defining, with the dock frame, a spine structure of an automated processing system and arraying a variable number of the at least one of the laboratory instrumentation and the storage cabinet alongside the spine structure, where the dock frame extends longitudinally and has a selectably variable elongated configuration with a selectably variable longitudinal length; and providing at least one dock frame module, including the docking interface, each of the at least one dock frame module being interchangeable with at least another dock frame module, and having control features with a predetermined relationship to a reference datum of the dock frame module and with a reference datum of the dock frame, formed of more than one of the at least one dock frame module and relating the dock frame to each of the more than one dock frame modules, so that the at least one dock frame module is interchangeably coupled in linear configuration with at least the other dock frame module so as to select the variable elongated configuration and longitudinal length of the dock frame from a number of different elongated configurations and longitudinal lengths of the dock frame.

In accordance with one or more aspects of the disclosed embodiment the method further comprises joining more than one of the at least one dock frame module together forming a coupling node assembly module of the spine structure, with at least two linearly offset facets defining longitudinal sides of the spine structure along which the at least one of the laboratory instrumentation and the storage cabinet are arrayed, each facet including a corresponding one of the at least one dock frame module and respective docking interface.

In accordance with one or more aspects of the disclosed embodiment the coupling node assembly modules are coupled to each other in linear configuration so as to select the variably elongated configuration and longitudinal length of the dock frame, and the at least one of the laboratory instrumentation and the storage cabinet are arrayed at least along facets forming one side of the spine structure.

In accordance with one or more aspects of the disclosed embodiment the coupling node assembly module has a hexahedron shape with opposing facets, each with a dock frame module with a respective docking interface.

In accordance with one or more aspects of the disclosed embodiment the spine structure is defined, at least in part, with the dock frame that includes longitudinal sides and lateral sides, the lateral sides having a shorter length than the longitudinal sides, where each longitudinal side includes at least one docking interface.

In accordance with one or more aspects of the disclosed embodiment the spine structure is defined, at least in part, with the dock frame that includes longitudinal sides and lateral sides, where the longitudinal sides include at least one docking interface.

In accordance with one or more aspects of the disclosed embodiment the spine structure is defined, at least in part, with the dock frame that includes longitudinal sides and lateral sides, where each of the longitudinal sides include at least one respective docking interface.

In accordance with one or more aspects of the disclosed embodiment the spine structure is defined, at least in part, with the dock frame that includes longitudinal sides and lateral sides, where the longitudinal sides include at least one docking interface and the lateral sides include at least another docking interface.

In accordance with one or more aspects of the disclosed embodiment the spine structure is defined, at least in part, with the dock frame that includes longitudinal sides and lateral sides, where each of the longitudinal sides and each of the lateral sides includes at least one respective docking interface.

In accordance with one or more aspects of the disclosed embodiment the method further comprises providing the dock frame module with a transport arm.

In accordance with one or more aspects of the disclosed embodiment the method further comprises providing the dock frame with a sliding workstation that moves in a longitudinal direction of the dock frame, where a transport arm is mounted to the sliding workstation so as to move as a unit with the sliding workstation.

In accordance with one or more aspects of the disclosed embodiment the method further comprises providing the dock frame with a sliding workstation that moves in a longitudinal direction of the dock frame, where at least one laboratory sample storage station is mounted to the sliding workstation so as to move as a unit with the sliding workstation.

In accordance with one or more aspects of the disclosed embodiment a mobile storage array for storing climate controlled process samples in a facility space having different climate sections in the facility space each with different climates at least one of which is a controlled climate other than room habitation climate, the mobile storage array being movable as a unit in the facility space to the controlled climate section from another of the different climate sections is provided. The mobile storage array comprising:

a frame; and a storage carousel mounted to the frame and sized and shaped so that frame and storage carousel mounted thereto are movable as a unit, the storage carousel defining an array of holder storage racks, each disposed for storage therein of stacked sample holders, removably mounted to and distributed at a storage rack station, each storage rack station with a rack location, of the storage carousel;

wherein the storage carousel has a selectably variable footprint and has a selectably variable total number of the storage rack stations forming the array, selectable between different numbers of more than one total storage rack stations by selectably adding or removing storage rack stations to the array so as to correspondingly increase or decrease the selected total number of storage rack stations from a first total number of the more than one total storage rack stations to a different second total number of the more than one total storage rack stations within a common enclosed perimeter of the carousel.

In accordance with one or more aspects of the disclosed embodiment the selectably variable footprint of the storage carousel depends on a selected total number of the more than one total rack stations.

In accordance with one or more aspects of the disclosed embodiment changing the total number of the more than one total storage rack stations from the first total number of the more than one total storage rack stations to the different second total number of the more than one total storage rack stations effects selection of the selectably variably footprint from a first selectable predetermined footprint size to a second selectable predetermined footprint size.

In accordance with one or more aspects of the disclosed embodiment the first selectable predetermined footprint size corresponds to the first total number of the more than one total storage rack stations, and the second selectable predetermined footprint size corresponds to the second total number of the more than one total storage rack stations.

In accordance with one or more aspects of the disclosed embodiment each of the different selectable total number of the more than one total storage rack stations defines a different corresponding predetermined footprint size of the carousel.

In accordance with one or more aspects of the disclosed embodiment the storage rack at each of the storage rack stations is selectable from a number of different interchangeable storage rack modules at least one of which has a different predetermined storage characteristic, defining an in rack storage arrangement of sample holders, than another storage rack module from the number of different interchangeable storage rack modules.

In accordance with one or more aspects of the disclosed embodiment the predetermined storage characteristic is a stacked storage holder capacity of the storage rack module, so that at least one of the different interchangeable storage rack modules has a different capacity of storage holders stacked therein than another capacity of storage holders stacked in another of the different interchangeable storage rack modules.

In accordance with one or more aspects of the disclosed embodiment the predetermined storage characteristic is an in/out access opening configuration, disposed to access stacked storage holders in the storage rack module, which access opening is configured in at least one of the different interchangeable storage rack modules so as to provide for different access to the stacked storage holders than access provided by another opening configuration of another of the interchangeable storage rack modules.

In accordance with one or more aspects of the disclosed embodiment each of the different interchangeable storage rack modules is configured so that each defines a corresponding storage rack station and storage rack, and respective coupling and decoupling of the selected different interchangeable storage rack modules to the storage carousel correspondingly adds and removes storage rack stations and storage racks to and from the storage carousel.

In accordance with one or more aspects of the disclosed embodiment the mobile storage array further comprises a controller communicably connected to the storage carousel so as to register the selected total number of storage rack stations of the array, and a predetermined storage characteristic affecting storage arrangement of the interchangeable storage rack modules at each storage rack station of the total storage rack stations of the storage carousel.

In accordance with one or more aspects of the disclosed embodiment the mobile storage array further comprises an articulated arm robot mounted to the frame so that the frame, the storage carousel and the articulated arm robot are movable as a unit, and wherein the articulated arm robot is configured so as to move relative to the frame so as to access, along at least one substantially horizontal axis, each storage holder in each storage rack module at each storage rack station of the storage carousel.

In accordance with one or more aspects of the disclosed embodiment the storage carousel has a selectable number of different array modules stacked so to provide different array module levels, at least one of the array modules having the array of holder storage racks, and another of the different array modules having a different array of holder storage racks.

In accordance with one or more aspects of the disclosed embodiment the selectably variable footprint of the storage carousel is sized so as to fit within the bounds of an enclosure that encloses the storage carousel.

In accordance with one or more aspects of the disclosed embodiment a storage array for storing climate controlled process samples in a controlled climate section of a facility is provided. The storage array comprising:
a frame; and
a storage carousel movably mounted to the frame, the storage carousel defining an array of holder storage racks, each disposed for storage therein of stacked sample holders, removably mounted to and distributed at a storage rack station, each storage rack station with a rack location, of the carousel;
wherein the storage carousel has a selectably variable footprint and has a selectably variable total number of the storage rack stations forming the array, selectable between different numbers of more than one total storage rack stations by selectably adding or removing storage rack stations to the array so as to correspondingly increase or decrease the selected total number of storage rack stations from a first total number of the more than one total storage rack stations to a different second total number of the more than one total storage rack stations within a common enclosed perimeter of the carousel.

In accordance with one or more aspects of the disclosed embodiment the selectably variable footprint of the storage carousel depends on a selected total number of the more than one total rack stations.

In accordance with one or more aspects of the disclosed embodiment changing the total number of the more than one total storage rack stations from the first total number of the more than one total storage rack stations to the different second total number of the more than one total storage rack stations effects selection of the selectably variably footprint from a first selectable predetermined footprint size to a second selectable predetermined footprint size.

In accordance with one or more aspects of the disclosed embodiment the first selectable predetermined footprint size corresponds to the first total number of the more than one total storage rack stations, and the second selectable predetermined footprint size corresponds to the second total number of the more than one total storage rack stations.

In accordance with one or more aspects of the disclosed embodiment each of the different selectable total number of the more than one total storage rack stations defines a different corresponding predetermined footprint size of the carousel.

In accordance with one or more aspects of the disclosed embodiment the storage rack at each of the storage rack stations is selectable from a number of different interchangeable storage rack modules at least one of which has a different predetermined storage characteristic, defining an in rack storage arrangement of sample holders, than another storage rack module from the number of different interchangeable storage rack modules.

In accordance with one or more aspects of the disclosed embodiment the predetermined storage characteristic is a stacked storage holder capacity of the storage rack module, so that at least one of the different interchangeable storage rack modules has a different capacity of storage holders stacked therein than another capacity of storage holders stacked in another of the different interchangeable storage rack modules.

In accordance with one or more aspects of the disclosed embodiment the predetermined storage characteristic is an in/out access opening configuration, disposed to access stacked storage holders in the storage rack module, which access opening is configured in at least one of the different interchangeable storage rack modules so as to provide for different access to the stacked storage holders than access provided by another opening configuration of another of the interchangeable storage rack modules.

In accordance with one or more aspects of the disclosed embodiment each of the different interchangeable storage rack modules is configured so that each defines a corresponding storage rack station and storage rack, and respective coupling and decoupling of the selected different interchangeable storage rack modules to the storage carousel correspondingly adds and removes storage rack stations and storage racks to and from the storage carousel.

In accordance with one or more aspects of the disclosed embodiment the mobile storage array further comprises a controller communicably connected to the storage carousel so as to register the selected total number of storage rack stations of the array, and a predetermined storage characteristic affecting storage arrangement of the storage rack modules at each storage rack station of the total storage rack stations of the storage carousel.

In accordance with one or more aspects of the disclosed embodiment a mobile storage array for storing climate controlled process samples in a facility space having different climate sections in the facility space each with different climates at least one of which is a controlled climate other than room habitation climate, the storage array being movable by hand in the facility space to the controlled climate section from another of the different climate sections is provided. The mobile storage array comprises:

a movable frame sized and shaped for hand carting movement relative to the different climate sections having controlled climates therein;

a storage array, with an array of storage locations for holding process samples therein, movably mounted to and dependent from the movable frame so as to move as a unit with the movable frame, the storage array movable mounting to the movable frame providing the storage array, mounted to the movable frame, a degree of freedom of motion relative to the movable frame; and a drive section mounted to the movable frame so as to move as a unit with the movable frame, the drive section having a motor driving a drive shaft defining at least one independent drive axis operably coupled to the storage array so that the at least one independent drive axis drives storage array movement in the degree of freedom relative to the movable frame, wherein the drive section includes a seal that isolates each shaft of the drive section in a sealed environment from each motor stator of the motor, and each seal that isolates each shaft in the sealed environment from each motor stator is a static seal.

In accordance with one or more aspects of the disclosed embodiment the sealed environment is common with the controlled climate of one of the climate sections of the different climate sections.

In accordance with one or more aspects of the disclosed embodiment a method for storing climate controlled process samples in a facility space, having different climate sections in the facility space each with different climates at least one of which is a controlled climate other than room habitation climate, in a mobile storage array that is movable as a unit in the facility space to the controlled climate section from another of the different climate sections is provided. The method comprises:

providing a frame;

providing a storage carousel, mounted to the frame, that is sized and shaped so that the frame and storage carousel mounted thereto are movable as a unit, the storage carousel defining an array of holder storage racks, each disposed for storage therein of stacked sample holders, removably mounted to and distributed at a storage rack station, each storage rack station with a rack location, of the carousel;

selecting a variable footprint of the storage carousel by selecting a variable total number of the storage rack stations forming the array, where the storage rack stations are selectable between different numbers of more than one total storage rack stations by selectably adding or removing storage rack stations to the array so as to correspondingly increase or decrease the selected total number of storage rack stations from a first total number of the more than one total storage rack stations to a different second total number of the more than one total storage rack stations within a common enclosed perimeter of the storage carousel.

In accordance with one or more aspects of the disclosed embodiment the variable footprint of the storage carousel depends on a selected total number of the more than one total rack stations.

In accordance with one or more aspects of the disclosed embodiment changing the total number of the more than one total storage rack stations from the first total number of the more than one total storage rack stations to the different second total number of the more than one total storage rack stations effects selection of the selectably variably footprint from a first selectable predetermined footprint size to a second selectable predetermined footprint size.

In accordance with one or more aspects of the disclosed embodiment the first selectable predetermined footprint size corresponds to the first total number of the more than one total storage rack stations, and the second selectable predetermined footprint size corresponds to the second total number of the more than one total storage rack stations.

In accordance with one or more aspects of the disclosed embodiment each of the different selectable total number of the more than one total storage rack stations defines a different corresponding predetermined footprint size of the carousel.

In accordance with one or more aspects of the disclosed embodiment the method further comprises selecting the storage rack at each of the storage rack stations from a number of different interchangeable storage rack modules at least one of which has a different predetermined storage characteristic, defining an in rack storage arrangement of sample holders, than another storage rack module from the number of different interchangeable storage rack modules.

In accordance with one or more aspects of the disclosed embodiment the predetermined storage characteristic is a stacked storage holder capacity of the storage rack module, so that at least one of the different interchangeable storage rack modules has a different capacity of storage holders stacked therein than another capacity of storage holders stacked in another of the different interchangeable storage rack modules.

In accordance with one or more aspects of the disclosed embodiment the predetermined storage characteristic is an in/out access opening configuration, disposed to access stacked storage holders in the storage rack module, which access opening is configured in at least one of the different interchangeable storage rack modules so as to provide for different access to the stacked storage holders than access provided by another opening configuration of another of the interchangeable storage rack modules.

In accordance with one or more aspects of the disclosed embodiment the method further comprises adding and removing storage rack stations and storage racks to and from the storage carousel by correspondingly coupling and decoupling the selected different interchangeable storage rack modules to the storage carousel, where each of the different interchangeable storage rack modules is configured so that each defines a corresponding storage rack station and storage rack.

In accordance with one or more aspects of the disclosed embodiment the method further comprises registering, with a controller communicably connected to the storage carousel, the selected total number of storage rack stations of the array, and a predetermined storage characteristic affecting storage arrangement of the interchangeable storage rack modules at each storage rack station of the total storage rack stations of the storage carousel.

In accordance with one or more aspects of the disclosed embodiment the method further comprises:

providing an articulated arm robot mounted to the frame so that the frame, the storage carousel and the articulated arm robot are movable as a unit; and moving the articulated arm robot relative to the frame so as to access, along at least one substantially horizontal axis, each storage holder in each storage rack module at each storage rack station of the storage carousel.

In accordance with one or more aspects of the disclosed embodiment the method further comprises stacking a selectable number of different array modules so as to provide the storage carousel with different array module levels, at least one of the array modules having the array of holder storage racks, and another of the different array modules having a different array of holder storage racks.

In accordance with one or more aspects of the disclosed embodiment the selectably variable footprint of the storage carousel is sized so as to fit within the bounds of an enclosure that encloses the storage carousel.

In accordance with one or more aspects of the disclosed embodiment an automated biochemical or chemical processing laboratory modeling tool is provided. The tool comprises:

an input device; and a processor coupled to the input device and having a register arranged so as to define a general representative laboratory configuration comprising;

a dock frame, with a linearly elongated configuration formed of a number of dock frame modules, a number of laboratory stations, including one or more processing and/or one or more laboratory sample storage stations, the number of laboratory stations being arrayed along a side of and interfacing the dock frame, and an array of cart modules along the side and coupled to the dock frame, each cart module of the array being interchangeable from a number of different cart modules and configured to position at least one of the laboratory stations in a predetermined position relative to the dock frame;

wherein the processor is configured to receive data from the input device identifying a selection of number and type of the laboratory stations and a process parameter relating each of the selected laboratory stations to another for a laboratory process model, and configured to at least one of automatically associate and receive a data input from the input device that associates the selected laboratory stations to at least one cart module so that each of the selected laboratory stations is disposed on cart modules; and wherein the processor is arranged to automatically configure, from the number, type and laboratory process model for the selected laboratory stations, the general laboratory configuration to a predetermined laboratory configuration that determines the number of dock frame modules and configuration of the dock frame and the array of cart modules, associated with and positioning the selected laboratory stations relative to the dock frame to effect the laboratory process according to the laboratory process model.

In accordance with one or more aspects of the disclosed embodiment the processor is configured to automatically generate solid model of the predetermined laboratory configuration.

In accordance with one or more aspects of the disclosed embodiment the processor is configured to automatically generate a location of the selected laboratory stations in a reference frame of the predetermined laboratory configuration.

In accordance with one or more aspects of the disclosed embodiment the selected laboratory Stations include at least one robot.

In accordance with one or more aspects of the disclosed embodiment the processor is configured to automatically generate position locations of the selected laboratory stations for robot motions to and from the selected laboratory stations, and locations identifying obstacles to robot motions in the predetermined laboratory configuration.

In accordance with one or more aspects of the disclosed embodiment the processor is configured to automatically generate points defining robot motions and trajectories at and between the selected laboratory stations.

In accordance with one or more aspects of the disclosed embodiment the processor is configured to automatically generate robot teach locations.

In accordance with one or more aspects of the disclosed embodiment an automated processing system for automated laboratory testing or storage of biological or chemical sample is provided. The system includes:

a dock frame having reference features disposed on a side of the dock frame;

a dock coupling disposed on the side of the dock frame and configured to operably couple and interface one or more of interchangeable carts and interchangeable dock frame modules to the dock frame, the dock coupling includes control features having a predetermined relationship to the reference features of the dock frame, where the control features are disposed on the side of the dock frame so that the dock frame has a repeatable coupling interface on a common side coupling datum plane, of the dock frame, that interchangeably couples the one or more of interchangeable carts and interchangeable dock frame modules in a repeatable pose.

In accordance with one or more aspects of the disclosed embodiment the common side coupling datum plane is disposed proximate a backside of coupling engagement with the dock coupling so that a coupling structure of the dock coupling forms a thin profile on a side of the dock frame having a substantially zero footprint between the dock frame and a coupled one of the one or more of interchangeable carts and interchangeable dock frame modules to the dock frame.

In accordance with one or more aspects of the disclosed embodiment the dock coupling is adjustable so as to control a spacing between the dock frame and a coupled one of the one or more of interchangeable carts and interchangeable dock frame modules depending on a predetermined laboratory process facilitated by coupling the dock frame with the coupled one of the one or more of interchangeable carts and interchangeable dock frame modules.

In accordance with one or more aspects of the disclosed embodiment a universal laboratory cart is provided. The universal laboratory cart includes:

a rolling cart frame configured to traverse so as to effect cart travel on and across a facility floor via an autonomous drive and optionally via manual handling, on which facility floor is disposed more than one processing station for processing laboratory samples and/or sample holders;

the rolling cart frame having supports arranged common with other different rolling cart frames of other universal laboratory carts interchangeable with the universal laboratory cart, at least one of the supports being configured to define a processing section configurable with a number of different processing modules selectably connected to and carried by the rolling cart frame, each of the different processing modules having a different predetermined laboratory processing function with a different predetermined function characteristic corresponding to the processing module, each different processing module being selectably mounted to the at least one of the supports to effect, with a corresponding predetermined function, selectable change of configuration of the processing section so as to provide the processing section, comporting to a process of at least one processing station of the more than one processing station; and a common interface coupling connected to the rolling cart frame, the common interface coupling having a common arrangement with other common interface couplings on the other different rolling cart frames of the other universal laboratory carts, the common interface coupling having predetermined position control features conformal so as to repeatably couple the universal laboratory cart with each of the more than one processing station both via the autonomous drive and optionally via manual handling.

In accordance with one or more aspects of the disclosed embodiment the universal laboratory cart further includes a controller communicably connected to each different processing module, so as to automatically register the selected processing module mounted to the at least one of the supports, from the different processing modules, and the corresponding predetermined function of the selected processing module comporting to the process of the at least one processing station.

In accordance with one or more aspects of the disclosed embodiment the universal laboratory cart has one of an open configuration and a closed configuration.

In accordance with one or more aspects of the disclosed embodiment the universal laboratory cart further includes a common drive coupling connected to the rolling cart frame, the common drive coupling having a common arrangement with other common drive couplings on the other different rolling cart frames of the other universal laboratory carts, the common drive coupling and other common drive couplings being configured for removable coupling a common autonomous drive to the rolling cart frame of the universal laboratory cart and each other rolling cart frames of the other universal laboratory carts.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated processing system for automated laboratory testing or storage of a biological or chemical sample, the system comprising:

a dock frame including at least one docking interface configured to couple to and interface with at least one of an automated, at least in part, laboratory instrumentation and a storage cabinet, so as to operably couple the at least one of the laboratory instrumentation and the storage cabinet to the dock frame via the docking interface;

wherein the dock frame defines a spine structure of the processing system alongside which a variable number of the at least one of the laboratory instrumentation and the storage cabinet are arrayed, operably coupled to the dock frame, the dock frame extends longitudinally and having a selectably variable elongated configuration with a selectably variable longitudinal length; and at least one dock frame module, including the docking interface, each of the at least one dock frame module being interchangeable with at least another dock frame module, and having control features with a predetermined relationship to a reference datum of the dock frame module and with a reference datum of the dock frame, formed of more than one of the at least one dock frame module and relating the dock frame to each of the more than one dock frame modules, so that the at least one dock frame module is interchangeably coupled in linear configuration with at least the other dock frame module so as to select the variable elongated configuration and longitudinal length of the dock frame from a number of different elongated configurations and longitudinal lengths of the dock frame.

2. The system of claim 1, wherein the dock frame includes longitudinal sides and lateral sides, the lateral sides having a shorter length than the longitudinal sides, where each longitudinal side includes at least one docking interface.

3. The system of claim 1, wherein the dock frame includes longitudinal sides and lateral sides, where the longitudinal sides include at least one docking interface.

4. The system of claim 1, wherein the dock frame includes longitudinal sides and lateral sides, where each of the longitudinal sides include at least one respective docking interface.

5. The system of claim 1, wherein the dock frame includes longitudinal sides and lateral sides, where the longitudinal sides include at least one docking interface and the lateral sides include at least another docking interface.

6. The system of claim 1, wherein the dock frame includes longitudinal sides and lateral sides, where each of the longitudinal sides and each of the lateral sides includes at least one respective docking interface.

7. The system of claim 1, wherein the dock frame comprises a sliding workstation that moves in a longitudinal direction of the dock frame, and at least one laboratory sample storage station mounted to the sliding workstation so as to move as a unit with the sliding workstation.

8. The system of claim 1, wherein more than one of the at least one dock frame module are joined together forming a coupling node assembly module of the spine structure, with at least two linearly offset facets defining longitudinal sides of the spine structure along which the at least one of the laboratory instrumentation and the storage cabinet are arrayed, each facet including a corresponding one of the at least one dock frame module and respective docking interface.

9. The system of claim 8, wherein the coupling node assembly modules are coupled to each other in linear configuration so as to select the variably elongated configuration and longitudinal length of the dock frame, and the at least one of the laboratory instrumentation and the storage cabinet are arrayed at least along facets forming one side of the spine structure.

10. The system of claim 8, wherein the coupling node assembly module has a hexahedron shape with opposing facets, each with a dock frame module with a respective docking interface.

11. The system of claim 1, wherein the dock frame module comprises a transport arm.

12. The system of claim 11, wherein the transport arm is an articulated transport arm.

13. The system of claim 11, wherein the dock frame comprises a sliding workstation that moves in a longitudinal direction of the dock frame, where the transport arm is mounted to the sliding workstation so as to move as a unit with the sliding workstation.

14. An automated biochemical or chemical processing laboratory comprising:
a dock frame with a linearly elongated configuration formed of a number of dock frame modules;
a number of laboratory stations including one or more of a processing station and a laboratory sample storage station, the number of laboratory stations being arrayed along a side of and interfacing the dock frame;
an array of cart modules along the side and coupled to the dock frame, each cart module of the array of cart modules being interchangeable from a number of different cart modules and configured to position at least one of the laboratory stations in a predetermined position relative to the dock frame; and
a modular interface configured so that the array of cart modules are coupled to the dock frame so as to selectively configure the linearly elongated configuration from a first linearly elongated configuration to a second different linearly elongated configuration, where the first linearly elongated configuration has a first predetermined array of laboratory stations and the second linearly elongated configuration has a second different predetermined array of laboratory stations.

15. The laboratory of claim 14, wherein the dock frame includes longitudinal sides and lateral sides, the lateral sides having a shorter length than the longitudinal sides, where each longitudinal side includes at least one docking interface.

16. The laboratory of claim 14, wherein the dock frame includes longitudinal sides and lateral sides, where the longitudinal sides include at least one docking interface.

17. The laboratory of claim 14, wherein the dock frame includes longitudinal sides and lateral sides, where each of the longitudinal sides include at least one respective docking interface.

18. The laboratory of claim 14, wherein the dock frame includes longitudinal sides and lateral sides, where the longitudinal sides include at least one docking interface and the lateral sides include at least another docking interface.

19. The laboratory of claim 14, wherein the dock frame includes longitudinal sides and lateral sides, where each of the longitudinal sides and each of the lateral sides includes at least one respective docking interface.

20. The laboratory of claim 14, wherein the dock frame comprises a sliding workstation that moves in a longitudinal direction of the dock frame, and at least one laboratory sample storage station mounted to the sliding workstation so as to move as a unit with the sliding workstation.

21. The laboratory of claim 14, wherein at least two cart modules in the array of cart modules comprises a standardized frame.

22. The laboratory of claim 14, wherein at least one cart module in the array of cart modules comprises an automated transport arm.

23. The laboratory of claim 14, wherein at least one cart module in the array of cart modules comprises a stack shelf open cart configuration, a stacked shelf at least partially enclosed cart configuration, an MIR cart, an open single flat support surface configuration, an at least partially enclosed single flat support surface configuration, a collaborative workspace cart configuration, and a storage configuration.

24. The laboratory of claim 14, wherein the dock frame module comprises a transport arm.

25. The laboratory of claim 24, wherein the transport arm is an articulated transport arm.

26. The laboratory of claim 24, wherein the dock frame comprises a sliding workstation that moves in a longitudinal direction of the dock frame, where the transport arm is mounted to the sliding workstation so as to move as a unit with the sliding workstation.

27. The laboratory of claim 14, further comprising at least one dock frame module, including the modular interface, each of the at least one dock frame module being interchangeable with at least another dock frame module, and having control features with a predetermined relationship to a reference datum of the dock frame module and with a reference datum of the dock frame, formed of more than one of the at least one dock frame module and relating the dock frame to each of the more than one dock frame modules, so that the at least one dock frame module is interchangeably coupled in linear configuration with at least the other dock frame module so as to
select the linearly elongated configuration from the first linearly elongated configuration and the second different linearly elongated configuration and longitudinal lengths of the dock frame; and
select a longitudinal length of the dock frame.

28. The laboratory of claim 27, wherein more than one of the at least one dock frame module are joined together forming a coupling node assembly module with at least two linearly offset facets defining longitudinal sides of a spine structure along which the array of cart modules are arrayed, each facet including a corresponding one of the at least one dock frame module and respective portion of the modular interface.

29. The laboratory of claim 28, wherein the coupling node assembly modules are coupled to each other in linear configuration so as to select the linearly elongated configuration and the longitudinal length of the dock frame, and the array of cart modules are arrayed at least along facets forming one side of the spine structure.

30. The laboratory of claim 28, wherein the coupling node assembly module has a hexahedron shape with opposing facets, each with a dock frame module with a respective portion of the modular interface.

31. A method for automated laboratory testing or storage of a biological or chemical sample, the method comprising:
- operably coupling at least one of an automated, at least in part, laboratory instrumentation and a storage cabinet to a dock frame via a docking interface of the dock frame so that the dock frame is coupled to an interface with the laboratory instrumentation and the storage cabinet;
- defining, with the dock frame, a spine structure of an automated processing system and arraying a variable number of the at least one of the laboratory instrumentation and the storage cabinet alongside the spine structure,
- where the dock frame extends longitudinally and has a selectably variable elongated configuration with a selectably variable longitudinal length; and
- providing at least one dock frame module, including the docking interface, each of the at least one dock frame module being interchangeable with at least another dock frame module, and
- having control features with a predetermined relationship to a reference datum of the dock frame module and with a reference datum of the dock frame, formed of more than one of the at least one dock frame module and relating the dock frame to each of the more than one dock frame modules, so that the at least one dock frame module is interchangeably coupled in linear configuration with at least the other dock frame module so as to select the variable elongated configuration and longitudinal length of the dock frame from a number of different elongated configurations and longitudinal lengths of the dock frame.

32. The method of claim 31, wherein the spine structure is defined, at least in part, with the dock frame that includes longitudinal sides and lateral sides, the lateral sides having a shorter length than the longitudinal sides, where each longitudinal side includes at least one docking interface.

33. The method of claim 31, wherein the spine structure is defined, at least in part, with the dock frame that includes longitudinal sides and lateral sides, where the longitudinal sides include at least one docking interface.

34. The method of claim 31, wherein the spine structure is defined, at least in part, with the dock frame that includes longitudinal sides and lateral sides, where each of the longitudinal sides include at least one respective docking interface.

35. The method of claim 31, wherein the spine structure is defined, at least in part, with the dock frame that includes longitudinal sides and lateral sides, where the longitudinal sides include at least one docking interface and the lateral sides include at least another docking interface.

36. The method of claim 31, wherein the spine structure is defined, at least in part, with the dock frame that includes longitudinal sides and lateral sides, where each of the longitudinal sides and each of the lateral sides includes at least one respective docking interface.

37. The method of claim 31, further comprising providing the dock frame module with a transport arm.

38. The method of claim 31, further comprising providing the dock frame with a sliding workstation that moves in a longitudinal direction of the dock frame, where a transport arm is mounted to the sliding workstation so as to move as a unit with the sliding workstation.

39. The method of claim 31, further comprising providing the dock frame with a sliding workstation that moves in a longitudinal direction of the dock frame, where at least one laboratory sample storage station is mounted to the sliding workstation so as to move as a unit with the sliding workstation.

40. The method of claim 31, further comprising joining more than one of the at least one dock frame module together forming a coupling node assembly module of the spine structure, with at least two linearly offset facets defining longitudinal sides of the spine structure along which the at least one of the laboratory instrumentation and the storage cabinet are arrayed, each facet including a corresponding one of the at least one dock frame module and respective docking interface.

41. The method of claim 40, wherein the coupling node assembly modules are coupled to each other in linear configuration so as to select the variably elongated configuration and longitudinal length of the dock frame, and the at least one of the laboratory instrumentation and the storage cabinet are arrayed at least along facets forming one side of the spine structure.

42. The method of claim 40, wherein the coupling node assembly module has a hexahedron shape with opposing facets, each with a dock frame module with a respective docking interface.

* * * * *